(12) United States Patent
Peckham et al.

(10) Patent No.: US 11,303,858 B1
(45) Date of Patent: Apr. 12, 2022

(54) DIRECT PROJECTION MULTIPLEXED LIGHT FIELD DISPLAY

(71) Applicant: Avalon Holographies Inc., St. John's (CA)

(72) Inventors: Jordan Peckham, Portugal Cove-St. Philips (CA); Daniel Webber, St John's (CA); Wally Haas, St John's (CA)

(73) Assignee: Avalon Holographics Inc., St. John's (CA)

( * ) Notice: Subject to any disclaimer, the term of this patent is extended or adjusted under 35 U.S.C. 154(b) by 0 days.

(21) Appl. No.: 17/238,952

(22) Filed: Apr. 23, 2021

(51) Int. Cl.
*H04N 9/31* (2006.01)
*G02B 26/08* (2006.01)

(52) U.S. Cl.
CPC ......... *H04N 9/3152* (2013.01); *H04N 9/3155* (2013.01); *G02B 26/0833* (2013.01); *H04N 9/3102* (2013.01)

(58) Field of Classification Search
CPC ...... H04N 9/3152; H04N 9/3102; H04N 9/31; H04N 9/3108; H04N 9/317; H04N 9/3185; H04N 9/3155; H04N 9/3164; G02B 26/0833
USPC ....... 348/744–747, 759, 766, 767, 770, 771, 348/791, 801; 353/33, 30, 81
See application file for complete search history.

(56) References Cited

U.S. PATENT DOCUMENTS

| | | |
|---|---|---|
| 6,302,542 B1 | 10/2001 | Tsao |
| 6,344,928 B1 | 2/2002 | Hongug |
| 6,437,919 B1 | 8/2002 | Brown |
| 6,795,241 B1 | 9/2004 | Holzbach |
| 9,383,591 B2 | 7/2016 | Pasolini |
| 10,089,937 B2 | 10/2018 | Wilson |
| 10,175,488 B2 | 1/2019 | Bailey |
| 10,812,034 B2 | 10/2020 | Shay |
| 2008/0144174 A1 | 6/2008 | Lucente |
| 2008/0180643 A1 | 7/2008 | Endo |

(Continued)

FOREIGN PATENT DOCUMENTS

| | | |
|---|---|---|
| WO | WO2019154942 A1 | 8/2019 |
| WO | WO2020210361 A1 | 10/2020 |

OTHER PUBLICATIONS

"Integral Imaging System using Locally Controllable Point Light Source Array", Watanabe, Hayato et al., IS&T International Symposium on Electronic Imaging 2018, Society for Imaging Science and Technology, Stereoscopic Displays and Applications XXIX, Jan. 28, 2018.

"Light Field Projection for Lighting Reproduction", Zhou, Zhong et al., IEEE Virtual Reality Conference 2015, Mar. 23-27, 2015; DOI: 10.1109/VR.2015.7223335; htt11s://ieeex11lore.ieee.org/document/7223 3 3 5.

(Continued)

*Primary Examiner* — Sherrie Hsia

(57) ABSTRACT

A multiplexed light field projector device and a multiplexed light field display to output a light field image is described. The projector has a projector base with a projection optical system configured to output light rays to form a projected image, a collimating optical system configured for collimation of the projected image light rays to form a second projected image, which is directed to a display optical system to produce a light field image. Light field projector devices or alternative projector devices may be used individually or in combination with one or more other projectors which can be arranged to form a multiplexed direct projection light field display. The arrangement of projector devices may have an individual or shared display optical system.

23 Claims, 41 Drawing Sheets

(56) References Cited

U.S. PATENT DOCUMENTS

| | | |
|---|---|---|
| 2008/0309754 A1 | 12/2008 | Nayar |
| 2009/0189830 A1 | 7/2009 | Deering |
| 2011/0285968 A1 | 11/2011 | Huang |
| 2012/0320342 A1* | 12/2012 | Richards ............... G03B 21/13 353/30 |
| 2014/0063473 A1 | 3/2014 | Pasolini |
| 2014/0327710 A1 | 11/2014 | Xu |
| 2016/0373701 A1 | 12/2016 | Ferri |
| 2017/0220201 A1 | 8/2017 | Ludwig |
| 2018/0101018 A1 | 4/2018 | Chung et al. |
| 2018/0143449 A1 | 5/2018 | Popovich et al. |
| 2018/0149958 A1 | 5/2018 | Kong |
| 2019/0273914 A1 | 9/2019 | Lyubarsky |
| 2019/0273915 A1 | 9/2019 | Oberascher |
| 2019/0387206 A1 | 12/2019 | Ishii |
| 2020/0244948 A1 | 7/2020 | Baran |
| 2021/0048735 A1 | 2/2021 | Peckham et al. |

OTHER PUBLICATIONS

"Review of Electrothermal Actuators and Applications". Alissa Potekhina and Changhai Wang. Institute of Sensors, Signals and Systems, School of Engineering and Physical Sciences, Heriot-Watt University, Edinburgh EH14 4AS, UK.

"Resolution of Temporal-Multiplexing and Spatial-Multiplexing Stereoscopic TeleVision Science Program, University of California, Berkeley, CA 94720, U.S.Avisions". Joohwan Kim and Martin S. Banks. Current Optics and Photonics. vol. 1, No. 1, Feb. 2017, pp. 34-44.

"Smart Optical Materials". P M Martin. Pacific Northwest National Laboratory,Richland, WA, USA.

Time-multiplexed light field display with 120-degree wide viewing angle, (Liu, Boyang et al.), Optics Express 35728, vol. 27, No. 24/25, Published Nov. 20, 2019.

* cited by examiner

DIRECT PROJECTION MULTIPLEXED LIGHT FIELD DISPLAY

FIELD OF THE INVENTION

The present disclosure relates to light field display technology and more specifically, to projection based light field displays and light field projector devices. The present disclosure particularly relates to an individual multiplexing light field projector device which individually, or within an array of said devices, forms a multiplexed, high angular resolution, wide field of view, multiple view display.

BACKGROUND OF THE INVENTION

Light field displays provide multiple views, allowing a user to receive a separate view in each eye. While current displays in this category provide an interesting viewing experience, a captivating light field display requires a high pixel density, low angular separation between views, and a large viewing angle. For a high-quality viewing experience, it is desired that a user experiences smooth transitions between viewing zones while maintaining an independent and perceivable view from the adjacent views. Three dimensional displays allow the viewer to gain a broader perspective on the image they are viewing. Some three-dimensional displays use polarized light and require the viewer to wear specialized glasses. Others produce an image that provides some parallax in a single dimension.

Projector-based light field displays generally consist of one or more projectors and generally require a series of optical systems to generate a light field. To achieve the number of pixels to achieve a high-definition light field display, an increased number of projectors may be required in combination with multiple optical systems resulting in a large and often costly system.

United States patent application publication number US2018/0101018 to Chung et al. describes a light field display including a screen, a grating pixel array, and an image generator. This system requires the grating pixel array to display the output light field image, thus resulting in a large display with significant power requirements.

U.S. Pat. No. 9,383,591 to Pasolini describes a pico-projector device having a light source to create a light beam, a mirror mechanism to direct the light beam towards a displaying surface, and a driving circuit to supply driving signals for the mirror mechanism to generate and subtract compensation signals for stabilizing the projected image. The pico-projector device described uses a gyroscope to compensate for any motion of the device. This device could create a projected image however would require additional optical components and processing to create a light field.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

It is an object of the present invention to provide a multiplexing light field projector device and a multiplexed light field display. The multiplexing light field projector devices or any other suitable projector devices include a multiplexing device and may be arranged in an array to form the multiplexed direct projection light field display. The multiplexing light field projector device is composed of one or more light emitting diodes, a projector body, and optical systems configured to cause a plurality of light rays generated by the light emitting diodes to create a multiplexed light field. It is another object of the present invention to provide methods for multiplexing to create a high-definition light field display. The light field display may be a projector-based light field display or a flat panel display. Both types include a multiplexing device.

In an aspect there is provided a projector comprising: a light source comprising a light emitting diode (LED); a projection optical system comprising: at least one illumination optical component to receive light from the light source and direct the light into a single light ray path; a pixel forming device to receive light from the illumination optical component and convert the light into a pixel array; and a magnifying optical component to receive the pixel array; a collimating optical system to collimate light from the pixel array and create a collimated projected image; a display optical system comprising a display optical component; and a multiplexing device connected to at least one of the illumination optical component, pixel forming device, magnifying optical component, and display optical component, to shift the ray path to provide a multiplexed light field output.

In an embodiment, the illumination optical component comprises at least one of a plano-convex lens, dichroic mirror, microlens array, meniscus lens, bi-convex lens, single prism, and folded prism.

In another embodiment, the pixel forming device is a Liquid Crystal on Silicon (LCOS) panel or a digital micromirror device (DMD).

In another embodiment, the magnifying optical component is a projection doublet or a bi-convex lens.

In another embodiment, the collimating optical system comprises at least one of a light field projection (LFP) lens, bi-convex lens, and collimating lens array comprising a plurality of collimating lenslets.

In another embodiment, each collimating lenslet in the plurality of collimating lenslets comprises two plano-convex lenses.

In another embodiment, the display optical component comprises at least one of a single lens, lens array, pinhole array, metasurface, and metalens.

In another embodiment, the multiplexing device comprises a voltage generator connected to a first electrode and a second electrode, and wherein the first electrode and the second electrode are attached to an illumination optical component, pixel forming device, magnifying optical component, or display optical component multiplexing device capable of the Kerr effect.

In another embodiment, the multiplexing device is a multiplexing layer positioned in front of the display optical system.

In another embodiment, the multiplexing device is a multiplexing actuator.

In another embodiment, the multiplexing actuator is a piezo-electric actuator, electrothermal actuator, magnetic actuator, electrostatic actuator, or shape memory alloy-based actuator.

In another embodiment, the multiplexed light field output comprises a first image at a first position and a second image at a second position, wherein the second image is offset a distance of less than one pixel width relative to the first image.

In another aspect there is provided a method of creating a multiplexed light field image comprising: generating a light ray from a light source along a ray path; directing the light ray to a pixel forming device; converting the light ray into a pixel array; magnifying the pixel array to form a magnified pixel array; collimating the magnified pixel array to produce a collimated projected image; directing the collimated projected image to a display optical component to produce a light field output; and shifting the ray path to multiplex the light field output and produce a multiplexed light field image.

In an embodiment, the light ray is directed to the pixel forming device by one or more plano-convex lens, dichroic mirror, microlens array, meniscus lens, bi-convex lens, single prism, and folded prism.

In another embodiment, the light ray is converted into pixel by a Liquid Crystal on Silicon (LCOS) panel or a digital micromirror device (DMD).

In another embodiment, the pixel array is magnified optical by a projection doublet or a bi-convex lens.

In another embodiment, the magnified pixel array is collimated by a light field projection (LFP) lens, a bi-convex lens, or a collimating lens array comprising a plurality of collimating lenslets.

In another embodiment, the method further comprises shifting the ray path by applying a voltage to a first electrode and a second electrode, wherein the first electrode and the second electrode are attached to an illumination optical component, pixel forming device, magnifying optical component, or display optical component multiplexing device capable of the Kerr effect.

In another embodiment, the method further comprises shifting the ray path using a multiplexing layer.

In another embodiment, the method further comprises shifting the ray path by actuating a position of an optical component in the projector using one or more piezo-electric actuator, electrothermal actuator, magnetic actuator, electrostatic actuator, and shape memory alloy-based actuator.

In another embodiment, the multiplexed light field output comprises a first image at a first position and a second image at a second position, wherein the second image is offset a distance of less than one pixel width relative to the first image.

In another aspect there is provided a method of creating a multiplexed light field image comprising: generating a light ray from a light source along a ray path; converting the light ray into a pixel array; magnifying the pixel array; collimating the magnified pixel array to produce a collimated projected image; displaying the collimated projected image to produce a light field output; and shifting the ray path to multiplex the light field output and produce a multiplexed light field image.

In an embodiment of the method, shifting the ray path comprises actuating a position of a shiftable optical component in the projector, applying a voltage to an optical component multiplexing device capable of the Kerr effect, actuating an optical component capable of deformation, or positioning a multiplexing layer in the ray path.

In another aspect there is provided a multiplexing light field projector comprising, along a light path: an LED light source; a projection optical system comprising: a microlens array; a lens; a prism; and a pixel forming device; a collimating optical system comprising a lens; a display optical system; and a multiplexing device to shift the light path.

In an embodiment, the LED light source comprises red, green, and blue light sources and the projection optical system further comprises a plurality of dichroic mirrors to direct the light from the LED light sources.

In another embodiment, the multiplexing device is connected to at least one of the microlens array, lens, prism, pixel forming device, lens in the collimating optical system, or optical component in the display optical system.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1:
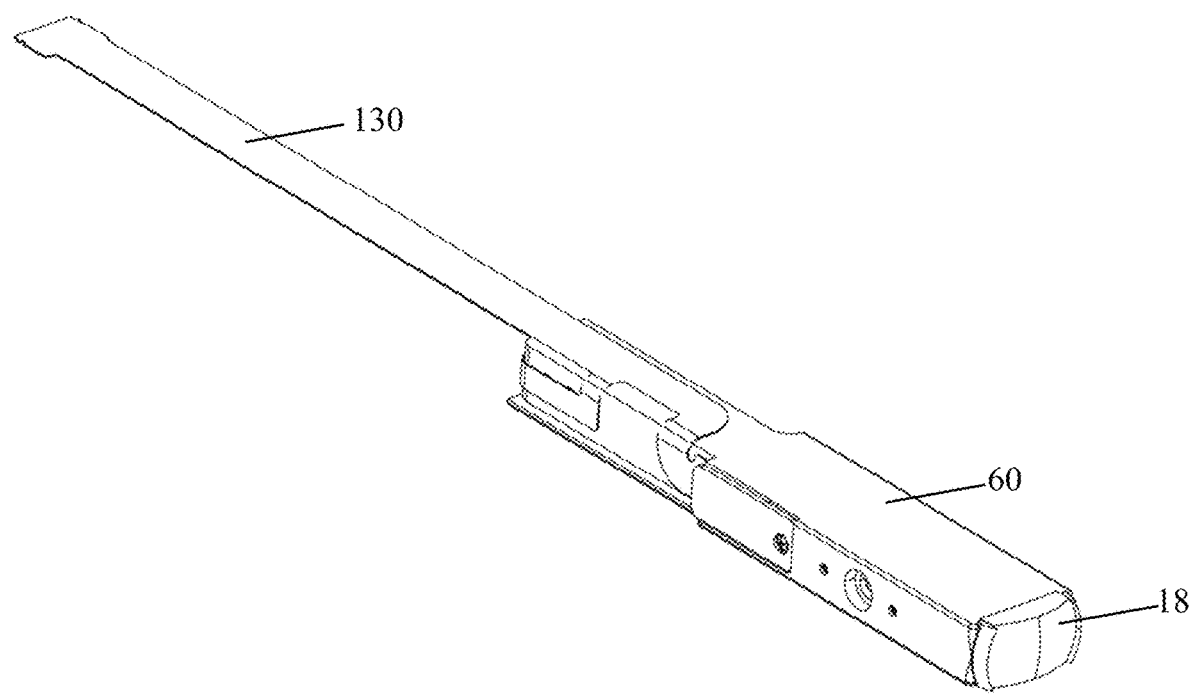
FIG. 1 illustrates an isometric view of a light field projector device according to an embodiment of the present disclosure.

Described herein is a multiplexed multiple-view, autostereoscopic, and high-angular resolution, light field display. The light field display is viewable with both horizontal and vertical parallax. Light field display multiplexing is a method of increasing the density of views (pixels) by shifting the light path or light field in or from the projector.

Multiplexing in general is a method of sending more than one signal over a link at a time. Specifically, for a light field display, multiplexing is sending multiple images in the time frame that a single frame would be sent in a non-multiplexed display, corresponding to some change in the optical system of the display for each multiplexed frame. A multiplexed image comprises two or more light field images, with each light field image projected to a different location. This is in contrast with a nonmultiplexed image or unmultiplexed output which outputs or comprises only one projected light field image. Creating multiple images from the same projector using multiplexing at a rapid frame rate effectively multiplies the image or pixel density of the light field by the number of images in each multiplexed image.

The concept of an observer-based function based on light in space and time, or plenoptic function, was developed to describe visual stimulation perceived by vision systems. The basic variables of the plenoptic function are dependent upon and include the three-dimensional (3D) coordinates (x, y, z) from which light is being viewed and the direction light approaches this viewing location, described by the angles (θ, ϕ). With wavelength of the light, λ and time of the observation, t, this results in the plenoptic function:

$$P(x,y,z,\theta,\phi,\lambda,t)$$

Alternative to the plenoptic function, one may use radiance along light rays in 3D space at a point and given direction may be represented by a light field. The definition of light field may be equivalent to that of the plenoptic function. A light field may be described as radiance flowing through all points in all possible directions, as a 5D function. For a static light field, the light field may be represented as a scalar function:

$$L(x,y,z,\theta,\phi)$$

where (x, y, z) represent the radiance as a function of location and the light direction of travel is characterized by (θ, ϕ). A viewer of a 3D real world object is subject to infinite views, or a continuously distributed light field. To practically replicate this, the present disclosure describes a direct projection light field display to subsample the continuously distributed light field into a finite number of views, or multiple views, to approximate the light field. The output of the direct projection light field display is a light field, which is a 3D representation of a continuously distributed light field based upon a finite number of views with angular resolution exceeding that of the human eye.

A multiplexed light field display is achieved by multiplexing or overlaying two or more images, either temporally or spatially. A spatially multiplexed display may be described as one which uses lenses, motors, or other equivalent optical or mechanical components in combination with the light source to display separate views at different viewing angles. A spatially multiplexed light field display can produce unique images for multiple viewer or observer locations. By using the same hardware to create two or more images that are projected at different positions or angles and changing the image position at a rate faster than can be discerned by a viewer, the number of pixels in the light field display can be effectively multiplied by the number of projector image positions achievable by the multiplexing system. The minimum frame rate for a display is between 24-30 Hz, based on the minimum rate that a human eye cannot discern, which is less than about 30 Hz. Therefore, for a multiplexed system, the frame rate must increase by the same factor that the number of multiplexed frames per frames increases. In one example, if a normal display refreshes at 30 Hz, an multiplexed image with four output light field images each at a different location requires an overall frame refresh rate of 120 Hz so that each of the four output light fields has a refresh rate of at least 30 Hz. Rapidly changing the projection image position of each of the projectors in a light field projector device using a multiplexing component can thus provide a significant increase in pixel density with the same hardware.

To achieve multiplexing and a multiplexed image using the present projector, at least one multiplexing optical element is added to one or more optical components in the projector to shift the light ray emitted by the LEDs or light path downstream thereof by a desired amount at a rate fast enough that the multiplexed image cannot be discerned by the human eye. To create a multiplexed image with two different light field images, the projector uses a multiplexing optical element to change the angle of projection of the light ray from a first position where a first image is projected to a second or next position, at a distance of less than one pixel width relative to the first image position and at a desired angle relative to the direction of the projection of the first image. This results in two images projected to two different locations, and the composite image is referred to as the multiplexed image. It is understood that the multiplexing projector can use one or more multiplexing device to create more than two light field images, resulting in a multiplexed image that is made up of more than two angularly offset light field images.

Various types of multiplexing devices may be used. Preferably the multiplexing device is either a multiplexing actuator, an optical component capable of the quadratic electro-optic effect also known as the Kerr effect, or an optical component capable of deformation to adjust the light path direction. Various types of actuators may be used as the multiplexing device to mechanically shift an optical component of the projector to adjust the light ray path. These include but are not limited to piezo-electric actuators, electrothermal actuators, magnetic actuators, electrostatic actuators, or shape memory alloy-based actuators. A multiplexing device capable of the Kerr effect is a component made of a material in which the refractive index of the material can be adjusted in response to an applied electric field. Various materials are known that are capable of the quadratic electro-optic effect and use of an optical component of one of these materials in combination with a device capable of creating the electric field required to adjust the material refractive index can achieve the same or similar multiplexed image. The Kerr effect, also called the quadratic electro-optic (QEO) effect, is a change in the refractive index of a material in response to an applied electric field wherein the induced index change is directly proportional to the square of the electric field instead of varying linearly with it. All materials show a Kerr effect, but certain liquids display it more strongly than others. In addition, optical element deformation to change the light path can be achieved using an adaptable optical component in the projector together with a component capable of deforming the deformable optical component. Adaptive optics can also be used to manipulate the wavefront in an optical system. For example, a deformable optical component, such as a mirror, can correct a wavefront when an outside control signal is applied by changing its shape. Some non-limiting examples of optical components in an adaptive optical system are deformable mirrors and wavefront sensors.

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g., "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "pixel" refers to a spatially discrete light emission mechanism used to create a display.

As used herein, the term "subpixel" refers to a structure having a light emitting device housed within an optical microcavity. The optical microcavity is operatively associated with a plurality of reflective surfaces to substantially collimate, manipulate, or tune the light. At least one of the reflective surfaces is a light propagating reflective surface connected to the optical microcavity to propagate the light out of the microcavity. The present disclosure provides for individually addressable red, green, and blue (RGB) subpixels. The subpixel size as presently described is in a nanoscale to several microns range, which is significantly smaller than the pixel size previously known in the art.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

As used herein, the term "light field display" is a device which reconstructs a light field from a finite number of light field radiance samples input to the device. The radiance samples comprise the color components red, green and blue (RGB) which originate from LEDs of the same color. For reconstruction in a light field display, a light field can also be understood as a mapping from a four-dimensional space to a single RGB color. The four dimensions include the vertical and horizontal dimensions of the display and two dimensions describing the directional components of the light field. A light field can be defined as the function:

$$LF:(x,y,u,v) \rightarrow (r,g,b)$$

For a fixed point $x_f$, $y_f$ in the light field, $LF(x_f, y_f, u, v)$ represents a two-dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the term "LFP lens" refers to the light field projection lens. The LFP lens functions to collimate the incoming light.

As used herein, the acronym "FWHM" refers to 'Full-Width at Half Maximum', which is an expression of the extent of a function given by the difference between the two extreme values of the independent variable at which the dependent variable is equal to half of its maximum value.

As used herein, the term "hogel" is an alternative term for a holographic pixel, which is a cluster of traditional pixels with directional control. An array of hogels can generate a light field. As a pixel describes the spatial resolution of a two-dimensional display, a holographic pixel or hogel describes the spatial resolution of a three-dimensional display.

As used herein, the term "hogel pitch" refers to the distance from the center of one hogel to the center of an adjacent hogel.

As used herein, the term "optical mirror" refers to an object that reflects light in such a way that, for incident light in some range of wavelengths, the reflected light preserves many or most of the detailed physical characteristics of the original light. This can also be called specular reflection. Two or more mirrors aligned exactly parallel and facing each other can give an infinite regress of reflections, also called an infinity mirror effect.

As used herein, the term "pixel pitch" refers to the distance from the center of one pixel to the center of the next pixel.

As used herein, the term "pixel array" refers to an array of pixels inside a hogel.

As used herein, the term "wavelength" is a measure of distance between two identical peaks (high points) or troughs (low points) in a wave, which is a repeating pattern of traveling energy such as light or sound.

As used herein, the term "simulation" refers to a computer model of an object or physical phenomenon. A simulation can be used, for example, for the purpose of study or to develop and refine fabrication specifications. Various simulation methods can be used, including but not limited to the following: Finite difference time domain (FDTD); ray tracing; Finite Element Analysis (FEA); and Finite Element Method (FEM).

As used herein, one or more parameters of the light field display comprise one or more of: hogel pitch, a pixel pitch, and focal length. The term pixel references a set of red, green, and blue subpixels. The pixel pitch is defined as the distance from the center of one pixel to the center of the next. As used herein, a pixel array refers to an array of pixels inside a hogel. A hogel is an alternative term for a holographic pixel, which is a cluster of traditional pixels with directional control. An array of hogels can generate a light field. It then follows that the hogel pitch is defined as the distance from the center of one hogel to the center of an adjacent hogel. The angular field of view for a lens is defined by its focal length. Generally, a shorter focal length results in a wider field of view. It should be noted that the focal length is measured from the rear principal plane of a lens. The rear principal plane of the lens is rarely located at the mechanical back of an imaging lens. Due to this, approximations and the mechanical design of a system are generally calculated using computer simulation.

It is contemplated that any embodiment of the compositions, devices, articles, methods and uses disclosed herein can be implemented by one skilled in the art, as is, or by making such variations or equivalents without departing from the scope of the invention.

Described herein is a multiplexing light field projector device which can provide a multiplexed light field display. The present light field projector device can be used for multiple-view, autostereoscopic, and high-angular resolution, light field display. The light field display may also be viewable with both horizontal and vertical parallax. To improve on current direct projection light field display designs, the present disclosure describes a projector specifically designed for creating a multiplexed light field display to minimize pixel size and optimize display viewing parameters. In the present disclosure, a light field projection (LFP) lens design is described which leverages the design of the optic to fill the full aperture in front of the body. The image created by the LFP lens has a small divergence to allow the projector images to overlap on the edges while still allowing the following optical architecture to create a light field.

In normal operation, the light field projector device receives light from one or more light sources and directs the light using illumination optical components in a projection optical system onto a pixel forming device. Illumination optical components can include, but are not limited to a plano-convex lens, a dichroic mirror, a microlens array, a meniscus lens, a bi-convex lens, a single prism or a folded prism The pixel forming device converts the light coming from the illumination optical components into a plurality of pixels. The light coming into the pixel forming device originates from one or more light emitting diodes (LEDs) in an illumination optical system and is converted by the pixel forming device into a pixel array. Light from the pixel forming device then proceeds through a series of projection optical components or projection optics in a magnifying optical component that functions to magnify the pixel array coming from the pixel forming device to form a magnified pixel array. The magnifying optical component may be a projection doublet, bi-convex lens, or any other suitable optical component. Light from the projection optical system is then collimated in a collimation optical system to produce a collimated projected image. This entails taking a small image having a high pixel density and collimating the light, thereby producing an array of light rays with minimal, low, or no divergence. The display lens in the projector functions best when there is little or no divergent incoming light, accordingly the collimation optical system provides the substantially collimated light to the display lens in the display optical system.

Conventional projectors are generally configured to create a large image with coarse pixel density, for example, of around about 1 pixel per $mm^2$, assuming a typical projected image size and room size or distance to the projection screen. The presently described projector provides a much higher pixel density, on the order of 10,000 pixels per $mm^2$. The projection optics in the present system are designed with low magnification to overcome the tiling effect created by an image produced by multiple projection devices but without significant magnification as to interfere with the pixel density. To create a light field display, the light field image outputs from multiple projector devices are tiled together to create a full light field image. If there is a break in the light field image between two projection images this can create a dark seam or interfaces between the light field image outputs from each light device where no light is projected, creating a picket-fence like effect or tiling effect, with pickets in the seams between the output from each projection device. The presently described projector device overcomes the tiling issue by magnifying the image formed by the display device. By magnifying the image from the display device, the image at the output of the display optical system lens is thus at least as large as the physical dimensions of the projector itself, ensuring overlap between the light field images created by an array of projector devices. The projection optical system magnifies the light enough to overcome the tiling effect but not enough to sacrifice pixel density. A high pixel density is thus achieved, which is needed for a light field display. The human eye can only resolve pixel sizes of about to 35 microns, assuming good visual acuity and optimal viewing conditions. Without a display lens, the pixel densities achieved by the presently described projector are on the order of 10 microns. Accordingly, the image created by the present projector device looks fluid, crisp, and unpixellated.

Generally, very high-brightness projectors are required for light field displays known in the art. One advantage of the presently described light field projector device is a reduced brightness requirement for the projector itself. The reduced brightness requirement of the presently described projector is achieved through the design of the light field projector device's optical systems' ability to control the angular distribution of light and application of a point spread function to the light beam. The ability to control the angular distribution of light and the applied point spread function ensure efficient light output with minimal loss. The decreased brightness requirement may allow for use of small LEDs without an internal cooling requirement, leading to a smaller overall footprint of the device. If two or more light field projectors of the presently described design are used in combination with one another, a tighter packing density may also be achieved.

Projector array-based displays can pose a challenge for design, at least due to the requirement for inclusion of many densely oriented projectors into a small space with precise alignment. The presently described orientation of optical components within a projector base in combination with multiple optical systems for collimation and diffusion of light can achieve a reduced pixel size, minimum projector footprint, a fully scalable design to larger displays, reduced tolerance constraint, and decreased chromatic aberration from a multiple optical system light field display design.

Various features of the light field projector will become apparent from the following detailed description taken together with the illustrations in the Figures. The design parameters, design method, construction, and use of the light field projector device and structures disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope of the invention.

A light field display requires the smallest achievable pixel size to increase the spatial and/or directional resolution of the display. For a light field projector used in a direct projection light field display, the pixel size is determined by the projected image size of the active area at the projector focus distance, where the total space of a single projector must be the same as the image dimensions. If the pixel fills the entire space it resides in, then the spacing between pixels, or pixel pitch, is equal to the pixel size. The parameters pixel pitch and hogel pitch define the viewer experience as they determine the spatial resolution and depth of field of the display. The smaller the hogel pitch the higher the spatial resolution of the light field display. The larger the number of pixels within a hogel, the higher the depth of field of the display. Increasing the density of the pixels gives the designer the ability to achieve different light field display designs based on application, for example to increase the depth of field by increasing the hogel pitch, decreasing the spatial resolution.

Figure 16:
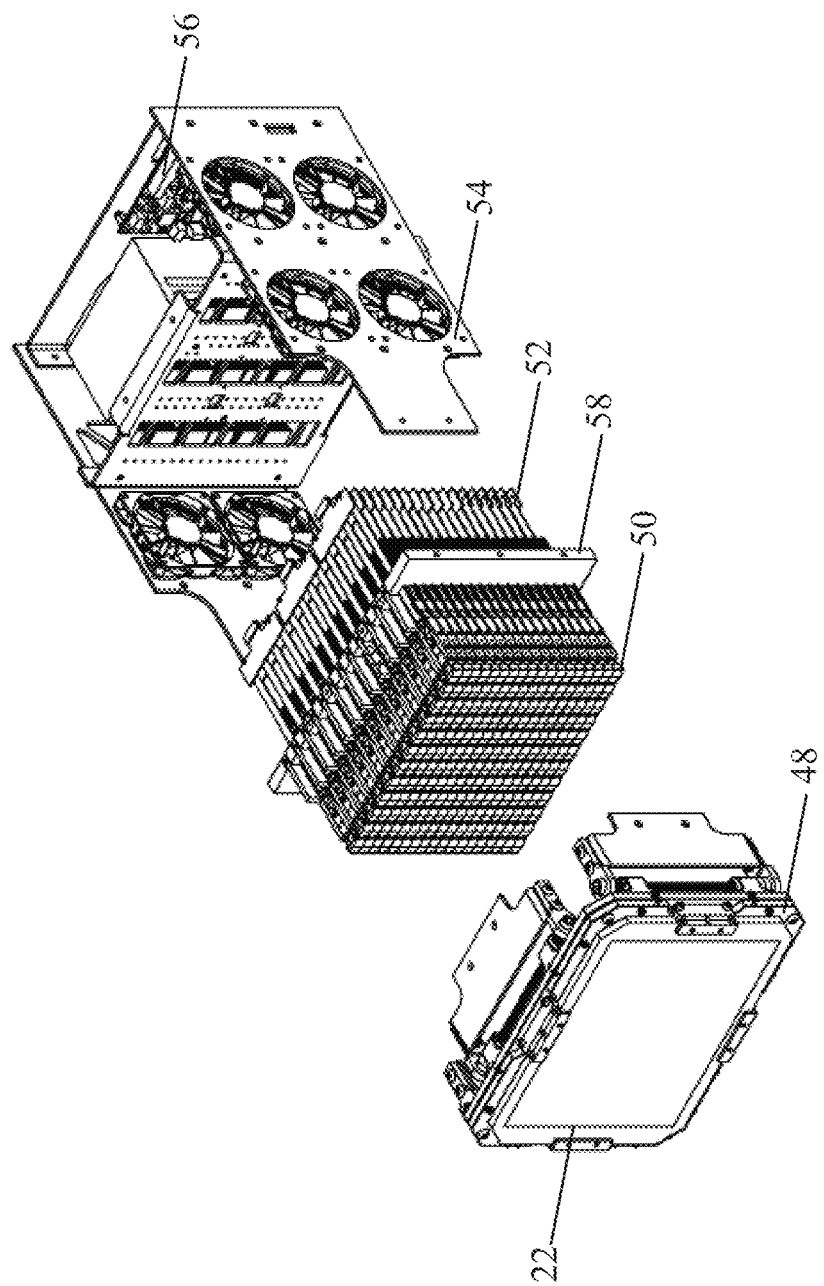
FIG. 16 illustrates an exploded view of a system consisting of an array of light projector devices.

To achieve the smallest pixel size, the space occupied by a single projector must be minimized. One method of minimizing the projector footprint is a direct mounting strategy where the projector body in the array of projectors mounts directly to a chassis leaving minimal space between adjacent projectors as illustrated in FIG. 16. The projector footprint is then as close as possible to the dimensions the display device used in the projector. Direct mounting of the projector results in loss of a mechanical method of adjusting the alignment of the projectors in the display, necessitating a digital projector correction method such that an additional number of correction pixels is allowed outside the active area of each projector. These correction pixels allow for offsetting the projector frame in both x- and y-dimensions of the display device to correct for misalignment in the 6 degrees of freedom.

The number of pixels required for correction is directly related to the mechanical design of the projector array system, where mounting the projectors with the smallest possible tolerances results in the smallest number of correction pixels required. An example of digital correction divides the pixels in a single projector frame into the light field image, overlap pixels and the correction buffer. The correction buffer is determined based on the defined tolerances of the projector array, and the maximum misalignment in pixels. If the full projector image resolution is 2048× 1080, for example, the pixels in the projector image can be divided such that the projector light field image has a resolution of 1944×1000, with a 20 pixel overlap with the adjacent projectors. The overlap pixels display duplicate data with the adjacent projectors with an applied intensity function for blending of the tiled display. The resolution of the light field frame and overlap pixels is 1984×1040 pixels and must also account for increase in the image size due to optical corrections, such as distortion and chromatic aberration. This 1984×1040 resolution image is offset from the center of the display device, within the 2048×1080 to allow for the correction per-projector misalignment, equivalent to 64 pixels in the x-direction, and 40 pixels in the y direction. In this example, the maximum projector footprint is calculated as the light field projector resolution multiplied by the equivalent pixel size in the light field display.

An outline of the projector and display calibration procedure is presented. A calibration file, related to a specified white point for the display, is first generated for each projector by characterizing the projector output through the entire color range of the display. The calibration of each projector alters the LED voltage, current, and mixing ratio to achieve a color uniformity across the display while also ensuring that the intensity for each color step is within the specified tolerance value. The projector calibration can be performed with the projectors installed in the display or using individual projectors before installation using a calibrated imaging device such as a photometer, colorimeter, or Digital Single-Lens Reflex Camera (DSLR). During this stage, optical corrections for distortion, warping, or other projector-based quantities can be applied.

In the next step, the display optical system is installed in the display system such that any intensity non-uniformities can be corrected. Depending on the number of lenses and optical quality of the optics this step may not be required. With the light field projector device installed into the display, the projector digital offset is determined and set before display characterization and correction. The light field projector frame is illuminated in each projector and the digital offset is automatically determined through an iterative process using a DSLR. Each projector requires an independent set of values. With the offset values determined, the additional pixels in the projector assigned for overlap with adjacent projectors are illuminated. A default coefficient set is assigned to each projector, noting different coefficients for the outside edge projectors. The coefficients are then updated in an automated procedure to achieve the required blending. The final step is light field display calibration, which is used to measure a pixel-to-pixel correspondence from the projector pixel to the light field pixel.

Multiplexing of a light field projector may be achieved through spatial or temporal multiplexing techniques, as previously described. An object of the present disclosure is to describe methods of multiplexing for a light field projector. The multiplexed light field display is achieved by multiplexing or overlaying two or more light field images generated by a single projector, either temporally or spatially, to provide multiple unique images for multiple viewer or observer locations. A spatially multiplexed display may be described as one which uses lenses, motors, or other equivalent optical or mechanical components in combination with the light source to display separate views at different viewing angles. In one example, multiplexing may be achieved by adding an actuator device to the disclosed light field projector device. An actuator may be defined as a mechanical and or electrical component that moves an optical element in one or two dimensions to shift the light from the projector at some fractional distance of the pixel size. This is herein referred to as a "multiplexing actuator".

FIG. 1 illustrates an isometric view of a light field projector device. All optical components can be contained within the projector housing 60, or any other housing or structure that secures the components. A light field image created by a set of LEDs in a projection optical system is projected through the collimating optical system 18 which comprises a light field projection (LFP) lens. The light field projector device shown also includes a flexible printed circuit (FPC) 130, also referred to as the light field projector flex cable, to connect the light field projector device and light sources to the drive electronics. The light field projector body serves to house as well as secure the optical components in the projector device. Alternative projector body configurations can comprise one or more single surface or structure to which the optical components can be secured or held in place.

Figure 2A:
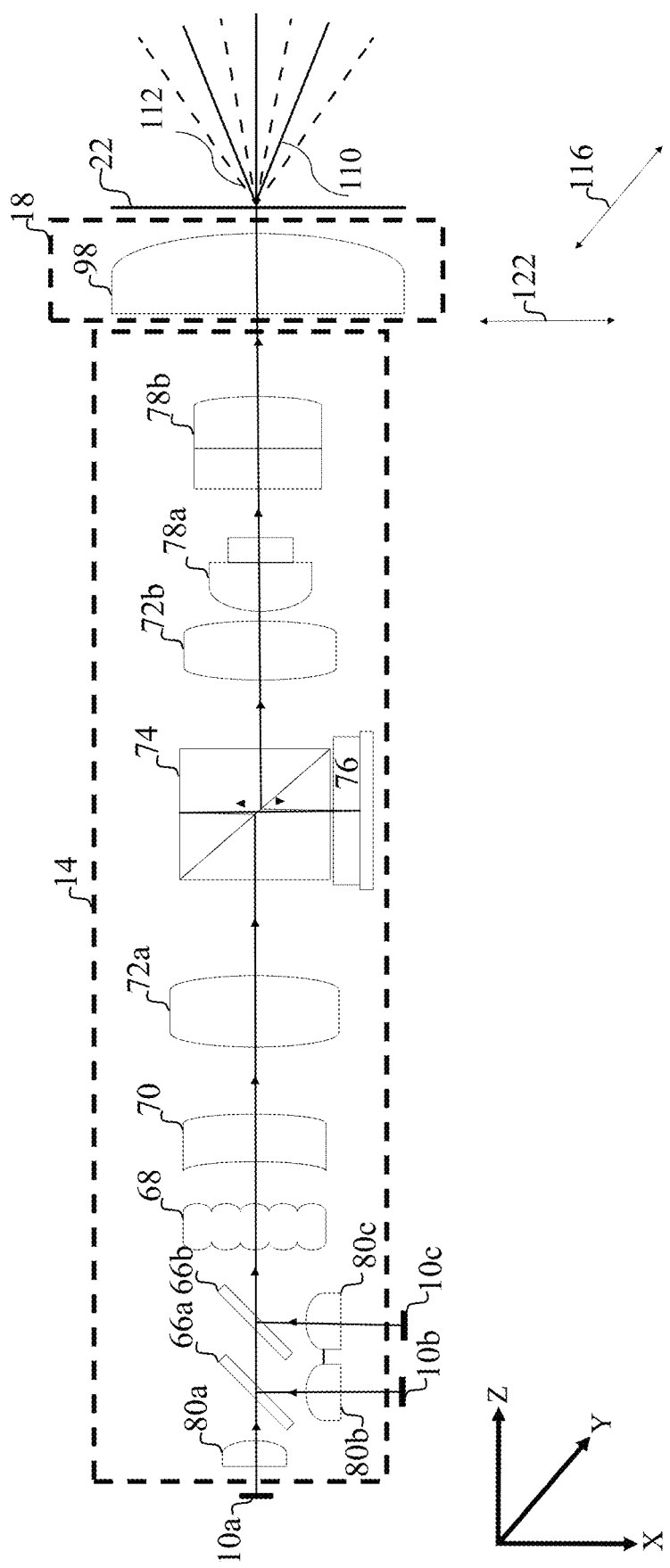
FIG. 2A illustrates a configuration of a multiplexed light field projector with a projection optical system arrangement and a collimating optical system.

FIG. 2A illustrates an embodiment of a light field projector configuration with multiplexing. FIG. 2A illustrates a projection optical system 14 arrangement as shown and directs the light ray path to a collimating optical system 18, wherein the collimating optical system 18 is composed of a light field projection (LFP) lens 98. In operation, the light field projector device receives light from one or more light sources and directs the light using illumination optical components onto a display device. The pixel forming device converts the light coming from the illumination optical components into a plurality of pixels. The light coming into the display device originates from one or more light emitting diodes (LEDs) in the illumination optical system and is converted by the display device into a pixel array. Light from the display device then proceeds through a series of projection optical components or projection optics that function to magnify the image coming from the display device. Light from the projection optical system is then collimated. The collimation optical system makes a small image having a high pixel density and collimates the light, producing light rays with minimal, low, or no divergence. FIG. 2A also includes a display optical system 22. The display optical system comprises a display lens and functions optimally when there is little or no divergent incoming light, accordingly the collimation optical system provides the substantially collimated light to the display lens in the display optical system 22. In this embodiment, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72a, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72b and through to a series of projection doublets 78a and 78b. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. Multiplexing can be achieved by shifting the LFP lens 98 along a second axis 116 or a third axis 122 using a multiplexing actuator programmed to shift the incoming pixels by, for example, a quarter- or half-integer pixel value corresponding to an equivalent frame to create additional pixels in one direction based on the design. Multiplexing can also be achieved by shifting the LFP lens 98 along a second axis 116 and a third axis 122 by some quarter- or half-integer pixel value in each direction by a multiplexing device which comprises an actuator, where the end of each movement corresponds to a frame, increasing the effective pixels in both directions. Multiplexing may also be achieved by deformation of the LFP lens 98 or manipulating the refractive index of the material to achieve an effective resolution increase in both directions.

Figure 2B:
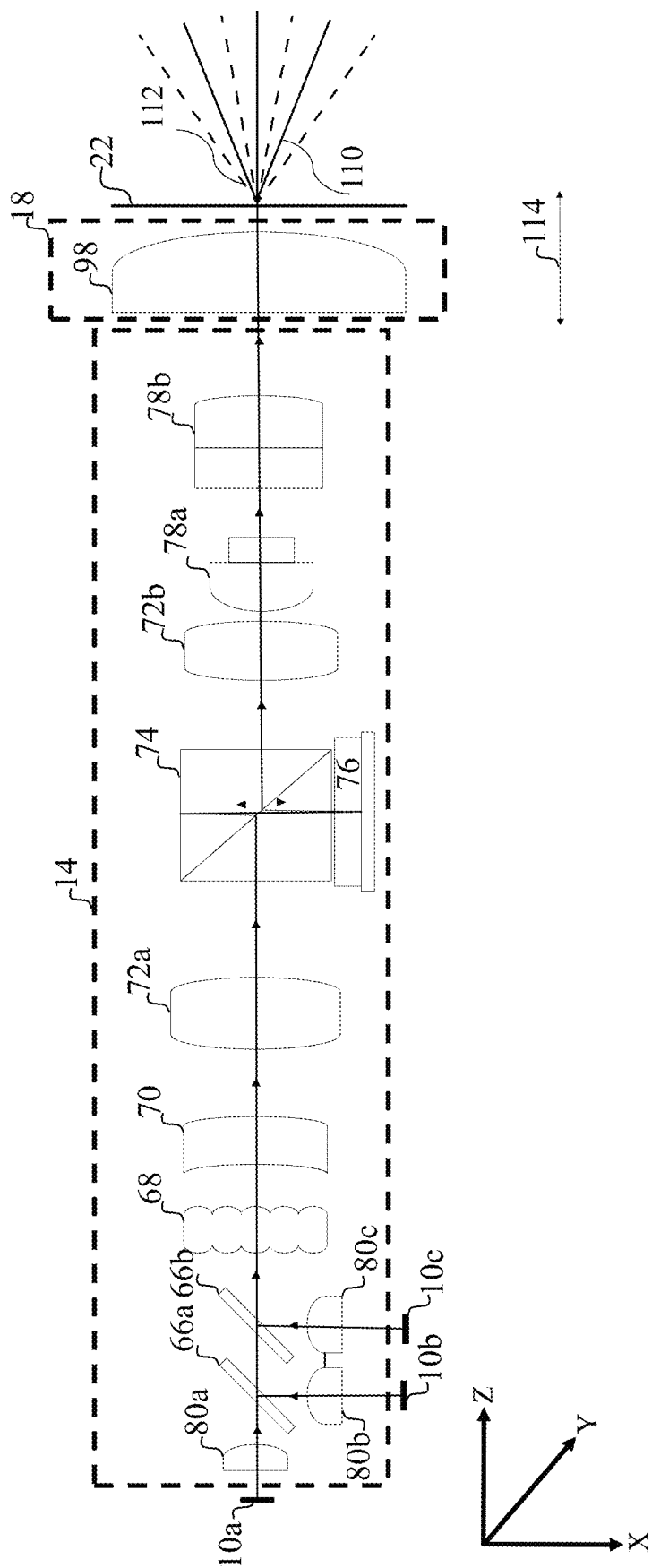
FIG. 2B illustrates a configuration of a multiplexed light field projector with a projection optical system arrangement and a collimating optical system.

FIG. 2B illustrates another embodiment of a light field projector configuration with multiplexing. FIG. 2B illustrates a projection optical system 14 arrangement as shown and directs the light ray path to a collimating optical system 18, wherein the collimating optical system 18 is composed of a LFP lens 98. FIG. 2B also includes a display optical system 22. Projection optical system 14 and collimating optical system 18 are housed in the light field projector body, as illustrated in FIG. 1. In this embodiment, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72a, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72b and through to a series of projection doublets 78a and 78b. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. FIG. 2B illustrates an embodiment of multiplexing wherein the LFP lens 98 is moved along first axis 114 toward the positive z-direction by a multiplexing device to slightly increase the divergence of the pixels in the projector image, increasing the size of the projector image at the image plane by an amount to cause, for example, an equivalent quarter- or half-integer pixel value shift. Similarly, the LFP lens 98 may be moved in the negative z-direction by the multiplexing device to decrease the divergence, creating a smaller projector image at the imaging plane depending on the space constraints of the design. This movement can be achieved, for example by a multiplexing actuator.

Figure 2C:
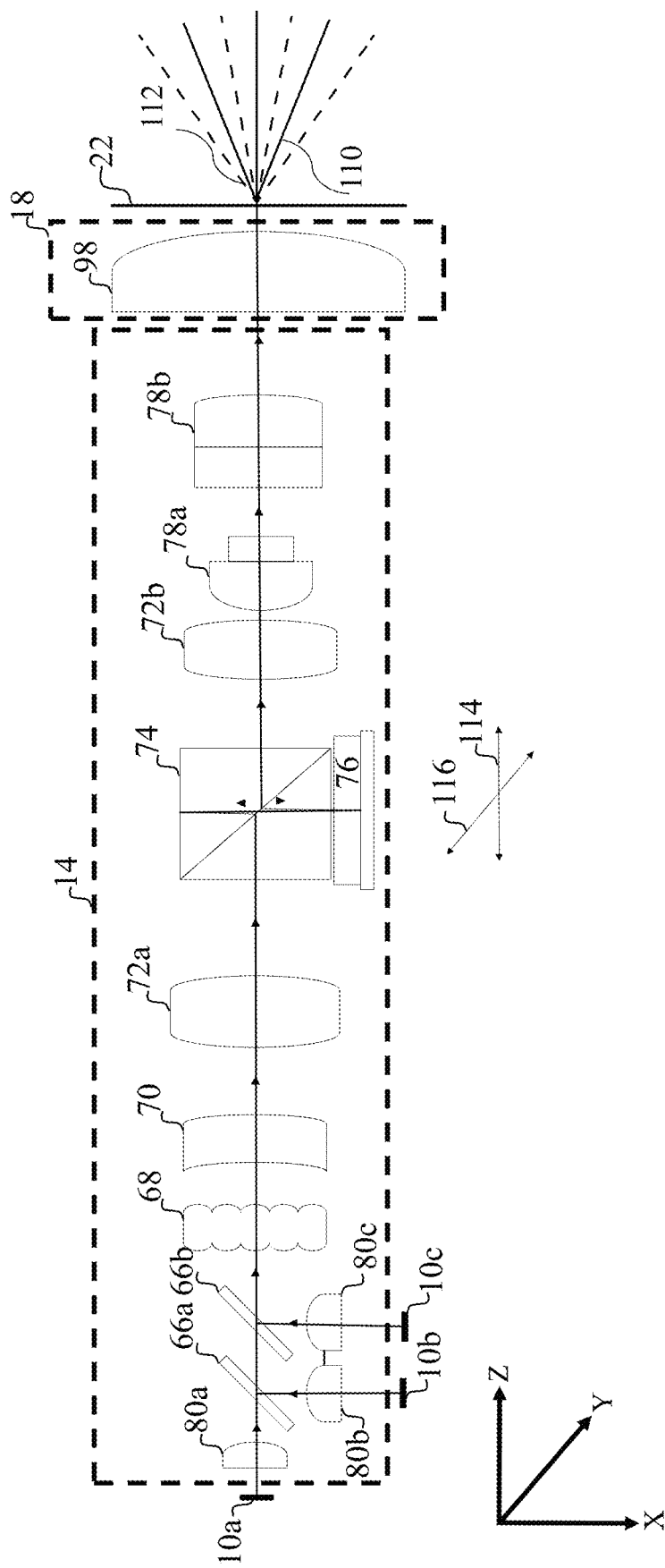
FIG. 2C illustrates a configuration of a multiplexed light field projector with a projection optical system arrangement and a collimating optical system.

FIG. 2C illustrates an embodiment of a light field projector configuration with multiplexing. FIG. 2C illustrates a projection optical system 14 arrangement as shown and directs the light ray path to a collimating optical system 18, wherein the collimating optical system 18 is composed of a LFP lens 98. FIG. 2C also includes a display optical system 22. Projection optical system 14 and collimating optical system 18 are housed in the light field projector body, as illustrated in FIG. 1. In this embodiment, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72a, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72b and through to a series of projection doublets 78a and 78b. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. In this embodiment, the pixel forming device 76 can be, for example, a Liquid Crystal on Silicon (LCOS) panel, a digital micromirror device (DMD), or other display device is manipulated using a multiplexing actuator, or other suitable component or multiplexing method. As illustrated in FIG. 2C, to achieve multiplexing the pixel forming device 76 may be shifted along a first axis 114, a second axis 116 or a combination of both axes using a multiplexing device, such as a multiplexing actuator. The manipulation of the position of the pixel forming device 76 is synchronized with input images such that the movement of the device increases the resolution in one- or two-dimensions.

Figure 2D:
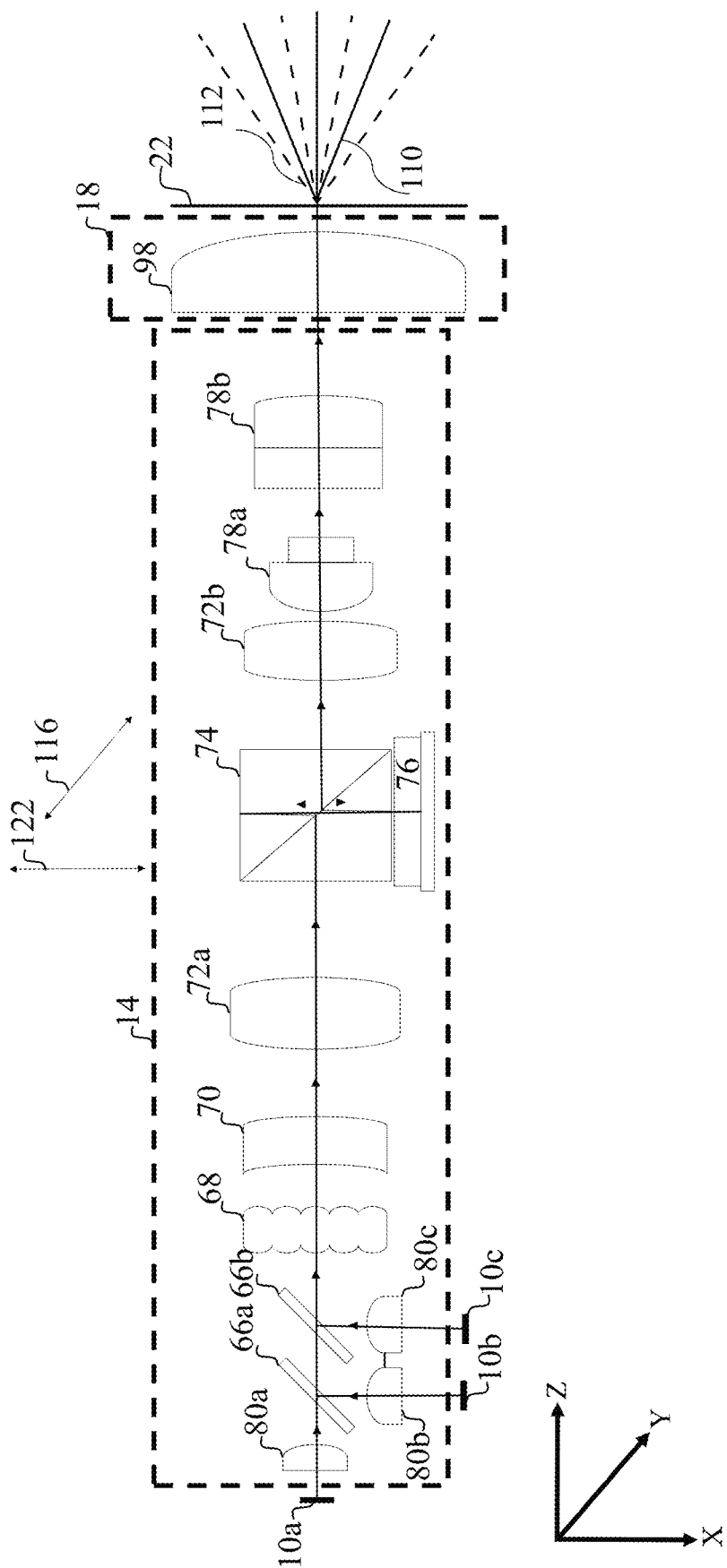
FIG. 2D illustrates a configuration of a multiplexed light field projector with a projection optical system arrangement and a collimating optical system.

FIG. 2D illustrates an embodiment of a light field projector configuration with multiplexing. FIG. 2D illustrates a projection optical system 14 arrangement which directs the light ray path to a collimating optical system 18, wherein the collimating optical system 18 is composed of a LFP lens 98. FIG. 2D also includes a display optical system 22. Projection optical system 14 and collimating optical system 18 are housed in the light field projector body, as illustrated in FIG. 1. In this embodiment, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72a, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72b and through to a series of projection doublets 78a and 78b. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. In the embodiment, multiplexing is achieved by manipulating the angle and/or position of folded prism 74 using a multiplexing device such as a multiplexing actuator along a second axis 116, a third axis 122, or along both axes in synchronization with the input frame to increase the effective resolution in one, or both directions. The multiplexing actuator may be, but is not limited to, a piezo-electric actuator, an electrothermal actuator, a magnetic actuator, an electrostatic actuator, or a shape memory alloy-based actuator.

Figure 2E:
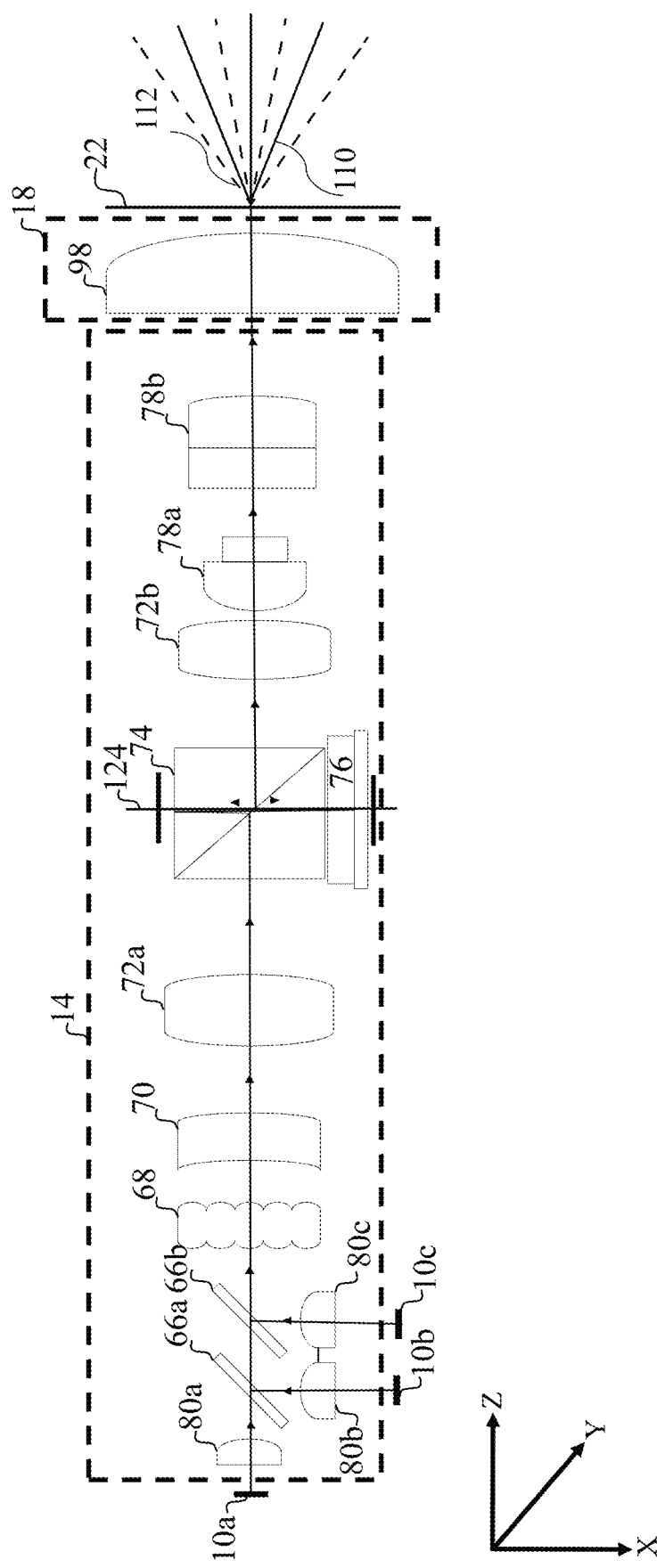
FIG. 2E illustrates a configuration of a multiplexed light field projector with a projection optical system arrangement and a collimating optical system.

FIG. 2E illustrates an embodiment of a light field projector configuration with multiplexing. FIG. 2E illustrates a projection optical system 14 which directs the light ray path to a collimating optical system 18, wherein the collimating optical system 18 is composed of a LFP lens 98. FIG. 2E also includes a display optical system 22. Projection optical system 14 and collimating optical system 18 are housed in the light field projector body, as illustrated in FIG. 1. In this embodiment, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72a, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72b and through to a series of projection doublets 78a and 78b. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. FIG. 2E illustrates an embodiment of a disclosed light field projector configuration with multiplexing. In this embodiment, a multiplexing device 124 is in line with the folded prism 74 and a pixel forming device 76. The multiplexing device 124 is a mechanical device that shifts the position and/or angle of, in this case, folded prism 74, to shift the light path and create one or more additional light field from the projector. Controlled actuation of the multiplexing device 124 enables the formation of the additional light field at a speed and with angular resolution exceeding that of the human eye such that the actuation is undetectable to the viewer. This allows both components to be shifted in 1D or 2D by the multiplexing device 124 in the x, y, or z directions or any combination thereof, which may be, but is not limited to, a piezo-electric actuator, an electrothermal actuator, magnetic actuator, electrostatic actuator, or shape memory alloy-based actuator.

Figure 2F:
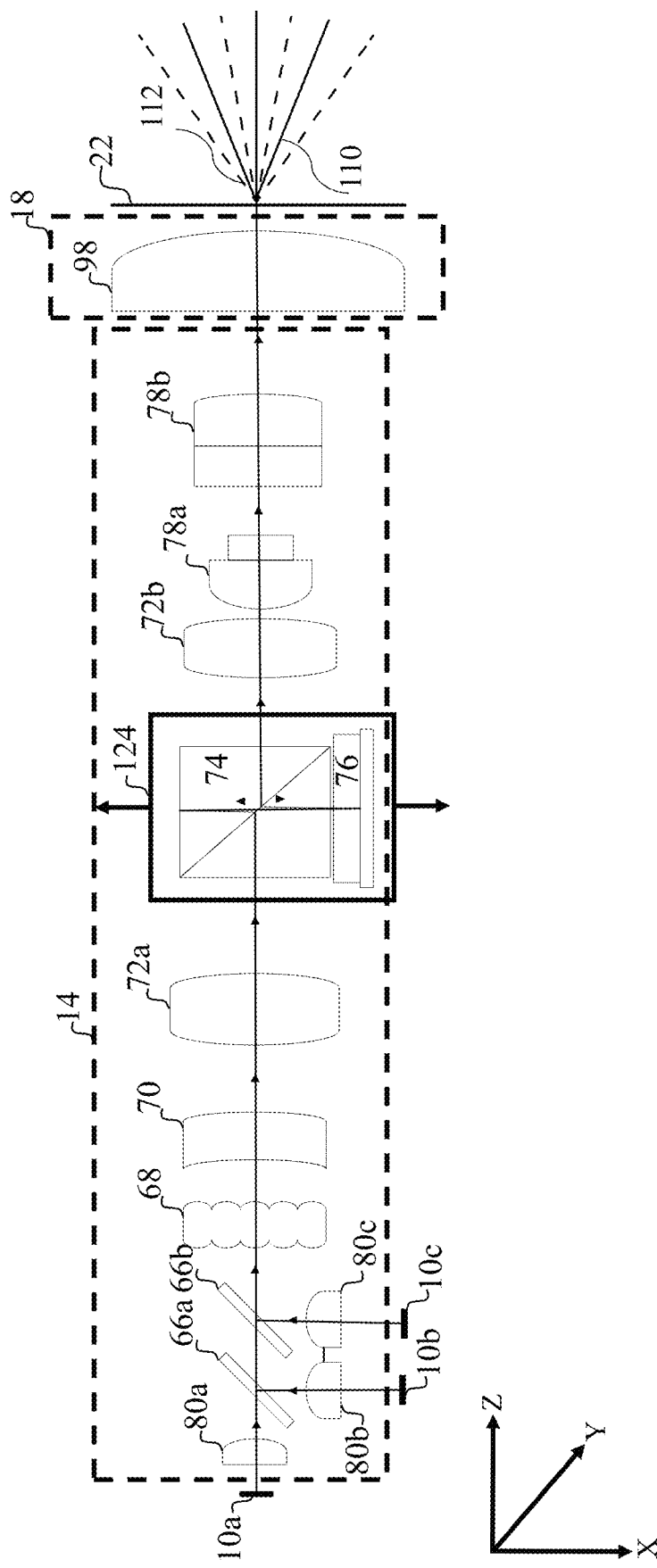
FIG. 2F illustrates a configuration of a multiplexed light field projector with a projection optical system arrangement and a collimating optical system.

FIG. 2F illustrates an embodiment of a light field projector configuration with multiplexing. FIG. 2F illustrates a projection optical system 14 arrangement as shown and directs the light ray path to a collimating optical system 18, wherein the collimating optical system 18 is composed of a LFP lens 98. FIG. 2F also includes a display optical system 22. Projection optical system 14 and collimating optical system 18 are housed in the light field projector body, as illustrated in FIG. 1. In this embodiment, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10*a*, 10*b*, 10*c* are then directed through a series of dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. In this embodiment, a multiplexing device 124 is a multiplexing actuator which is connected to the folded prism 74 and a pixel forming device 76 to shift these components an expected amount to increase the effective resolution of the projection device in the x, y or z directions or any combination thereof.

Figure 2G:
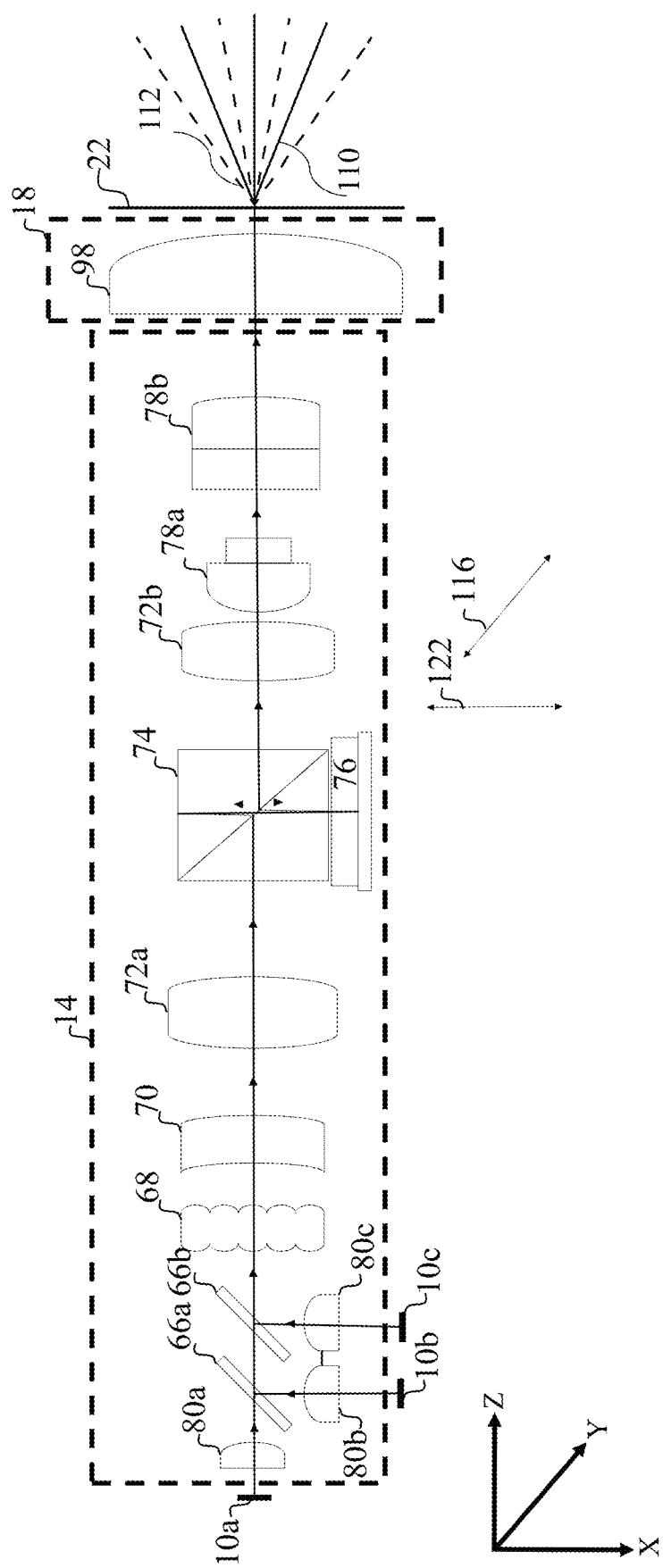
FIG. 2G illustrates a configuration of a multiplexed light field projector with a projection optical system arrangement and a collimating optical system.

FIG. 2G illustrates an embodiment of a light field projector configuration with multiplexing. FIG. 2G illustrates a projection optical system 14 arrangement as shown and directs the light ray path to a collimating optical system 18, wherein the collimating optical system 18 is composed of a LFP lens 98. FIG. 2G also includes a display optical system 22. Projection optical system 14 and collimating optical system 18 are housed in the light field projector body, as illustrated in FIG. 1. In this embodiment, light emitted from a green LED 10*a*, red LED 10*b*, and blue LED 10*c* is directed to a projection optical system 14. The projection optical system 14 shown has a series of three plano-convex lenses 80*a*, 80*b*, 80*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. In this configuration the display optical system 22 may be any suitable display optical component including, but not limited to, a single lens, a lens array, a pinhole array, a metasurface, or a metalens. FIG. 2G illustrates an embodiment of a light field projector configuration with multiplexing. In this embodiment, the second bi-convex lens 72*b* is manipulated using a multiplexing actuator, or other suitable component or multiplexing method. In particular, the second bi-convex lens 72*b* can be configured such that it may be shifted, for example, along a second axis 116, a third axis 122, or in any combination, with an equivalent frame per shifted end point to increase the effective resolution of the output device. In another embodiment, the second bi-convex lens 72*b* may be fabricated from a material which can change refractive index in response to an applied electric field and connected to a multiplexing device that can change an electric field applied to second bi-convex lens 72*b*. This would allow shifting of the focal point of element 72*b* by a calibrated amount, at a frequency equivalent to the input frame rate to increase the effective resolution. For an embodiment where the multiplexing device is achieved by a deformation of an optical component, the optical component can be made of a deformable or elastic material wherein the deformation changes the curvature of the lens surface. Deformable or elastic materials that are suitable to form the optical component include, but are not limited to, a polymer consisting of layers of elastomer poly(ethylene-octene) and a glassy polymer polycarbonate; two immiscible liquids, for example ultrapure water and poly-dimethyl-siloxane; and a silicone elastomer lens bonded to a dielectric elastomer actuator. Deformation can be effected by applying a physical force to the optical component to deform the material. This can be done by but not limited to a piezoelectric transducer, thermal driving, liquid crystals, electrowetting, tuneable acoustic gradient index of refraction, and dielectric elastomer actuation. In the simplest application the deformation can be binary, such that a first configuration has a first lens curvature and a second configuration has a second curvature. Any power supply that can be connected to the multiplexing device to generate an appropriate voltage can be used in combination with a deformable optical component.

In another embodiment multiplexing is achieved by a change in refractive index of an optical component. In a first case, the material of the optical component is subjected to an applied voltage resulting in a change in its refractive index. The refractive index variation can be controlled in a calibrated manner based on the applied voltage. The change in refractive index corresponds to a refraction which further results in an angular output differing from the original output. In the simplest application, the change in the refractive index of the optical component can be binary or calibrated binary, wherein the application of a first voltage produces a first refractive index and the application of a second voltage produces a second refractive index. In another case, a voltage differential can be applied to the material of the optical component, such that material has a resistive property. In this case, a voltage drop occurs between two electrodes attached to the optical component resulting in a refractive gradient in the material. This can be beneficial as a change in angular output can be achieved across the surface, which provides an angular gradient for the pixels incident upon the optical component. Suitable optical component materials can be semiconductor materials with electrically tunable optical properties which may include, but are not limited to, a molybdenum disulphide ($MoS_2$) monolayer; layers of tantalum pentoxide ($Ta_2O_5$) and silicon dioxide ($SiO_2$); and a metasurface, for example, an indium tin oxide (ITO) metasurface with aluminum gates, a metasurface coupled with graphene and a dielectric spacer made of amorphous silicon, and a van der Waals heterostructure composed of $hBN/MoS_2/hBN$. Any power supply that can be connected to the multiplexing device to generate an appropriate voltage can be used in combination with an optical component with a modifiable refractive index.

Figure 2H:
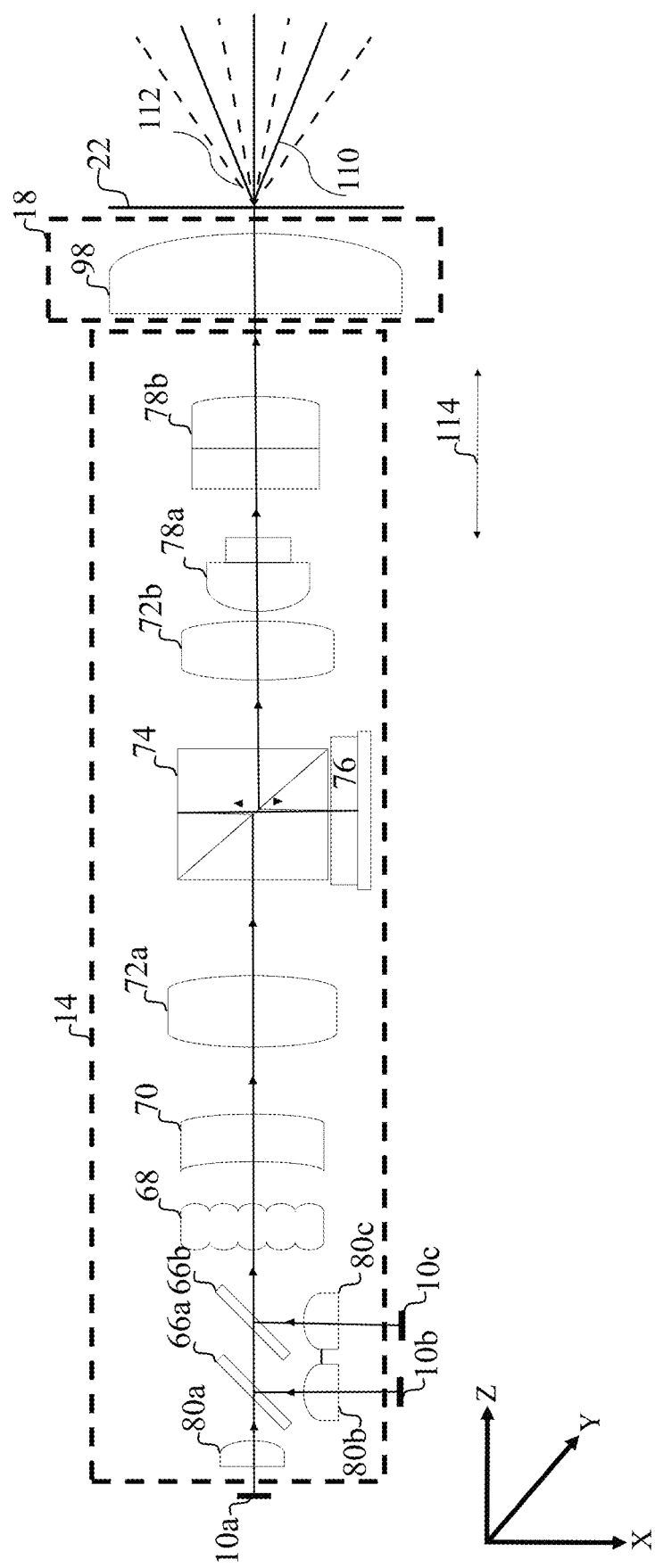
FIG. 2H illustrates a configuration of a multiplexed light field projector with a projection optical system arrangement and a collimating optical system.

FIG. 2H illustrates an embodiment of a light field projector configuration with multiplexing. FIG. 2H illustrates a projection optical system 14 arrangement as shown and directs the light ray path to a collimating optical system 18, wherein the collimating optical system 18 is composed of a LFP lens 98. FIG. 2H also includes a display optical system 22. Projection optical system 14 and collimating optical system 18 are housed in the light field projector body, as illustrated in FIG. 1. In this embodiment, light emitted from a green LED 10*a*, red LED 10*b*, and blue LED 10*c* is directed to a projection optical system 14. The projection optical system 14 shown has a series of three plano-convex lenses 80*a*, 80*b*, 80*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. In this configuration, the display optical system 22 may be any suitable display optical component including, but not limited to, a single lens, a lens array, a pinhole array, a metasurface, or a metalens. FIG. 2H illustrates a multiplexing technique wherein the position of the first projection doublet 78*a*, or second projection doublet 78*b* is manipulated along a first axis 114 by a multiplexing device. In an example, moving one of the projection doublets would change the focus point of the projection system and increase or decrease the magnification of the projector image. For example, if the movement of element 78*a* increases the image size by some pixel/4 or pixel/2 integer, in correspondence with the input frame, a multiplexing effect in both dimensions would occur, increasing the effective resolution. Due to the slight movement desired, this may be achieved by using a small piezoelectric transducer.

Figure 2I:
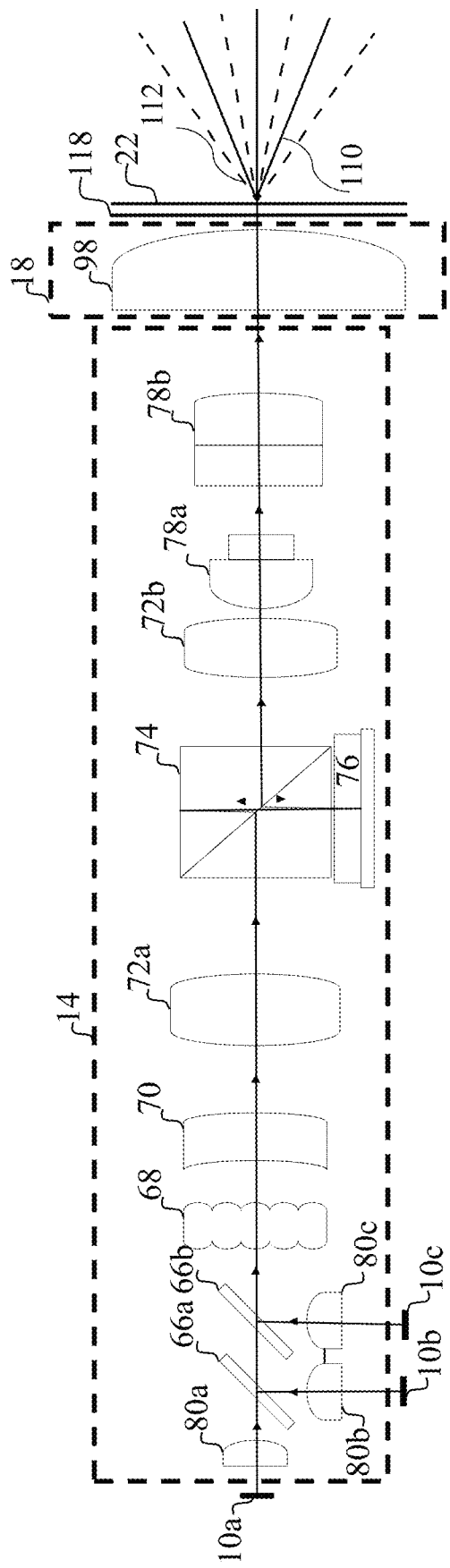
FIG. 2I illustrates a configuration of a multiplexed light field projector with a projection optical system arrangement and a collimating optical system.

FIG. 2I illustrates an embodiment of a light field projector configuration with multiplexing. FIG. 2I illustrates a projection optical system 14 arrangement as shown in FIG. 2I, directing the light ray path to a collimating optical system 18. FIG. 2I also includes an additional optical component herein referred to as the multiplexing layer 118 positioned directly before the display optical system 22. Projection optical system 14 and collimating optical system 18 are housed in the light field projector body, as illustrated in FIG. 1. In this embodiment, light emitted from a green LED 10*a*, red LED 10*b*, and blue LED 10*c* is directed to a projection optical system 14. The projection optical system 14 shown has a series of three plano-convex lenses 80*a*, 80*b*, 80*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the LFP lens 98. The ray path continues to the multiplexing layer then to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. Multiplexing may be achieved using one or more multiplexing devices as described in other embodiments, but additionally in this configuration multiplexing may be achieved by changing the index of refraction of the additional multiplexing layer 118. This is achieved as the multiplexing layer 118, capable of the Kerr effect, is a component made of a material in which the refractive index of the material can be adjusted in response to an applied electric field. Various materials are known that are capable of the quadratic electro-optic effect and use of an optical component of one of these materials in combination with a device capable of creating the electric field required to adjust the material refractive index can achieve the same or similar multiplexed image. This can be achieved in one dimension and/or two dimensions.

Figure 3A:
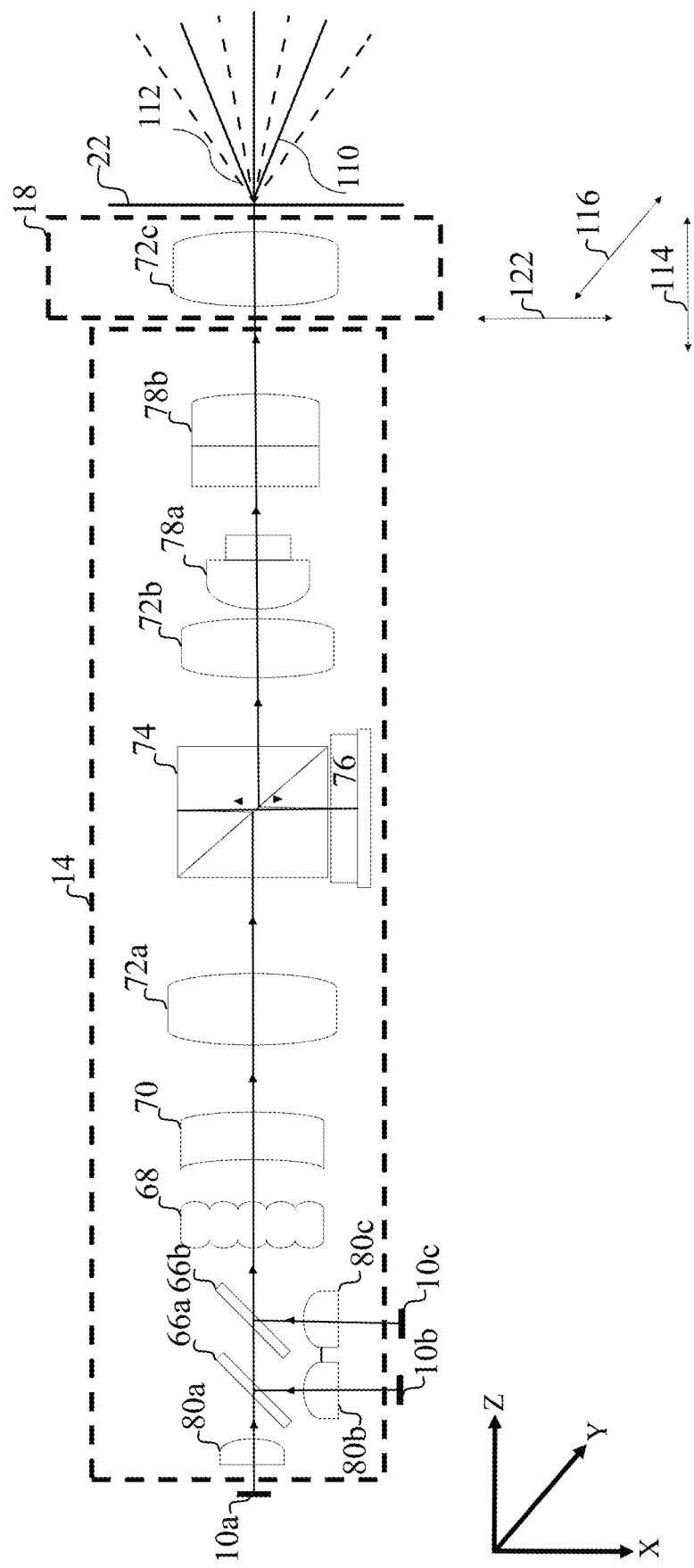
FIG. 3A illustrates an alternative configuration of a multiplexed light field projector with a projection optical system arrangement and an alternative collimating optical system.

FIG. 3A illustrates an embodiment of a light field projector configuration with multiplexing. This configuration includes a series of optical systems, with the projection optical system 14 arrangement as shown and directing the light ray path to a collimating optical system 18, wherein the collimating optical system 18 is composed of a bi-convex lens 72c. Projection optical system 14 and collimating optical system 18 are housed in the light field projector body, as illustrated in FIG. 1. In this configuration, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of two dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72a, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72b and through to a series of projection doublets 78a and 78b. The ray path then continues to the collimating optical system 18, which in this embodiment comprises another bi-convex lens 72c through to a display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens.

Multiplexing can be achieved by shifting the bi-convex lens 72c along a second axis 116 or a third axis 122 using a multiplexing actuator programmed to shift the incoming pixels by some quarter- or half-integer pixel value corresponding to an equivalent frame to create additional pixels in one direction based on the design. Multiplexing can also be achieved by shifting the bi-convex lens 72c along a second axis 116 and a third axis 122 by some quarter- or half-integer pixel value in each direction, where the end of each movement corresponds to a frame, increasing the effective pixels in both directions. Multiplexing may also be achieved by deformation of the bi-convex lens 72c or manipulating the refractive index of the material to achieve an effective resolution increase in both directions. Additionally, the bi-convex lens 72c can be moved along first axis 114 toward the positive z-direction to slightly increase the divergence of the pixels in the projector image, increasing the size of the projector image at the image plane by an amount to cause an equivalent quarter- or half-integer pixel value shift. Similarly, the bi-convex lens 72c may be moved in the negative z-direction to decrease the divergence, creating a smaller projector image at the imaging plane depending on the space constraints of the design. Other multiplexing techniques can also include manipulating the pixel forming device 76, which can be, for example, a Liquid Crystal on Silicon (LCOS) panel, a digital micromirror device (DMD), or other display device using a multiplexing actuator. As illustrated in FIG. 3A, the pixel forming device 76 may be shifted along a first axis 114, a second axis 116 or a combination of both axes. The manipulation of the position of the pixel forming device 76 is synchronized with input images such that the movement of the device increases the resolution in one- or two-dimensions. Multiplexing may also be achieved by manipulating the folded prism 74 using a multiplexing actuator along a second axis 116, a third axis 122, or along both axes in synchronization with the input frame to increase the effective resolution in one, or both directions.

The projector configuration as illustrated in FIG. 3A may also be multiplexed by manipulating the second bi-convex lens 72b using a multiplexing actuator, or other suitable component or multiplexing method. In an example, the second bi-convex lens 72b may be shifted along a second axis 116, a third axis 122, or any one of the first, second, or third axes 114, 116, 122 in any combination, with an equivalent frame per shifted end point to increase the effective resolution of the output device. Second bi-convex lens 72b may also be fabricated with a crystalline or other material which changes refractive index in response to an applied electric field, or the Kerr effect, and in connection with a device which can controllably apply the electric desired to create the desired change in refractive index. This would allow shifting of the focal point of element 72b by a calibrated amount, at a frequency equivalent to the input frame rate to increase the effective resolution. An additional multiplexing technique illustrated in FIG. 3A is one wherein the position of the first projection doublet 78a, or second projection doublet 78b is manipulated along a first axis 114. Moving one of the projection doublets 78a, 78b, or changing the distance between the projection doublets 78a, 78b along first axis 114, would change the focus point of the projection system and increase or decrease the magnification of the projector image. For example, if the movement of projection double 78a increases the image size by some pixel/4 or pixel/2 integer, in correspondence with the input frame, a multiplexing effect in both dimensions would occur, increasing the effective resolution. Due to the slight movement desired, this movement may be achieved, for example, by using a small piezoelectric transducer.

Figure 3B:
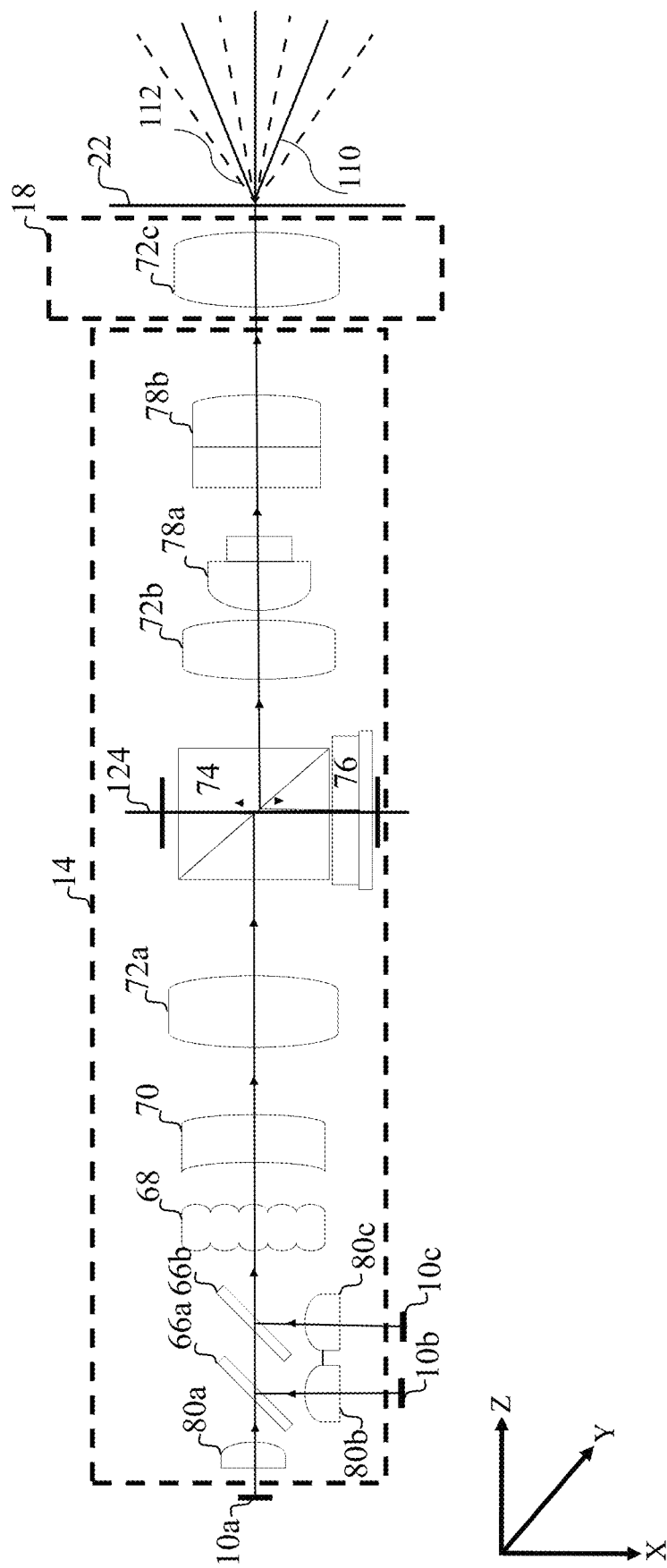
FIG. 3B illustrates an alternative configuration of a multiplexed light field projector with a projection optical system arrangement and an alternative collimating optical system.

FIG. 3B illustrates an embodiment of a light field projector configuration with multiplexing. This configuration includes a series of optical systems, with the projection optical system 14 arrangement as shown and directing the light ray path to a collimating optical system 18, wherein the collimating optical system 18 is composed of a bi-convex lens 72c. Projection optical system 14 and collimating optical system 18 are housed in the light field projector body, as illustrated in FIG. 1. In this configuration, light emitted from a green LED 10a, red LED 10b, and blue LED 10c is directed to a projection optical system 14. The projection optical system 14 shown has a series of three plano-convex lenses 80a, 80b, 80c, one for each of LEDs 10a, 10b, 10c, respectively, through which light from the respective LEDs is directed. The three individual ray paths originating from the three LEDs 10a, 10b, 10c are then directed through a series of two dichroic mirrors 66a, 66b and merged to form a single ray path. Dichroic mirror 66a allows transmission of green light from LED 10a and reflection of red light transmitted from LED 10b. Similarly, dichroic mirror 66b allows transmission of green and red light from LEDs 10a and 10b, and reflection of blue light transmitted from LED 10c. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises another bi-convex lens 72*c* through to a display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. In this embodiment, a multiplexing device 124 is a multiplexing actuator in line with and connected to the folded prism 74 and pixel forming device 76. This allows both components to be shifted in one, two, or three dimensions by the multiplexing device 124 in the x, y or z directions or any combination thereof. The multiplexing device 124 can be, but is not limited to, a piezo-electric actuator, an electrothermal actuator, a magnetic actuator, an electrostatic actuator, or a shape memory alloy-based actuator.

Figure 3C:
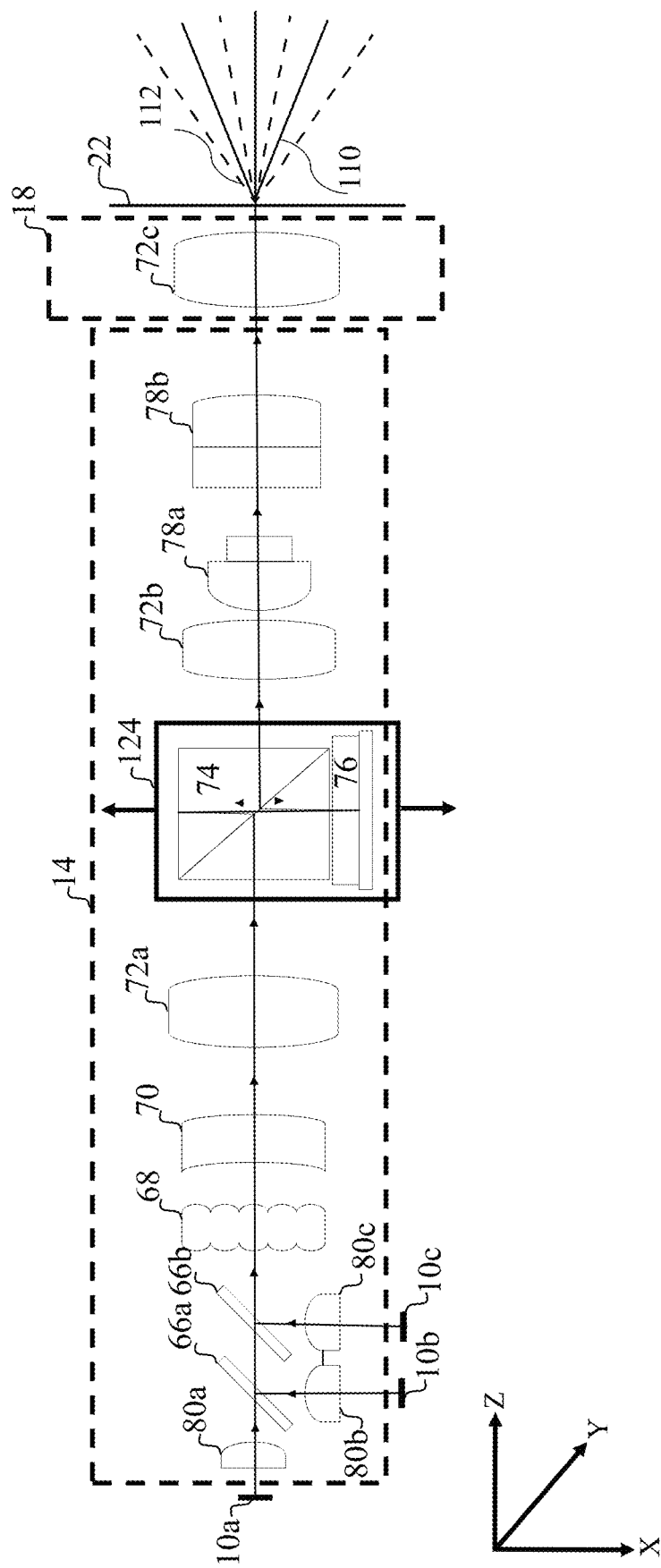
FIG. 3C illustrates an alternative configuration of a multiplexed light field projector with a projection optical system arrangement and an alternative collimating optical system.

FIG. 3C illustrates an embodiment of a light field projector configuration with multiplexing. This configuration includes a series of optical systems, with the projection optical system 14 arrangement as shown and directing the light ray path to a collimating optical system 18, wherein the collimating optical system 18 is composed of a bi-convex lens 72*c*. Projection optical system 14 and collimating optical system 18 are housed in the light field projector body, as illustrated in FIG. 1. In this configuration, light emitted from a green LED 10*a*, red LED 10*b*, and blue LED 10*c* is directed to a projection optical system 14. The projection optical system 14 shown has a series of three plano-convex lenses 80*a*, 80*b*, 80*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of two dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises another bi-convex lens 72*c* through to a display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. In this embodiment, a multiplexing device 124 is a multiplexing actuator placed adjacent the folded prism 74 and a pixel forming device 76 to shift these components in the x, y or z directions or any combination thereof, an expected amount to achieve the multiplexed light field output 112 to increase the effective resolution of the projection device.

Figure 3D:
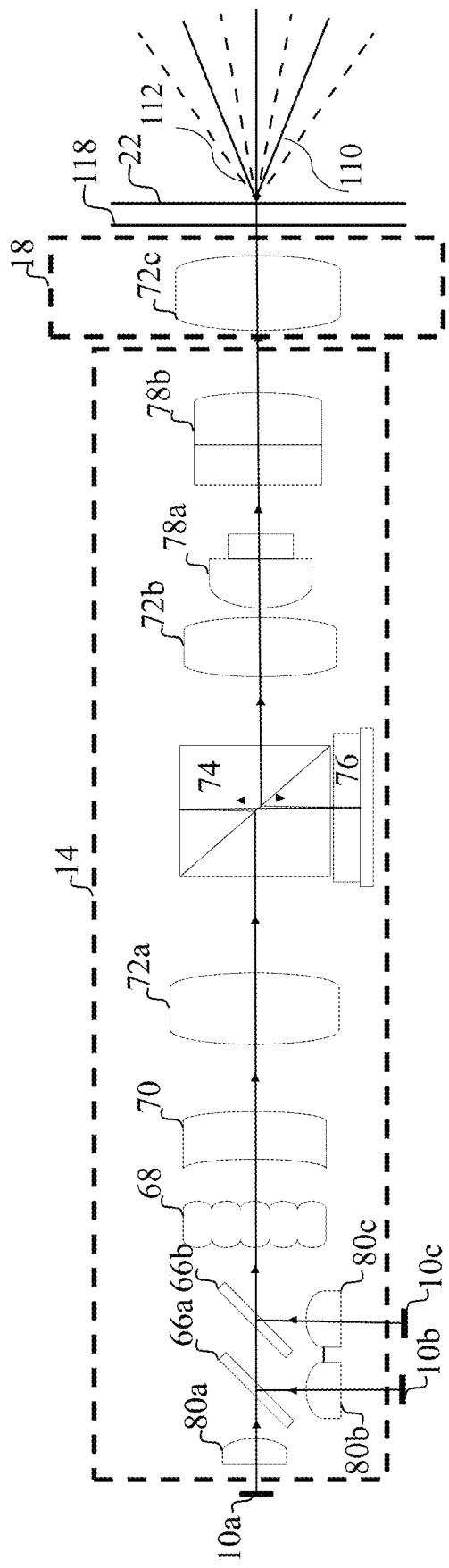
FIG. 3D illustrates an alternative configuration of a multiplexed light field projector with a projection optical system arrangement and an alternative collimating optical system.

FIG. 3D illustrates an embodiment of a light field projector configuration with multiplexing. This configuration includes a series of optical systems, with the projection optical system 14 arrangement as shown and directing the light ray path to a collimating optical system 18, wherein the collimating optical system 18 is composed of a bi-convex lens 72*c*. FIG. 3D also includes a multiplexing layer 118 positioned directly before the display optical system 22. The projection optical system 14 and collimating optical system 18 are housed in the light field projector body, as illustrated in FIG. 1. FIG. 3D also includes a multiplexing layer 118 positioned directly before the display optical system 22. In this configuration, light emitted from a green LED 10*a*, red LED 10*b*, and blue LED 10*c* is directed to a projection optical system 14. The projection optical system 14 shown has a series of three plano-convex lenses 80*a*, 80*b*, 80*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of two dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises another bi-convex lens 72*c*. The multiplexed light field output 112 projected from the display optical system 22 comprises two individual light field images, shown as a first set of solid-line rays and a second set of dashed-line rays, which together make up the multiplexed light field output 112. In this configuration the display optical system 22 may be any suitable display optical component including, but not limited to, a single lens, a lens array, a pinhole array, a metasurface, or a metalens. In this configuration, multiplexing may be achieved by changing the index of refraction of the additional multiplexing layer 118. A multiplexing layer 118, which serves as the multiplexing device in this configuration, may be, for example, a form of optical modulator with a gate tunable response, a metamaterial with period and symmetry tunable self-assembly nanopatterns, or a multinanolayered tunable material. In this example, the light path redirection can be achieved in one or two dimensions.

Figure 4A:
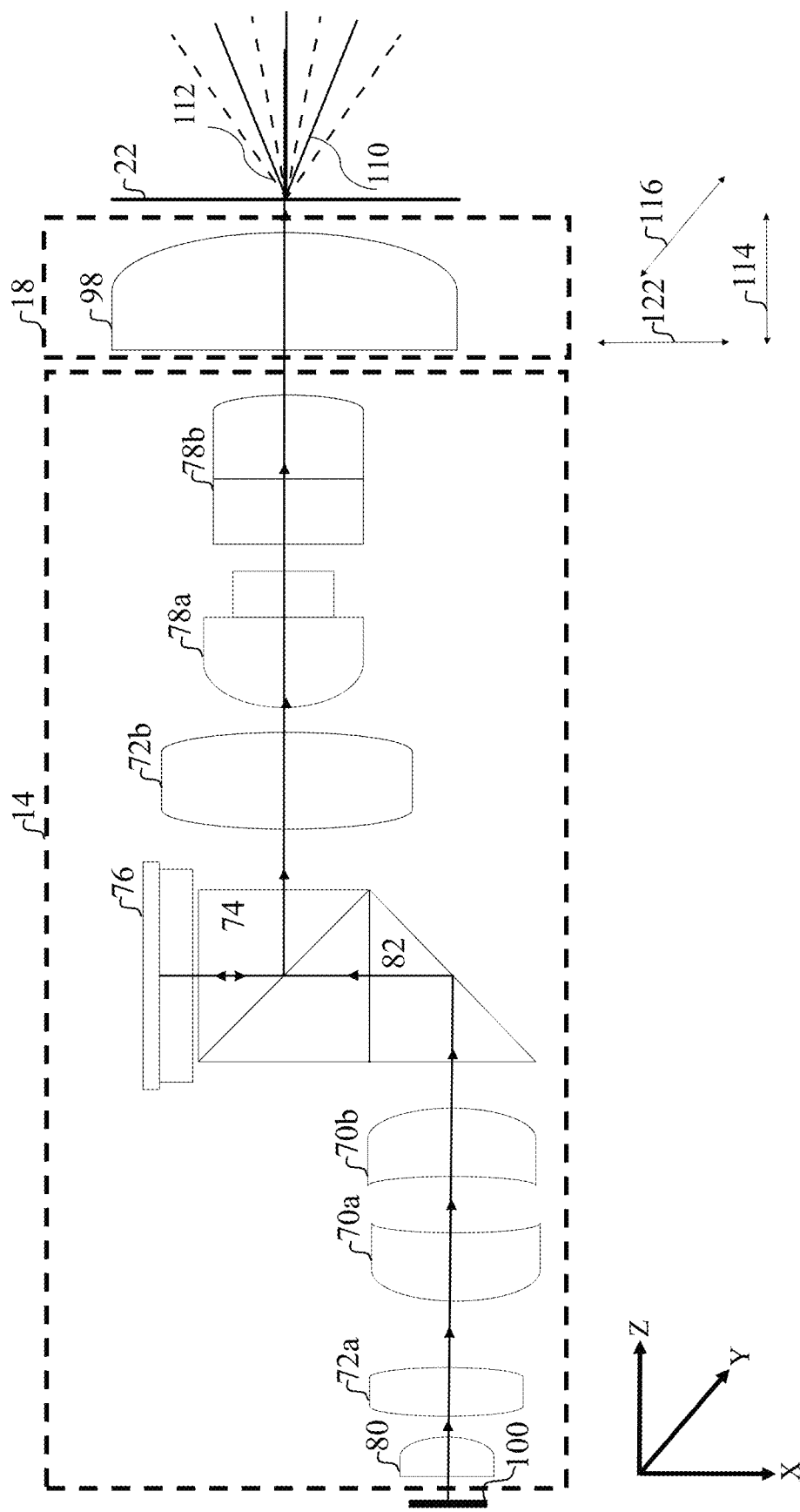
FIG. 4A illustrates an alternative configuration of a projection optical system arrangement and a collimating optical system.

FIG. 4A illustrates an alternative configuration of a projection optical system 14 and a collimating optical system 18 which are incorporated and housed in a light field projector body, as illustrated in FIG. 1. In this configuration, light emitted from the light source in LED package 100 is directed to the projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least three LEDs, one each of green, red, and blue. The projection optical system 14 is composed of an illumination optical system which receives light from the LED package 100. First, light is received from LED package 100 to plano-convex lens 80. The ray path is then directed to a first bi-convex lens 72*a* followed by a pair of meniscus lenses 70*a*, 70*b*, and then through to a single prism 82. The ray path through prism 82 is then directed to a folded prism 74 and a pixel forming device 76, which is preferably a digital micromirror device (DMD) then back through the folded prism 74. The light ray path continues through a magnifying optical component having a second bi-convex lens 72*b* followed by a series of projection doublets 78*a*, 78*b*. The ray path then continues to the collimating optical system 18, which, in this embodiment, is a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. In this configuration the display optical system 22 can be any suitable display optical component including, but not limited to, a single lens, a lens array, a pinhole array, a metasurface, or a metalens. Multiplexing can be achieved with a multiplexing device by shifting the LFP lens 98 along a second axis 116 or a third axis 122 using a multiplexing actuator programmed to shift the incoming pixels by some quarter- or half-integer pixel value corresponding to an equivalent frame to create additional pixels in one direction based on the design. Multiplexing can also be achieved by shifting the LFP lens 98 along a second axis 116 and a third axis 122 by some quarter- or half-integer pixel value in each direction, where the end of each movement corresponds to a frame, increasing the effective pixels in both directions. Multiplexing may also be achieved by deformation of the LFP lens 98 or manipulating the refractive index of the material to achieve an effective resolution increase in both directions. Additionally, the LFP lens 98 can be moved along first axis 114 toward the positive z-direction to slightly increase the divergence of the pixels in the projector image, increasing the size of the projector image at the image plane by an amount to cause an equivalent quarter- or half-integer pixel value shift. Similarly, the LFP lens 98 may also be moved in the negative z-direction to decrease the divergence, creating a smaller projector image at the imaging plane depending on the space constraints of the design.

Multiplexing techniques also include manipulating the pixel forming device 76 can be, for example, a Liquid Crystal on Silicon (LCOS) panel, a digital micromirror device (DMD), or other display device using a multiplexing actuator, or other suitable component or multiplexing method. As illustrated in FIG. 4A, the pixel forming device 76 may be shifted along a first axis 114, a second axis 116 or a combination of both axes. The manipulation of the position of the pixel forming device 76 is synchronized with input images such that the movement of the device increases the resolution in one- or two-dimensions. Multiplexing may also be achieved by manipulating the folded prism 74 using a multiplexing actuator along a second axis 116, a third axis 122, or along both axes in synchronization with the input frame to increase the effective resolution in one, or both directions. The projector configuration as illustrated in FIG. 4A may be multiplexed by manipulating the second bi-convex lens 72*b* using a multiplexing actuator, or other suitable component or multiplexing method. The second bi-convex lens 72*b* may be shifted along a second axis 116, a third axis 122, or in any combination, with an equivalent frame per shifted end point to increase the effective resolution of the output device. An equivalent embodiment would include fabricating element 72*b* with a crystalline material which changes refractive index in response to applied electric fields, or the Kerr effect. This would allow shifting of the focal point of element 72*b* by a calibrated amount, at a frequency equivalent to the input frame rate to increase the effective resolution. An additional multiplexing technique illustrated in FIG. 4A is one wherein the position of the first projection doublet 78*a*, or second projection doublet 78*b* is manipulated along a first axis 114. Moving one of the projection doublets would change the focus point of the projection system and increase or decrease the magnification of the projector image. For example, if the movement of element 78*a* increases the image size by some pixel/4 or pixel/2 integer, in correspondence with the input frame, a multiplexing effect in both dimensions would occur, increasing the effective resolution. Due to the slight movement desired, this may be achieved by using a small piezoelectric transducer.

Figure 4B:
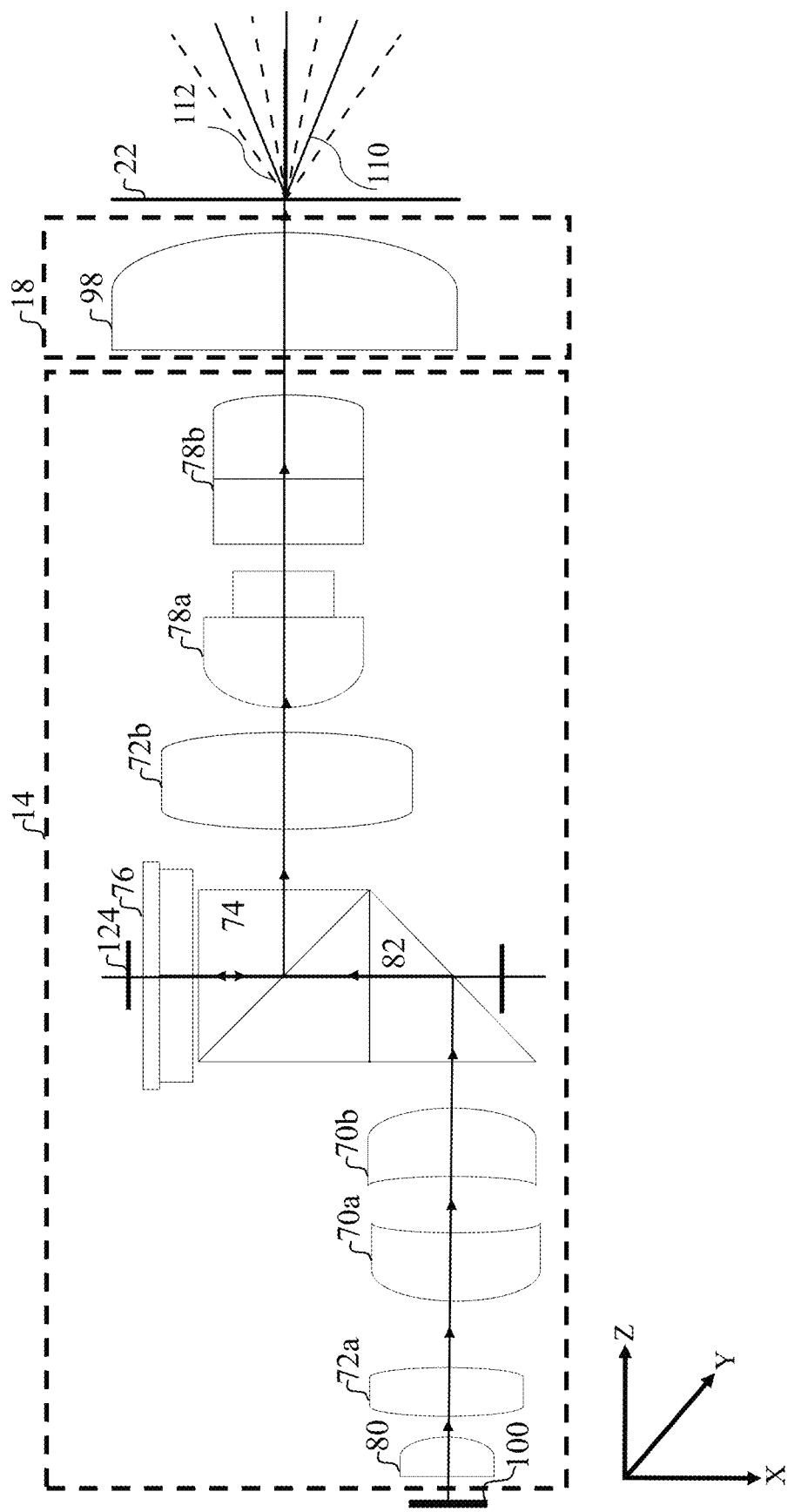
FIG. 4B illustrates an alternative configuration of a projection optical system arrangement and a collimating optical system.

FIG. 4B illustrates an alternative configuration of a projection optical system 14 and a collimating optical system 18 which are incorporated and housed in a light field projector body, as illustrated in FIG. 1. In this configuration, light emitted from the light source in LED package 100 is directed to the projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least three LEDs, one each of green, red, and blue. The projection optical system 14 is composed of an illumination optical system which receives light from the LED package 100. First, light is received from LED package 100 to plano-convex lens 80. The ray path is then directed to a first bi-convex lens 72*a* followed by a pair of meniscus lenses 70*a*, 70*b*, and then through to a single prism 82. The ray path through prism 82 is then directed to a folded prism 74 and pixel forming device 76, which is preferably a digital micromirror device (DMD) then back through the folded prism 74. The light ray path continues through a magnifying optical component having a second bi-convex lens 72*b* followed by a series of projection doublets 78*a*, 78*b*. The ray path then continues to the collimating optical system 18, which, in this embodiment, is a LFP lens 98. The LFP lens 98 functions to collimate the incoming light. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. In this embodiment, a multiplexing device 124 is in line with the single prism 82, the folded prism 74, and pixel forming device 76. This allows both components to be shifted in 1D or 2D by the multiplexing device 124, in the x, y, or z directions or any combination thereof, which may be, but is not limited to, a piezo-electric actuator, an electrothermal actuator, magnetic actuator, electrostatic actuator, or shape memory alloy-based actuator.

Figure 4C:
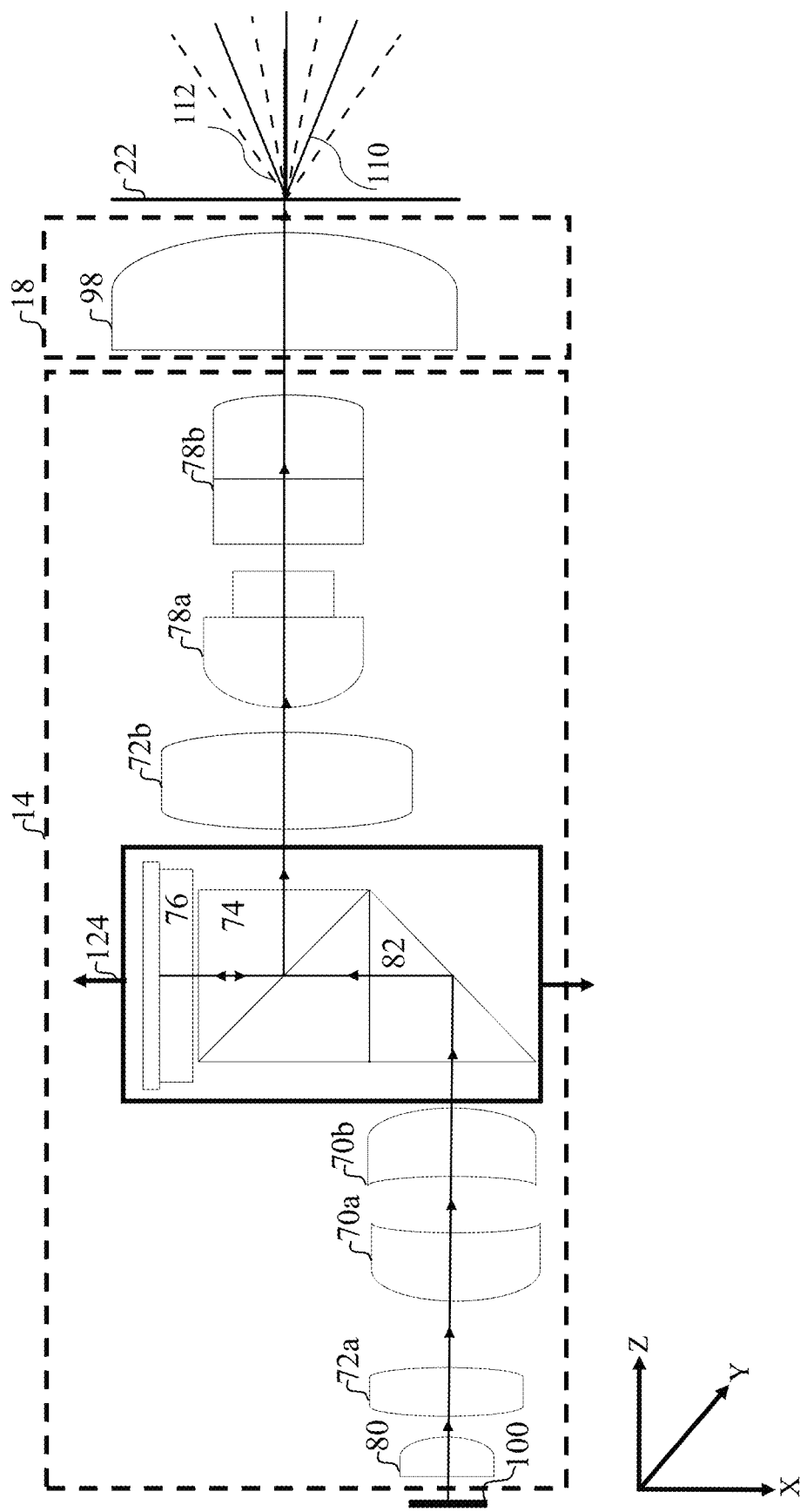
FIG. 4C illustrates an alternative configuration of a projection optical system arrangement and a collimating optical system.

FIG. 4C illustrates an alternative configuration of a projection optical system 14 and a collimating optical system 18 which are incorporated and housed in a light field projector body, as illustrated in FIG. 1. In this configuration, light emitted from the light source in LED package 100 is directed to the projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least three LEDs, one each of green, red, and blue. The projection optical system 14 is composed of an illumination optical system which receives light from the LED package 100. First, light is received from LED package 100 to plano-convex lens 80. The ray path is then directed to a first bi-convex lens 72a followed by a pair of meniscus lenses 70a, 70b, and then through to a single prism 82. The ray path through prism 82 is then directed to a folded prism 74 and pixel forming device 76, which is preferably a digital micromirror device (DMD) then back through the folded prism 74. The light ray path continues through a magnifying optical component having a second bi-convex lens 72b followed by a series of projection doublets 78a, 78b. The ray path then continues to the collimating optical system 18, which, in this embodiment, is a LFP lens 98. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. In this configuration, the display optical system 22 can be any suitable display optical component including, but not limited to, a single lens, a lens array, a pinhole array, a metasurface, or a metalens. In this embodiment, a multiplexing device 124 is connected to the single prism 82, the folded prism 74 and pixel forming device 76 to shift these components an expected amount creating the multiplexed light field output 112 to increase the effective resolution of the projection device.

Figure 4D:
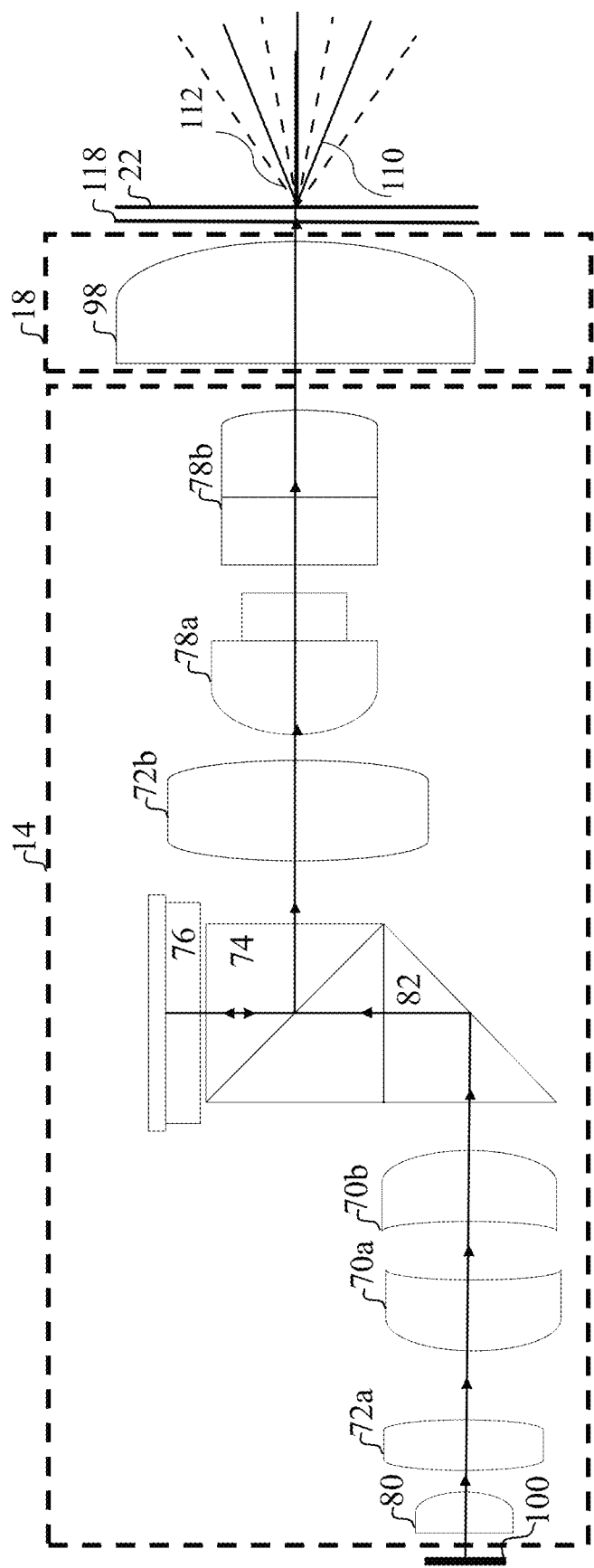
FIG. 4D illustrates an alternative configuration of a projection optical system arrangement and a collimating optical system.

FIG. 4D illustrates an alternative configuration of a projection optical system 14 and a collimating optical system 18 which are incorporated and housed in a light field projector body, as illustrated in FIG. 1. FIG. 4D also includes a multiplexing layer 118 positioned directly before the display optical system 22. In this configuration, light emitted from the light source in LED package 100 is directed to the projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least three LEDs, one each of green, red, and blue. The projection optical system 14 is composed of an illumination optical system which receives light from the LED package 100. First, light is received from LED package 100 to plano-convex lens 80. The ray path is then directed to a first bi-convex lens 72a followed by a pair of meniscus lenses 70a, 70b, and then through to a single prism 82. The ray path through prism 82 is then directed to a folded prism 74 and pixel forming device 76, which is preferably a digital micromirror device (DMD) then back through the folded prism 74. The light ray path continues through a magnifying optical component having a second bi-convex lens 72b followed by a series of projection doublets 78a, 78b. The ray path then continues to the collimating optical system 18, which, in this embodiment, is a LFP lens 98. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. In this configuration, the display optical system 22 may be any suitable display optical component including, but not limited to, a single lens, a lens array, a pinhole array, a metasurface, or a metalens. In this configuration, multiplexing may be achieved by changing the index of refraction of the additional multiplexing layer 118. This can be achieved in, for example, one dimension or two dimensions.

Figure 5A:
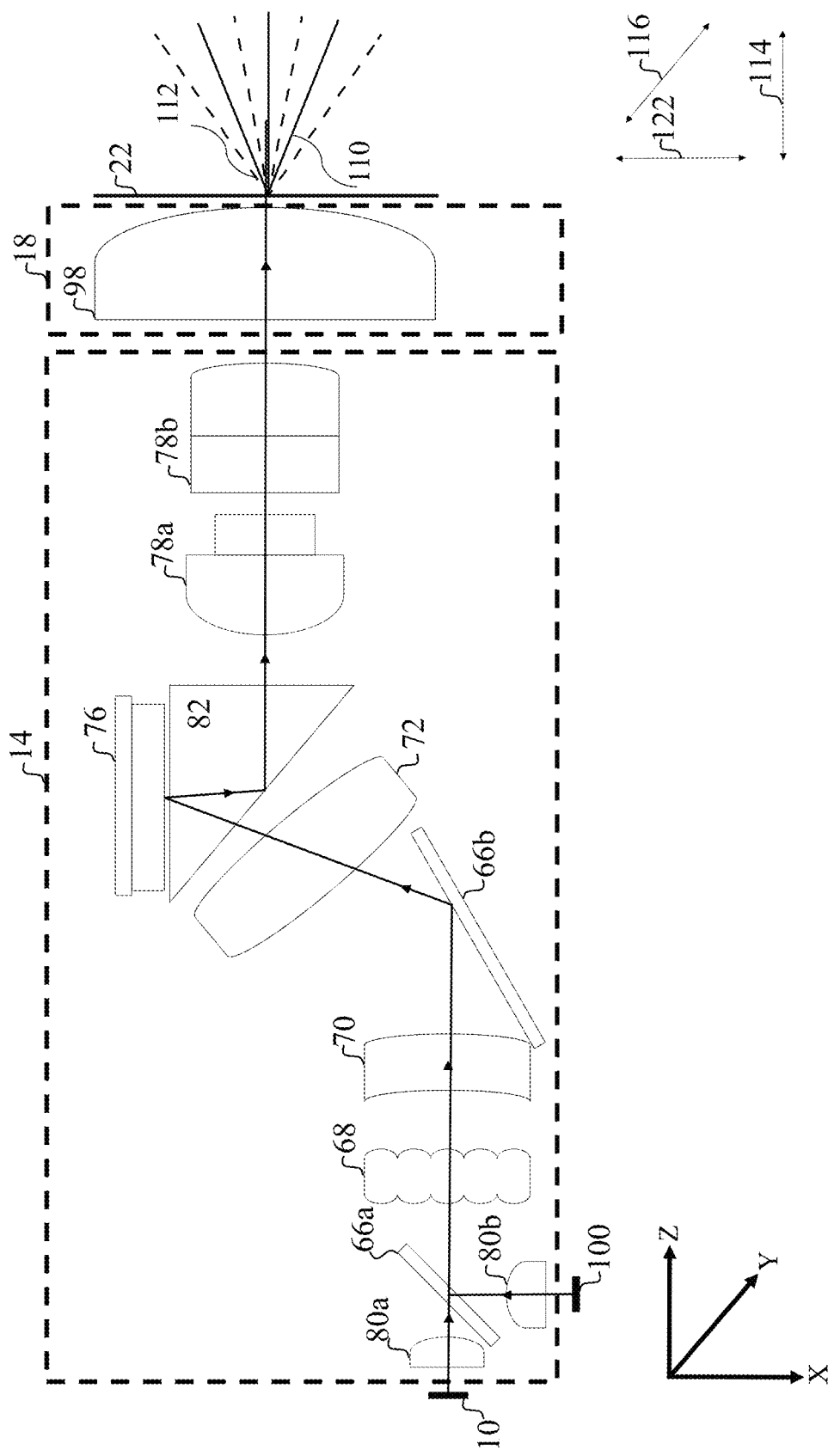
FIG. 5A illustrates an alternative configuration of a projection optical system arrangement and a collimating optical system.

FIG. 5A illustrates a configuration of the projection optical system 14 and the collimating optical system 18 which are incorporated in a light field projector body, as illustrated in FIG. 1. In this configuration, light emitted from a light emitting diode (LED) 10 or a light emitting diode (LED) package 100 is directed to projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least two LEDs. The light from LED 10 is directed through its own plano-convex lens 80a and light emitted from LED package 100 is directed to plano-convex lens 80b. The two individual ray paths are then directed to an illumination optical system beginning with dichroic mirror 66a which merges the light to form a single ray path. LED 10 can be a single color that is transmitted by dichroic mirror 66a and LED package 100 can comprise any other colors that are reflected by dichroic mirror 66a to form a single ray path. In one example case, where LED package 100 emits blue and red light and LED 10 is a green LED, dichroic mirror 66a allows transmission of green light from LED 10 and reflection of red and blue light transmitted from LED package 100. The light ray path continues in the illumination optical system through an microlens array 68 through to a meniscus lens 70, to a dichroic mirror 66b. Dichroic mirror 66b reflects green, red and blue light from LED 10 and LED package 100. The light is redirected through a bi-convex lens 72 and through to a single prism 82. The ray path through the prism 82 is directed to a pixel forming device 76, then back through the single prism 82 and through to a series of projection doublets 78. The light is redirected through a bi-convex lens 72 and through to a single prism 82. The ray path through the prism 82 is directed to a pixel forming device 76, then back through the single prism 82 and through a magnifying optical component comprising a series of projection doublets 78a, 78b. The ray path then continues to the collimating optical system 18, which in this embodiment is a LFP lens 98. The function of the LFP lens 98 in the collimating optical system 18 is for collimation of light coming from the projection optical system 14. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens. Multiplexing can be achieved using a multiplexing device by shifting the LFP lens 98 along a second axis 116 or a third axis 122 using a multiplexing actuator programmed to shift the incoming pixels by some quarter- or half-integer pixel value corresponding to an equivalent frame to create additional pixels in one direction based on the design. Multiplexing can also be achieved using a multiplexing device by shifting the LFP lens 98 along a second axis 116 and a third axis 122 by some quarter- or half-integer pixel value in each direction, where the end of each movement corresponds to a frame, increasing the effective pixels in both directions. Multiplexing may also be achieved by using a multiplexing device that effects a deformation of the LFP lens 98 or manipulating the refractive index of the material to achieve an effective resolution increase in both directions. In one case, the LFP lens is made from a deformable material and the multiplexing device applies a controllable deforming force to the LFP lens to effect the deformation. In another case, changing the refractive index of the LFP lens can be achieved by a LFP lens manufactured from a material or in a configuration that enables changing of the refractive index and the multiplexing device comprises an electrical device that causes the LFP lens to undergo the change in refractive index. Additionally, the LFP lens 98 can be moved along first axis 114 toward the positive z-direction to slightly increase the divergence of the pixels in the projector image, increasing the size of the projector image at the image plane by an amount to cause an equivalent quarter- or half-integer pixel value shift. Similarly, LFP lens 98 may be moved in the negative z-direction to decrease the divergence, creating a smaller projector image at the imaging plane depending on the space constraints of the design.

Multiplexing techniques also include manipulating the pixel forming device 76 can be, for example, a Liquid Crystal on Silicon (LCOS) panel, a digital micromirror device (DMD), or other display device using a multiplexing actuator, or other suitable component or multiplexing method. As illustrated in FIG. 5A, the pixel forming device 76 may be shifted along a first axis 114, a second axis 116 or a combination of both axes. The manipulation of the position of the pixel forming device 76 is synchronized with input images such that the movement of the device increases the resolution in one- or two-dimensions. Multiplexing may also be achieved by manipulating the single prism 82 using a multiplexing actuator along a second axis 116, a third axis 122, or along both axes in synchronization with the input frame to increase the effective resolution in one, or both directions. An additional multiplexing technique illustrated in FIG. 5A is one wherein the position of the first projection doublet 78a, or second projection doublet 78b is manipulated along a first axis 114. Moving one of the projection doublets would change the focus point of the projection system and increase or decrease the magnification of the projector image. For example, if the movement of element 78a increases the image size by some pixel/4 or pixel/2 integer, in correspondence with the input frame, a multiplexing effect in both dimensions would occur, increasing the effective resolution. Due to the slight movement desired, this may be achieved by using a small piezoelectric transducer.

Figure 5B:
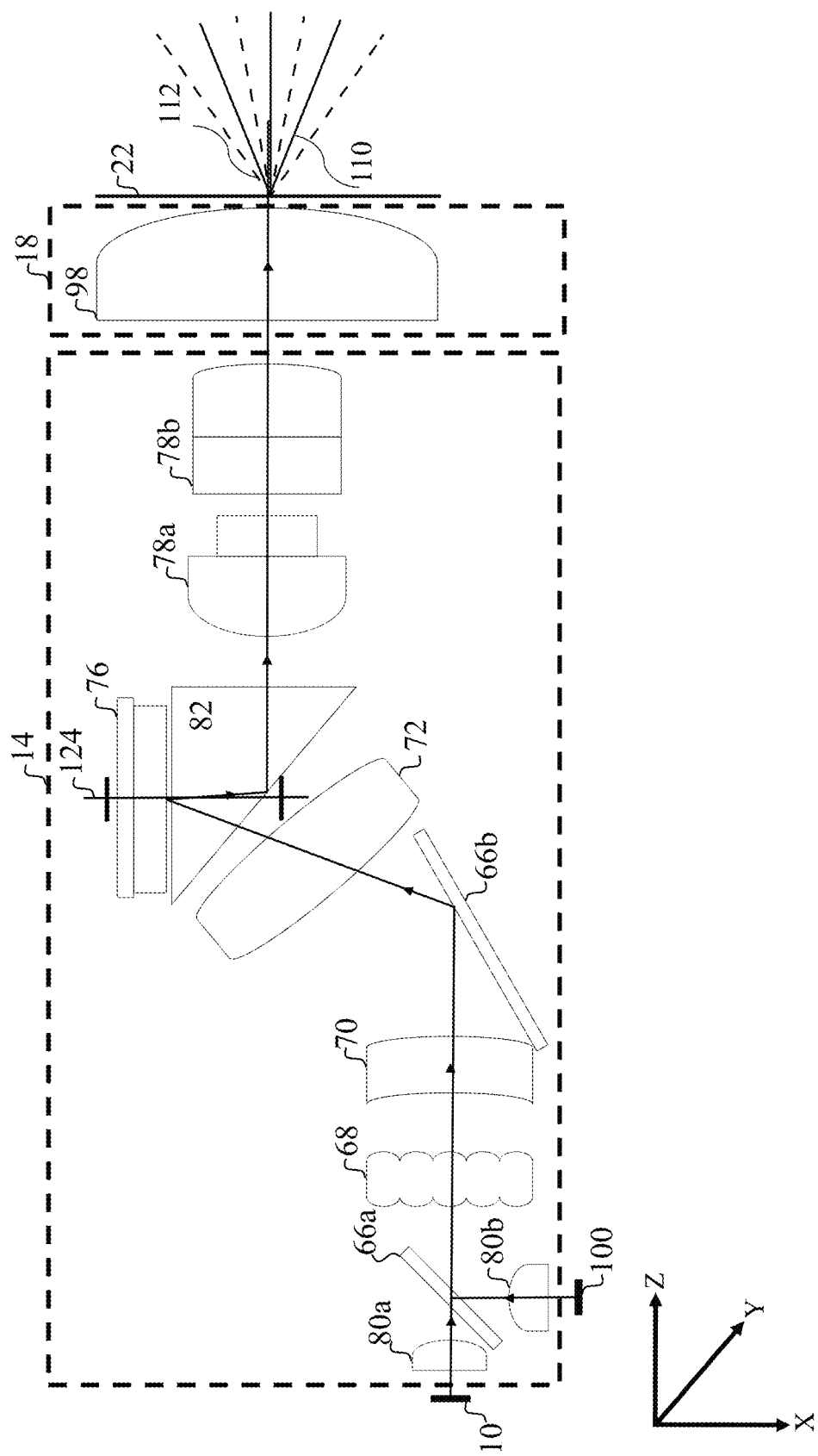
FIG. 5B illustrates an alternative configuration of a projection optical system arrangement and a collimating optical system.

FIG. 5B illustrates a configuration of the projection optical system 14 and the collimating optical system 18 which are incorporated in a light field projector body, as illustrated in FIG. 1. In this configuration, light emitted from a light emitting diode (LED) 10 or a light emitting diode (LED) package 100 is directed to projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least two LEDs. The light from LED 10 is directed through its own plano-convex lens 80a and light emitted from LED package 100 is directed to plano-convex lens 80b. The two individual ray paths are then directed to an illumination optical system beginning with dichroic mirror 66a which merges the light to form a single ray path. LED 10 can be a single color that is transmitted by dichroic mirror 66a and LED package 100 can comprise any other colors that are reflected by dichroic mirror 66a to form a single ray path. In one example case, where LED package 100 emits blue and red light and LED 10 is a green LED, dichroic mirror 66a allows transmission of green light from LED 10 and reflection of red and blue light transmitted from LED package 100. The light ray path continues in the illumination optical system through an microlens array 68 through to a meniscus lens 70, to a dichroic mirror 66b. Dichroic mirror 66b reflects green, red and blue light from LED 10 and LED package 100. The light is redirected through a bi-convex lens 72 and through to a single prism 82. The ray path through the prism 82 is directed to a pixel forming device 76, then back through the single prism 82 and through to a series of projection doublets 78. The light is redirected through a bi-convex lens 72 and through to a single prism 82. The ray path through the prism 82 is directed to a pixel forming device 76, then back through the single prism 82 and through a magnifying optical component comprising a series of projection doublets 78a, 78b. The ray path then continues to the collimating optical system 18, which in this embodiment is a LFP lens 98. The function of the LFP lens 98 in the collimating optical system 18 is for collimation of light coming from the projection optical system 14. The ray path continues to the display optical system 22. The multiplexed light field output 112 projected from the display optical system 22 comprises two individual light field images, shown as a first set of solid-line rays and a second set of dashed-line rays, which together make up the multiplexed light field output 112. It should be noted that in this configuration, the display optical system 22 may be any suitable display optical component including, but not limited to, a single lens, a lens array, a pinhole array, a metasurface, or a metalens, which functions to direct pixels to different viewing zones to create a 3D display. In this embodiment, a multiplexing device 124 is in line with the single prism 82 and pixel forming device 76. This allows both components to be shifted in 1D or 2D by the multiplexing device 124, which may be, but is not limited to, a piezo-electric actuator, an electrothermal actuator, magnetic actuator, electrostatic actuator, or shape memory alloy-based actuator.

Figure 5C:
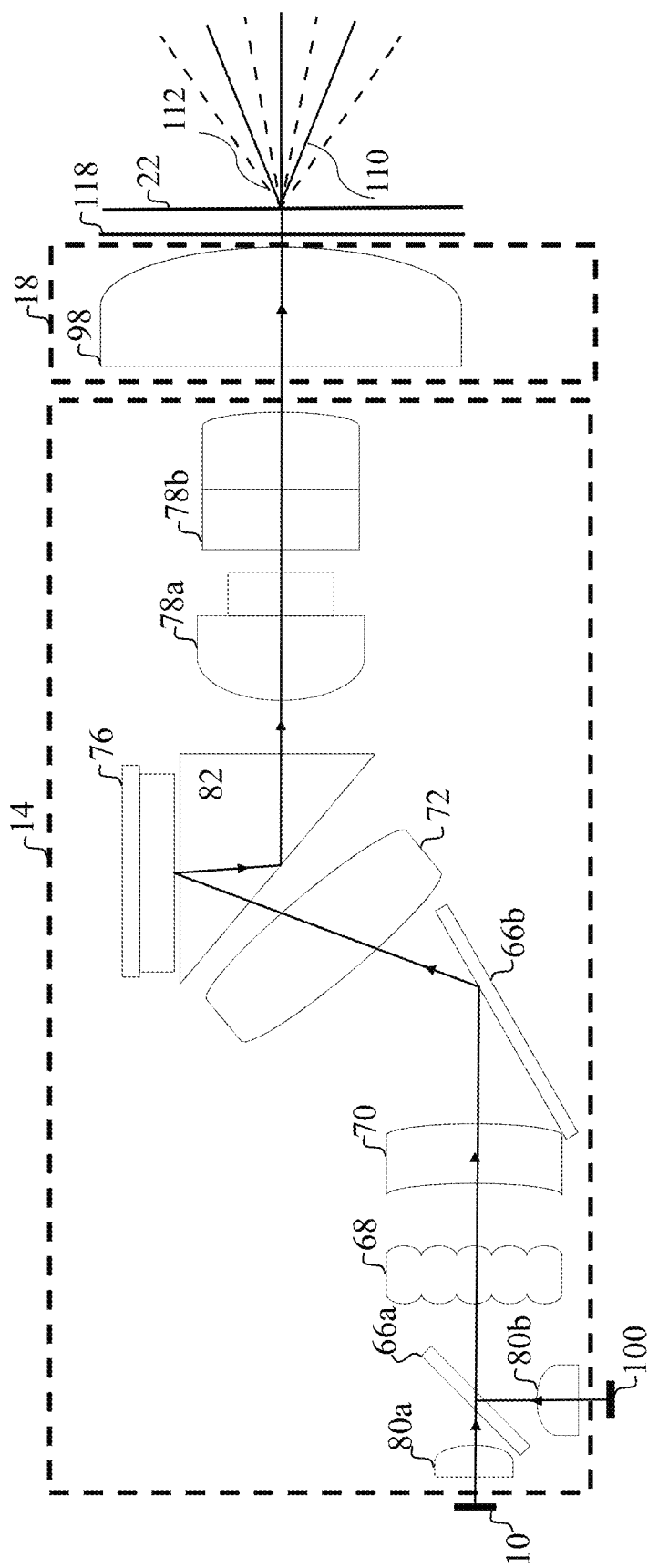
FIG. 5C illustrates an alternative configuration of a projection optical system arrangement and a collimating optical system.

FIG. 5C illustrates a configuration of the projection optical system 14 and the collimating optical system 18 which are incorporated in a light field projector body, as illustrated in FIG. 1. FIG. 5C also includes a multiplexing layer 118 positioned directly before the display optical system 22. In this configuration, light emitted from a light emitting diode (LED) 10 or a light emitting diode (LED) package 100 is directed to projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least two LEDs. The light from LED 10 is directed through its own plano-convex lens 80a and light emitted from LED package 100 is directed to plano-convex lens 80b. The two individual ray paths are then directed to an illumination optical system beginning with dichroic mirror 66a which merges the light to form a single ray path. LED 10 can be a single color that is transmitted by dichroic mirror 66a and LED package 100 can comprise any other colors that are reflected by dichroic mirror 66a to form a single ray path. In one example case, where LED package 100 emits blue and red light and LED 10 is a green LED, dichroic mirror 66a allows transmission of green light from LED 10 and reflection of red and blue light transmitted from LED package 100. The light ray path continues in the illumination optical system through an microlens array 68 through to a meniscus lens 70, to a dichroic mirror 66b. Dichroic mirror 66b reflects green, red and blue light from LED 10 and LED package 100. The light is redirected through a bi-convex lens 72 and through to a single prism 82. The ray path through the prism 82 is directed to a pixel forming device 76, then back through the single prism 82 and through to a series of projection doublets 78. The light is redirected through a bi-convex lens 72 and through to a single prism 82. The ray path through the prism 82 is directed to a pixel forming device 76, then back through the single prism 82 and through a magnifying optical component comprising a series of projection doublets 78a, 78b. The ray path then continues to the collimating optical system 18, which in this embodiment is a LFP lens 98. The function of the LFP lens 98 in the collimating optical system 18 is for collimation of light coming from the projection optical system 14. The ray path continues to the display optical system 22.

FIG. 2A-I, FIG. 3A-D, FIG. 4A-D, and FIG. 5A-C illustrate various devices and methods for multiplexing an embodiment of a light field projector, as per the present disclosure. It is understood that variations of the light field projector device, and any projector suitable for creating a light field display could be multiplexed using the aforementioned methods.

Figure 6A:
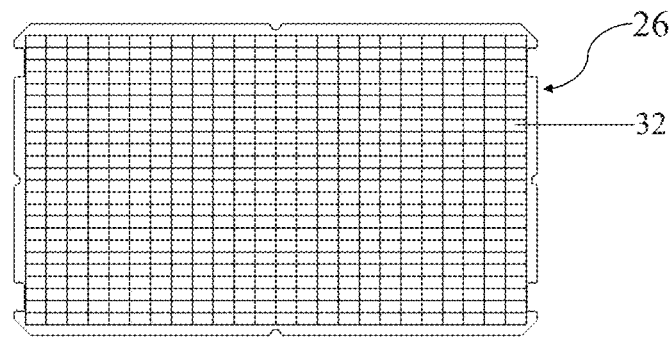
FIG. 6A is a front diagram of a collimating lens array.
Figure 6B:
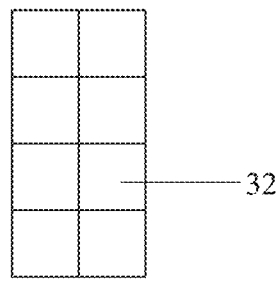
FIG. 6B is a diagram of a magnified view of a 2×4 grid of a collimating lens array in FIG. 6A.

FIG. 6A is a front view diagram of a collimating lens array which functions as a collimating lens array in the collimating optical system. In this example, collimating lens array 26 is generally rectangular, and has a plurality of collimating lenslets 32 also referred to as lenslets, a close-up of which is shown in FIG. 6D. The collimating lens array 26 may be constructed using a substrate to which is adhered to a plurality of small lenses or collimating lenslets 32 to form a single piece fixed to the substrate. The adhering can be done using, for example, an optically clear adhesive with a specific refractive index, or an optically clear tape. The substrate may be made from, for example, a cyclic olefin copolymer (COC), glass, cyclic olefin polymer (COP), PMMA, polycarbonate, polystyrene, isoplast, Zeonex® E48R, optical polyester, acrylic, polyetherimide (PEI), or other suitable material. The collimating lens array 26 comprises one or more collimating lenslet 32 positioned to align with a corresponding LED upstream the projection optical system such that each collimating lenslet 32 receives light from an LED. The collimating lens array 26 may be coated on one or both sides with an anti-reflective coating. In the example of FIG. 6B, the collimating lenslets 32 include two plano-convex lenses and a substrate. The convex lenses may be formed of, e.g., Zeonex® E48R, glass, cyclic olefin polymer (COP), PMMA, polystyrene, isoplast, optical polyester, acrylic, polyetherimide (PEI), or other suitable materials. The two plano-convex lenses and substrate can be arranged to form a single bi-aspherical convex lens, $_{which}$ can act as a collimating lenslet 32.

FIG. 6B is a diagram of a magnified view of a 2×4 grid of the collimating lens array with collimating lenslets 32 shown in FIG. 6A.

Figure 6C:
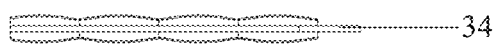
FIG. 6C is a diagram of a profile view of a collimating lens array FIG. 6A.
Figure 6D:
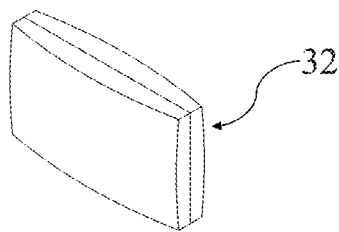
FIG. 6D is a diagram of an isometric view of a single lens in a collimating lens array FIG. 6A.

FIG. 6C is a diagram of a profile view of a collimating lens array with a laser etched engineered diffuser 34 as shown in FIG. 6A. An engineered diffuser is an advanced light beam shaper capable of homogenizing an input beam and shaping the output intensity profile and the way the light is distributed in space. An engineered diffuser can create non-Gaussian intensity distributions in circular or square beam profiles that diverge from the plane of incidence. Engineered diffusers can be, for example polymer-on-glass such as replicated polymer on a glass substrate, an etched hard material such as fused silica, silicon, or germanium, with plastic embossing, injection-molded plastic components, or micro-optical elements on a flexible substrate. Some specific examples of engineered diffusers are laser-etched diffusers and engineered holographic diffusers.

FIG. 6D is a diagram of a close-up isometric view of a single collimating lenslet 32 in a collimating lens array shown in FIG. 6A.

Figure 7A:
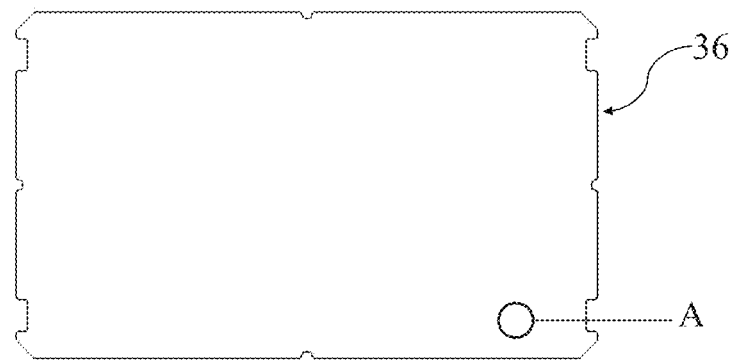
FIG. 7A is a diagram of an engineered diffuser.

FIG. 7A is a diagram of a diffuser 36 which can optionally be in the projector device downstream the collimating optical system along the ray path. In this embodiment, the diffuser 36 is laser etched engineered diffuser which functions to scatter the light rays. In some examples, the diffuser 36 is a single diffuser lenslet or diffuser lenslet array as shown in FIG. 7C. In one implementation of the present disclosure, the diffuser 36 has a circular angle of 3.5 degrees and does not require coating.

Figure 7B:
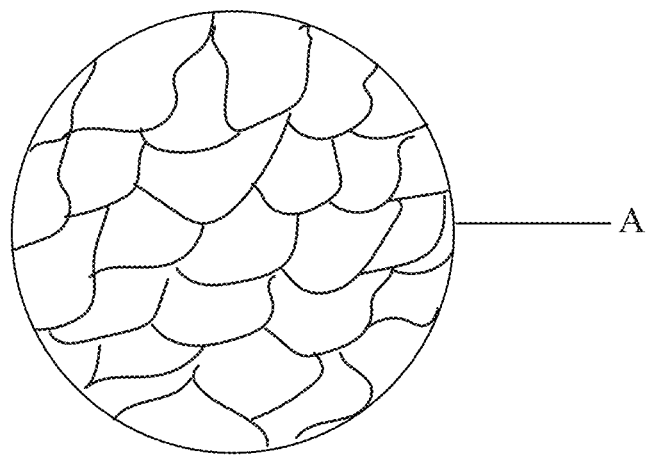
FIG. 7B is a magnified diagram of a laser etched engineered diffuser.
Figure 7C:
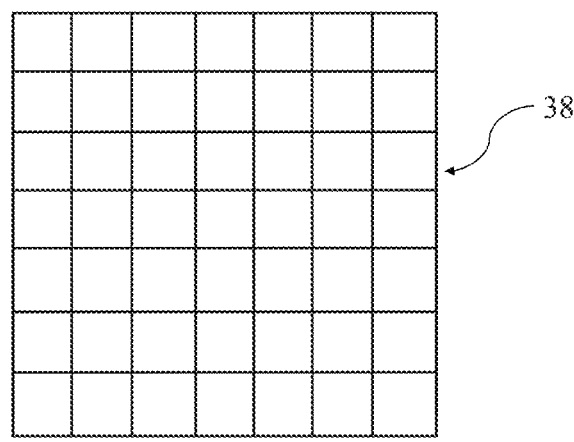
FIG. 7C is a magnified diagram of a diffuser lens array.

FIG. 7B is a magnified diagram of a laser etched engineered diffuser 34, magnified as section A from FIG. 7A. This is an illustration to represent the molecular arrangement of a laser etched engineered diffuser.

FIG. 7C is a magnified diagram of a diffuser lenslet array 38, which is one embodiment of the laser etched engineered diffuser. The diffuser lenslet array 38 is an alternative diffusing component composed of multiple diffusing lenslets as opposed to a laser etched engineered diffusing surface.

Figure 8A:
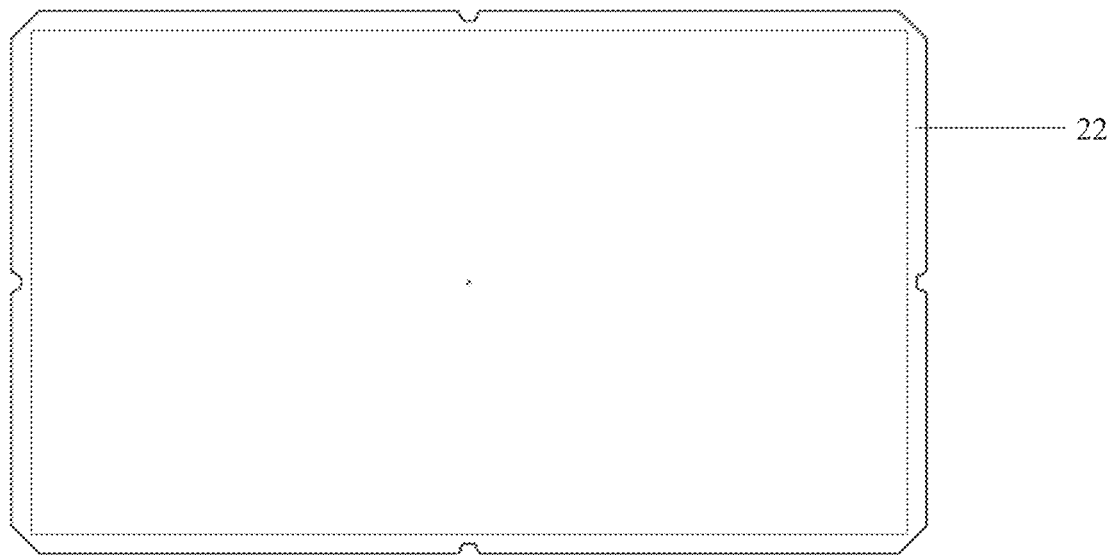
FIG. 8A is a diagram of a display optical system display lens.

FIG. 8A illustrates a display optical system 22, shown as a single display lens. The display lens consists of an array of hogels, and functions to redirect the collimated light rays from a collimating optical system into a distribution of rays, spanning a range of angles described by the Field of View of the display, such that their aggregate forms a light field image.

Figure 8B:
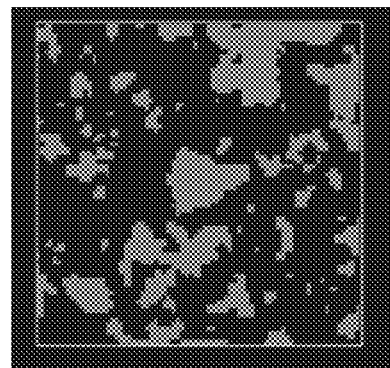
FIG. 8B is a diagram of an alternative display optical system comprising a metasurface.

FIG. 8B illustrates an alternative display optical system as a metasurface, metalens, or metamaterial. The display lens could be, for example, a periodic array of lenses, a metasurface, a metalens, or any type of optical waveguide. Optical metasurfaces are engineered surfaces used to manipulate the polarization, phase, and amplitude of light. An optical metasurface generally consists of a two-dimensional lattice of pillar-type structures that interact with an impinging wavefront where the lattice constant and structure size are of subwavelength thickness relative to the electromagnetic wavelength range that the structures are designed to interact with. The design of dimensions of the pillars and the pillar spacing in the metasurface are varied to obtain desired optical properties. The use of metasurfaces in light field display technology can enable the creation of virtually flat optical devices, can improve the performance of optical elements, and can manipulate light to provide optical systems with new properties.

Figure 8C:
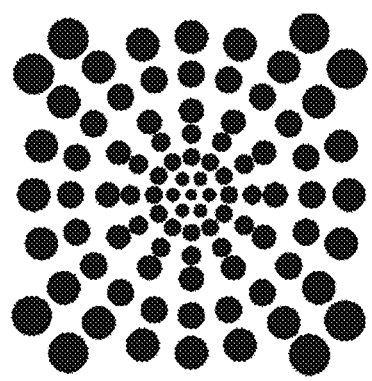
FIG. 8C is a diagram of an alternative display optical system.

FIG. 8C illustrates a further alternative display optical system as an engineered surface which functions to redirect the collimated light rays from collimating optical system 18 into a distribution of rays, spanning a range of angles described by the Field of View of the display, such that their aggregate forms a light field image.

Figure 9:
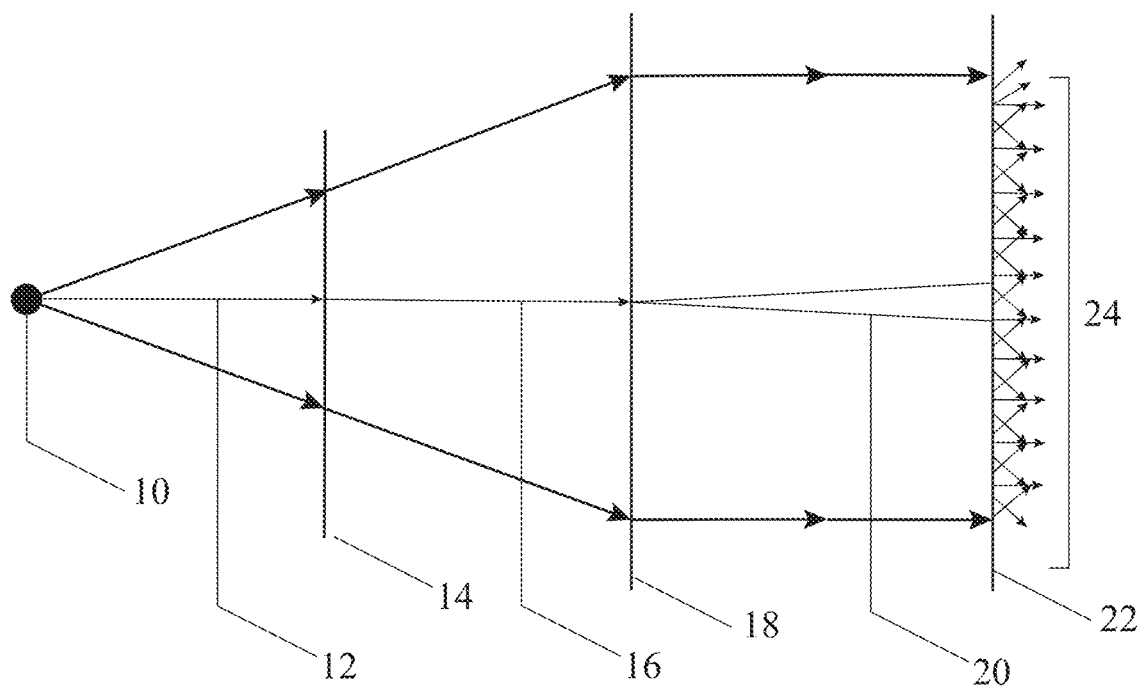
FIG. 9 illustrates a sample ray path of a single pixel of an embodiment of a light field projector device.

FIG. 9 illustrates the ray path of light emitted from an LED 10 or LED package in the light field projector device. As shown, light rays 12 are emitted from a light source, preferably a light emitting diode (LED) 10, which can also be a plurality of LEDs, optionally in an LED package, through the projection optical system 14. The projection optical system 14 may include optical projector components in various arrangements as previously described. Light is then output from the projection optical system 14 to form a first projected image 16 that travels to the collimating optical system 18, which collimates and diffuses the light rays forming a second projected image 20. The pixel pitch represents the spacing between adjacent pixels in the second projected image 20. The pixel pitch increases in size after the image leaves the pixel forming device due to the magnification effect of the magnifying optical component. The focal length is the distance between collimating optical system 18 and the display optical system 22. The collimating optical system 18 collimates the light and can comprise, for example, a collimating array, one or more lens structures or optical components capable of collimation. The second projected image 20 then travels to the display optical system 22, which in this case is a display lens. A display lens can be formed from any suitable display optical component, for example, an array of lenslets, metasurface, a metalens, and converts spatial pixels to directional views. The output of the display lens in the display optical system 22 forms the light field image 24. A hogel converts the spatial position of pixels into directional or well-controlled directional rays. One example of a hogel implementation is one created by a lens having a series of pixels incident upon it. Light field image 24 comprises an array of hogels.

The light field projector device may also include an adjustment mechanism for adjustment of a direction of the projected image or light ray path. Adjustment can compensate for error introduced by mechanical tolerancing, optical aberration, or other errors that cause deviation of the ray path from nominal. In one example, the adjustment mechanism can be a kinematic adjustment mechanism to allow for fine adjustment of the projector in all six degrees, within a design tolerance. In particular, the projector body can be adjustable in all cartesian directions x, y, z, and in angular directions yaw, pitch, and roll. The light field projector device may also include a digital adjustment mechanism, which can set specific degrees of freedom with physical tolerances and uses additional pixels around the perimeter of the display device for the alignment of the device. It is also possible to use both kinematic and digital adjustment mechanisms in combination. Other features that can be part of the internal optical components include but are not limited to one or more of a static iris, an engineered diffuser, and a collimation lens or collimation device, optical lenses, diffraction gratings, fiber optical components, laser optical components, one or more of which can be incorporated into the design of the light field projector device. A collimation lens may be, for example, a frameless collimation lens design capable of leveraging the bi-convex design of the optics to fill the lens aperture in the front of the body of the light field projector device. The lens aperture may be defined as the required hole or opening through which light travels. The light field projector device may also further comprise one or more conventional projector components such as printed circuit boards (PCBs), one or more memories, and a housing. The projector can also include one or more additional internal optical components for further manipulation, diffusion and/or collimation of the light. One of these internal optical components may function as a multiplexing device, which may be, but is not limited to, a piezo-electric actuator, an electrothermal actuator, magnetic actuator, electrostatic actuator, or shape memory alloy-based actuator.

Figure 10:
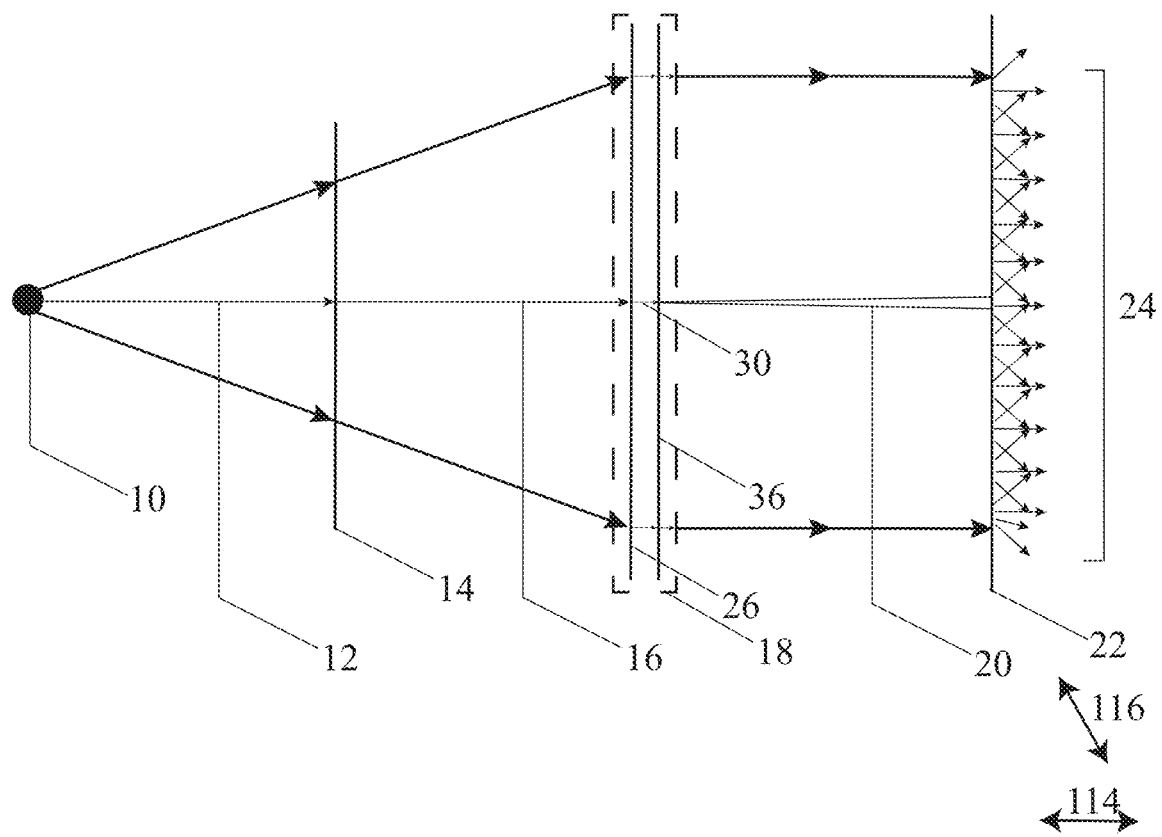
FIG. 10 illustrates a sample ray path of a single pixel of an alternative embodiment of a light field projector device.

FIG. 10 illustrates the ray path of a single pixel in a light field projector device. Light rays 12 are emitted from a light emitting diode (LED) 10 through the projection optical system 14. The projection optical system 14 may include optical projector components in various arrangements. The projection optical system 14 emits rays to form a first projected image 16 that travels to the collimating optical system 18. The collimating optical system 18 collimates and diffuses the light rays forming a second projected image 20. The collimating optical system includes a collimating lens array 26 for collimation of the light rays and a diffuser 36 for diffusion of the light rays. The second projected image 20 travels to a display optical system 22, which is a display lens. The output of the display lens forms the light field image 24. The collimating lens array 26 can include one or more lenses, lenslets, optical mirrors, or collimating optics. The collimating lens array 26 reduces the divergence of light emitted from the projection optical system 14. The collimating lens array 26 is positioned a throw distance from the projection optical system 14. In one instance, the throw distance is such that each pixel of the projector image increases in size proportional to the adjacent pixel, and results in no overlap in the pixels. The projection optical system 14 is placed such that the distance between the projection optical system 14 and the collimating lens array 26 creates a projected image equal in size to a single lenslet in the collimating lens array 26.

A collimated light beam 30 leaving the collimating lens array 26 travels to the diffuser 36. In some examples, the diffuser 36 can comprise an engineered diffuser array, or one or more lenses, optical mirrors, or optical materials that may be suitable for diffusion. The diffuser 36 is positioned between the collimating lens array 26 and the display optical system 22, and the diffuser 36 receives light from the collimating lens array 26. The collimating lens array 26 and the diffuser 36 can be a single integrated piece, or separate pieces. The display optical system 22 can be positioned to receive a second projected image 20 from the diffuser 36. Therefore, light from the collimating lens array 26 travels to the diffuser 36 which in one example is an engineered diffuser array. The output light rays forming a first projected image 16 from the projection optical system 14 are collimated to preserve the projected size of the image. At the diffuser 36, the divergence of each pixel is increased by a factor of:

$$\sqrt{C^2 \cdot f_m^2}$$

where C is a constant that is chosen for proper reconstruction of the sampled wavefront and $f_m$ is a fill factor. In one example, the value of C is approximately 2. In such instances the fill factor, $f_m$, is approximately 0.9, such that the spot size, $x_s$, is related to the pixel spacing, $x_p$, as $$x_s = x_p \sqrt{C^2 \cdot f_m^2}$$

where $x_p$ is the lens pitch divided by the number of angular samples.

Therefore, the diffuser 36 imparts a point spread function on each pixel in the image. The pixels with the point spread function from the diffuser 36 are then incident on the back surface of the display optical system 22, which constitutes the display lens. As the light is incident on and passes through the diffuser 36, the light is dispersed according to a point spread function, approximated as a Gaussian function. The diffuser 36 may include an angular diffuser or engineered diffusing array which is used to achieve a desired spread function and prevent bleed from the projection of light from neighboring pixels. In one example, the projection optical system 14 creates an image having a size of 20 mm×10 mm at a distance defined by the throw ratio of the projector, where the throw ratio is the ratio of the distance from the lens to the screen (throw) to the screen width. This image may then be projected to a collimating lens array 26, resulting in a packet image that is the exact size (20 mm×10 mm) projected toward the diffuser 36, which is, for example, a diffuser screen or engineering diffuser array. The diffuser 36 can then create a small, defined point spread function. Using the desired point spread function, proper overlap between pixels is achieved to reduce resolution bias error or the picket fence effect and distribute the light for a better viewing experience. Resolution bias error references missing information between samples in a spectrum. The reduction of the resolution bias error allows for smooth viewing zone transitions. The diffuser 36 in this instance is designed to a very specific angular output such that if, for example, the engineered divergence has a 5-degree circular FWHM, the beam through the optical system will also have an intensity profile of 5 degrees. This output is the light directed to the display lens of display optical system 22, which can be a metasurface, metalens, gradient index lens material, or any suitable display optical component to distribute light from each pixel according to a plenoptic sampling function as described above. Multiplexing can be achieved by shifting the display optical system 22 along a first axis 114, or a second axis 116, or in any combination of the two using some form of multiplexing actuator or custom device to shift the optical system a known distance, corresponding to an input frame to the display. Multiplexing may also be achieved by deformation of the display optical system 22. Other display-based multiplexing techniques include manipulating the refractive index of the material of the display optical system 22 or by adjustment of the aperture of a pinhole array display optical system 22.

In a multi-device or multi-projector arrangement, each of the projection optical systems 14 may be aligned such that light exiting the collimating optical system 18 strikes normal to the display optical system 22. As such, each projection optical system 14 may be equipped with alignment hardware and a fine control mechanism to orient the light ray in the projector device. Depending on the tolerances necessary, there are several approaches to projector, or projection optical system 14 alignment. In one example, there can be provided one or more adjustment elements, for example, mechanical mounts, with screw adjusters to provide one-time rough alignment. In another example there can be provided one or more piezoelectric transducers, for example, for nano to micro scale electronic adjustment. These can also potentially be useful for active calibration schemes utilizing feedback. Other adjustment elements may include kinematic mounts and/or digitally controlled adjustment elements such as the above-mentioned piezoelectric transducers. The maximum amount of required adjustment is dictated by the dimensions of the lenslets illuminated by each of the projection optical systems 14. Multiple light field projector devices may be tiled together to form a light field display. In this case, multiplexing may be achieved using various methods. In one embodiment, the projector comprises multiple multiplexing devices each connected with a different optical component of the system (i.e., a pixel forming device, a light field projection lens, a folded prism etc.), and each multiplexing device is multiplexed simultaneously, all at the same frame rate. In another case, multiplexing is achieved by manipulating the same internal optical component (i.e., a pixel forming device, a light field projection lens, a folded prism etc.) concurrently by two or more different multiplexing devices or by two or more different multiplexing methods at an increased frame rate. Multiplexing of a projector array may also be achieved by multiplexing a common optical component shared by all projector devices in the array, such as a display lens or display lens array. Multiplexing of the shared optical component may be achieved by a multiplexing actuator or custom device to shift the optical system a known distance, corresponding to an input frame to the display. Multiplexing may also be achieved by deformation of the common optical component. Other display-based multiplexing techniques include manipulating the refractive index of the material of the common optical component or by adjustment of the aperture of the common optical component.

Figure 11:
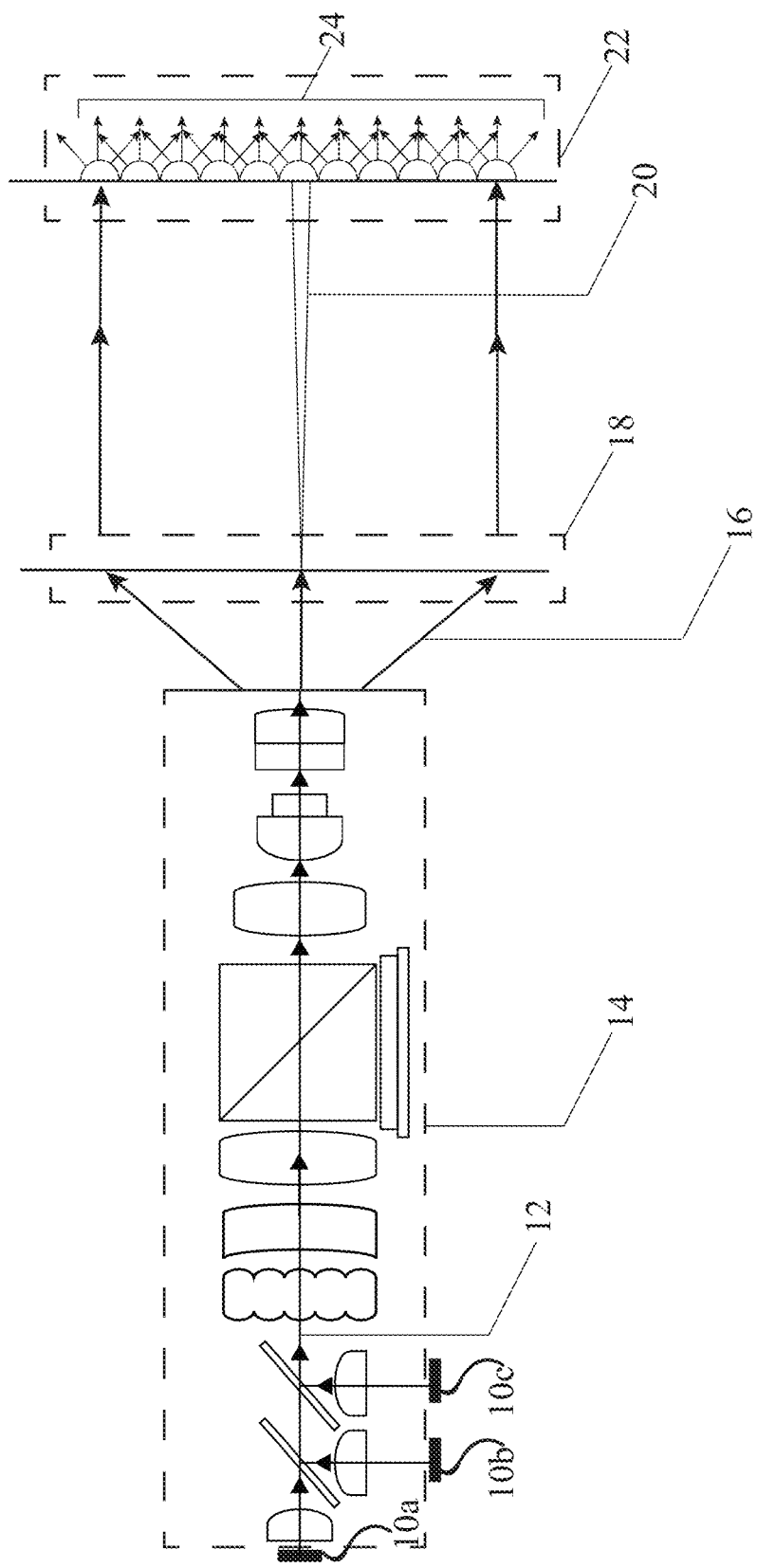
FIG. 11 illustrates a sample ray path of a single pixel and optical system components of an embodiment of a light field projector device.

FIG. 11 illustrates a ray path diagram of a light field projector device as per the present disclosure with the optics of a projection optical system 14. The output light rays 12 from a series of three LEDs 10a, 10b, 10c, through the projection optical system 14 forms a first projected image 16 which proceeds to a collimating optical system 18. The collimating optical system 18 shown is a single lens that outputs a second projected image 20 that is directed to the display optical system 22 which outputs a light field image 24. The collimating optical system 18 may consist of a light field projection lens. The projector can also include additional internal optical components for further manipulation, diffusion and/or collimation of the light. One of these internal optical components may function as a multiplexing device, which may be, but is not limited to, a piezo-electric actuator, an electrothermal actuator, magnetic actuator, electrostatic actuator, or shape memory alloy-based actuator.

Figure 12:
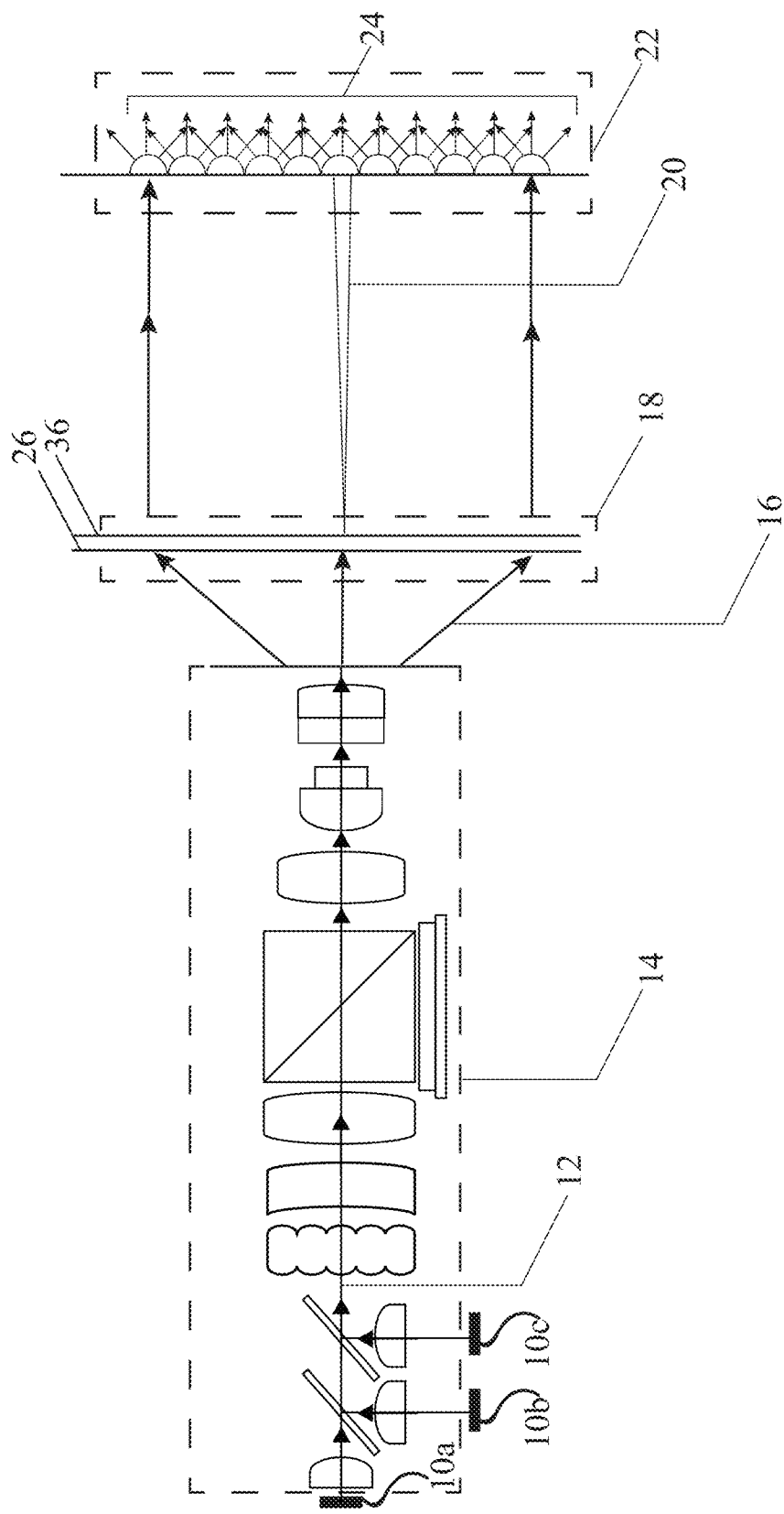
FIG. 12 illustrates a sample ray path of a single pixel and optical system components of an alternative embodiment of a light field projector device.

FIG. 12 illustrates an alternative ray path diagram of a light field projector device as per the present disclosure with the optics of the projection optical system 14 is the arrangement as illustrated in FIG. 11. The output light rays 12 from a series of three LEDs 10a, 10b, 10c, through the projection optical system 14 projects a first projected image 16 to a collimating optical system 18, wherein the collimating optical system 18 has more than one lens or optical component, here shown as collimating lens array 26 and diffuser 36. The collimating optical system 18 outputs a second projected image 20 that is directed to a display optical system 22 which outputs a light field image 24. The projector can also include additional internal optical components for further manipulation, diffusion and/or collimation of the light. One of these internal optical components may function as a multiplexing device, which may be, but is not limited to, a piezo-electric actuator, an electrothermal actuator, magnetic actuator, electrostatic actuator, or shape memory alloy-based actuator.

Figure 13:
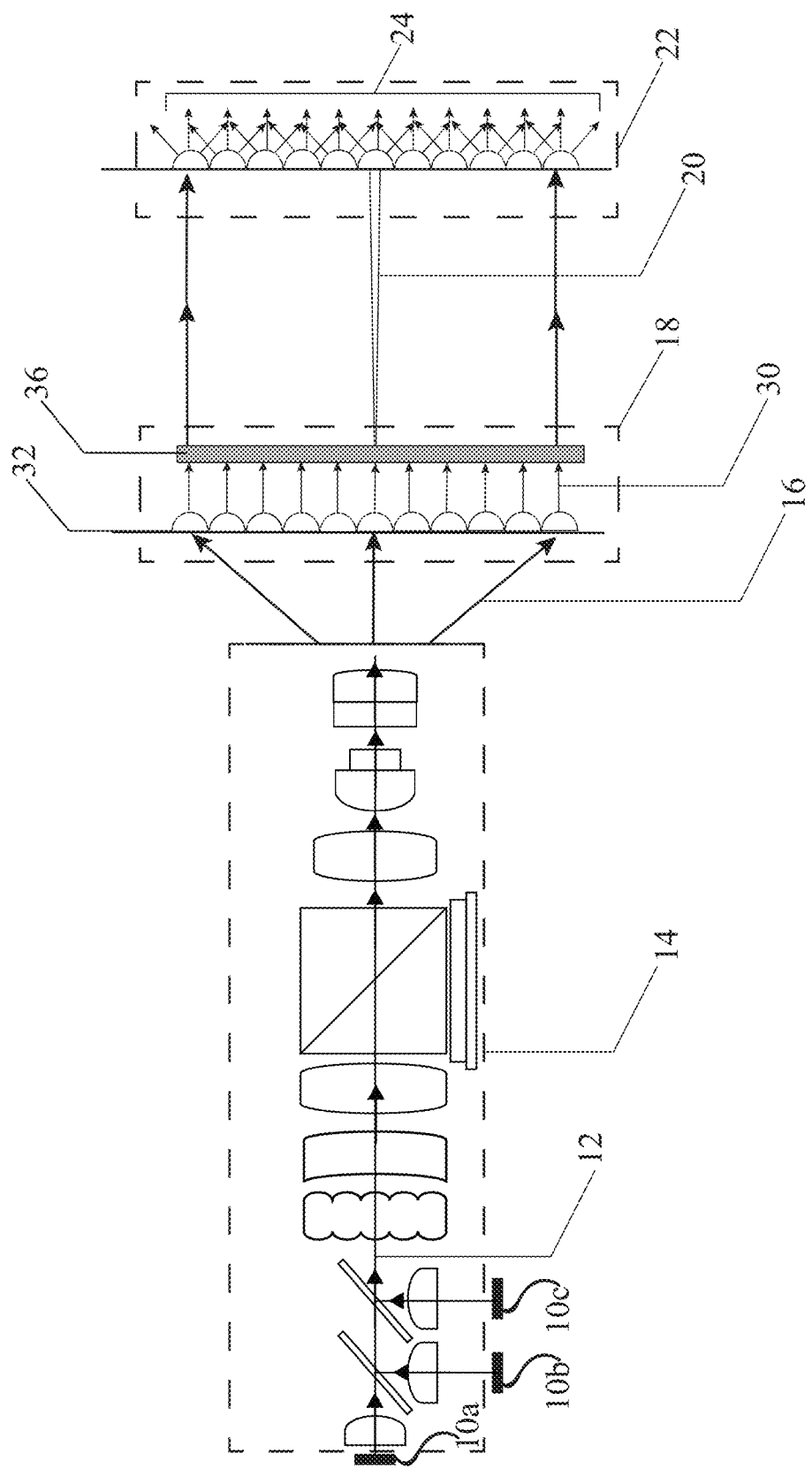
FIG. 13 illustrates a sample ray path of a single pixel and optical system components of an alternative embodiment of a light field projector device.

FIG. 13 illustrates an additional alternative ray path diagram of a light field projector device as per the present disclosure wherein the optics of the projection optical system 14 is the arrangement as illustrated in FIG. 11 and FIG. 12. The output light rays 12 from a series of three LEDs 10a, 10b, 10c, through the projection optical system 14 projects a first projected image 16 to a collimating optical system 18, wherein the collimating optical system 18 has more than one lens or optical component that outputs a second projected image 20 that is directed to the display optical system 22 which outputs a light field image 24. In this arrangement, the collimating optical system 18 consists of a collimating lens array comprising a plurality of collimating lenslets 32 which outputs a collimated light beam 30 to a diffuser 36 which may be a diffusing array or engineered diffuser, which may be an optical system or other optical component to output a second projected image 20 that is directed to the display optical system 22 which outputs a light field image 24. The projector can also include additional internal optical components for further manipulation, diffusion and/or collimation of the light. One of these internal optical components may function as a multiplexing device, which may be, but is not limited to, a piezo-electric actuator, an electrothermal actuator, magnetic actuator, electrostatic actuator, or shape memory alloy-based actuator.

Figure 14:
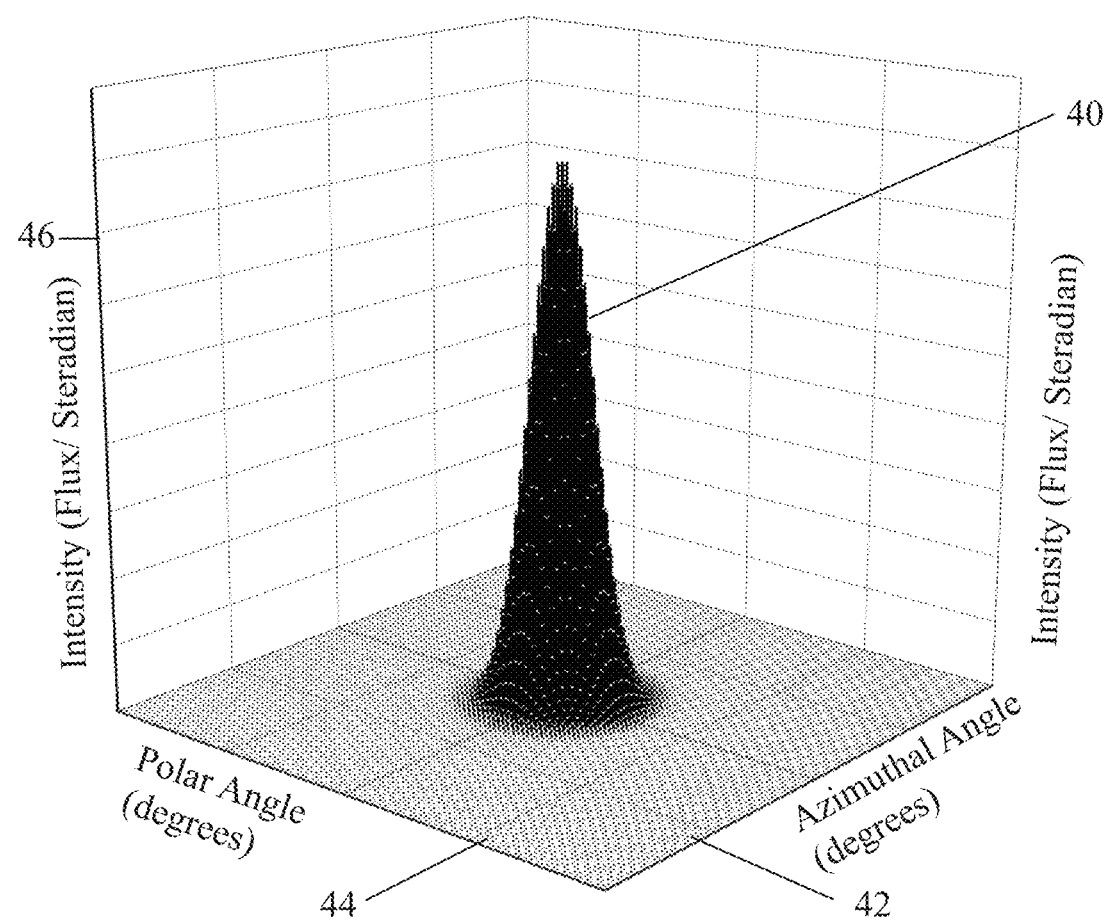
FIG. 14 is a diagram of a point spread function for a pixel in an engineered diffuser array.

FIG. 14 depicts a nominal point spread function according to an embodiment of the disclosure for a lenslet in the diffuser. In an example, the point spread function 40 may have a FWHM of twice the angle between two directional pixels. Shown is a graphical representation of the angular spread of a pixel in terms of the azimuthal angle 42 and the polar angle 44 versus intensity 46 of a light ray as function of the diffuser. In the presently described projector device, light is emitted from a projection optical system, characterized by a specified throw ratio, where each pixel of the projector image increases in size proportional to the adjacent pixel, resulting in no overlap in the pixels. Subsequently, at the collimating lens array, the output of the projection optical system is collimated to preserve the projected size of the image. The collimated beam is then incident on the diffuser, where the width of the beam is approximately equal on both optical systems. Finally, the pixels with the point spread function 40 from the diffuser are then incident on the back surface of the display optical system which constitutes the display lens. The distance between the display optical system and the collimating optical system allows for fine tuning of the output width of the pixels per image. The position of the pixels created by multiplexing, or multiplex-created pixels, must be determined as this location will dictate where the input image frames are rendered such that the multiplex-created pixels show image data corresponding to the correct position. Generally, small movements of precise amounts (i.e., a pixel pitch/4 or pixel pitch/2 distance) would be expected. These could also be larger distances as well, but these would have to be known.

The position of the multiplex-created pixels will depend on the method of multiplexing. The specifications of the multiplexing component or devices can also be used to determine the multiplex-created pixel positions and would use a form of display calibration to map the pixels as part of the light field correction routine. In this case, the multiplex-created pixel positions would be determined from simulation and/or calculation.

Figure 15:
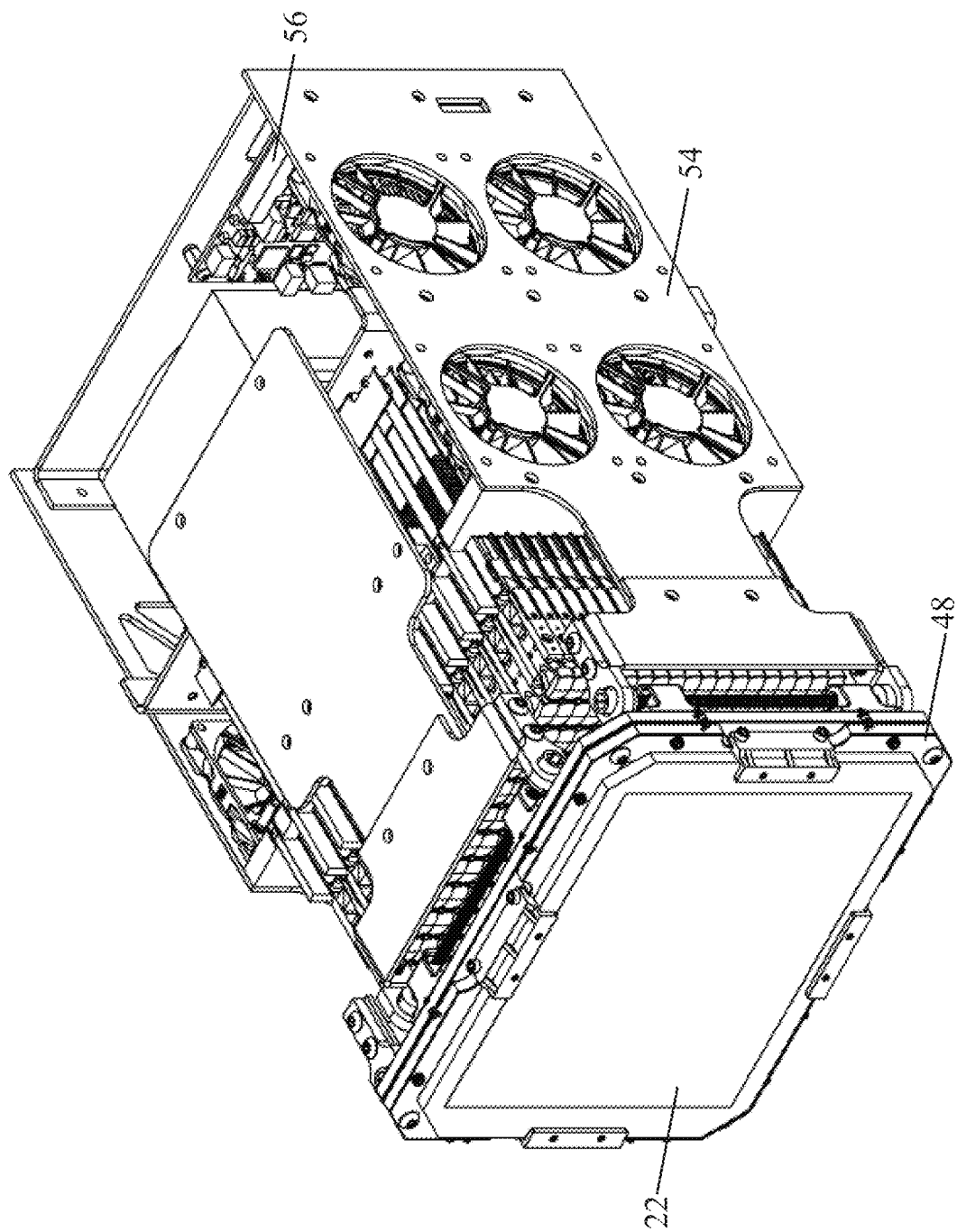
FIG. 15 illustrates an isometric view of a system consisting of an array of light projector devices.

FIG. 15 illustrates an isometric view of a light field image display device comprising an array of light field projector devices as presently described. The system shown has a plurality of light field projector devices secured within a light field image display device housing with side rails 54. The system is preferably controlled by a Printed Control Board (PCB) architecture 56. The display optical system 22, outputs the light field image and is secured to the light field projection system by a display lens mount 48.

FIG. 16 illustrates an exploded view of a light field image display device or system having an array of light field projector devices. The system includes a PCB architecture 56. The power source and cooling system is housed by the side rails 54 which also have fan mounts to cool the system. A PCB array 52 is powered and connected to a light field projector array 50 by a projector mount 58. The display optical system 22, outputs the light field image and is secured to the light field projection system by a display lens mount 48. In this example shown, the light field image display device has 18 rows and 12 columns of light field projector devices, totaling 216 light field projector devices in the array. Other array sizes are possible, and any size of array is possible. In one working configuration of the present light field image display device or system, the display optical system 22 is 187 mm tall and 228 mm wide, which is about the size of a small tablet.

Figure 17:
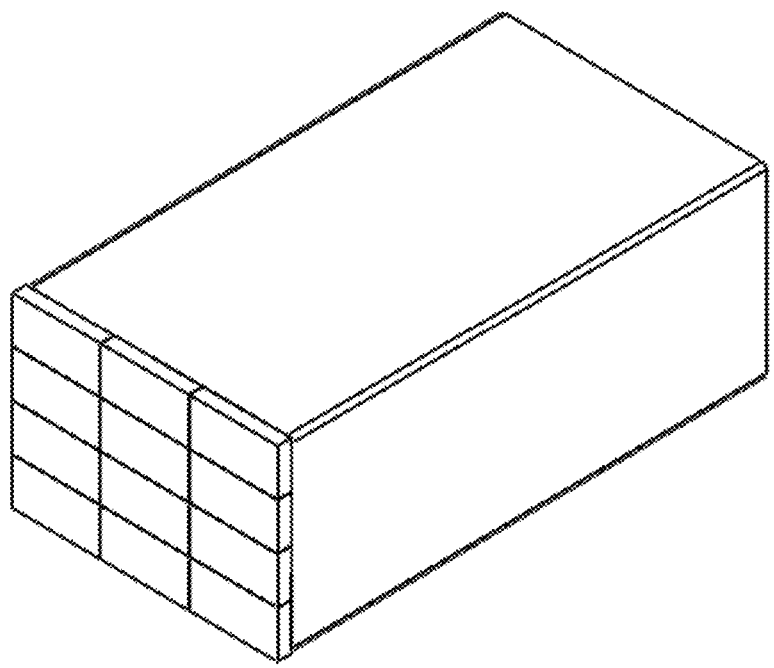
FIG. 17 illustrates an alternative configuration of a light field projector device containing 3×4 display units and a light field projector array.

FIG. 17 illustrates an alternative configuration of a light field projector device having a projector array comprising a plurality of 3×4 projector devices in a single projector body.

Figure 18:
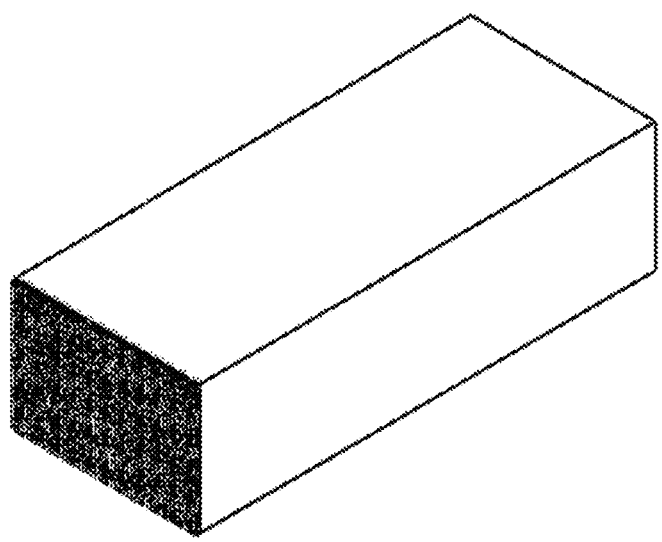
FIG. 18 illustrates an alternative configuration of a light field projector device containing an array of display units and all optical systems to create a light field display. The system can be tiled/stacked to create a larger display.

FIG. 18 illustrates an alternative configuration of a light field projector device containing an array of display devices and all optical systems to create a light field display. The system can be tiled/stacked to create a larger light field display.

Figure 19:
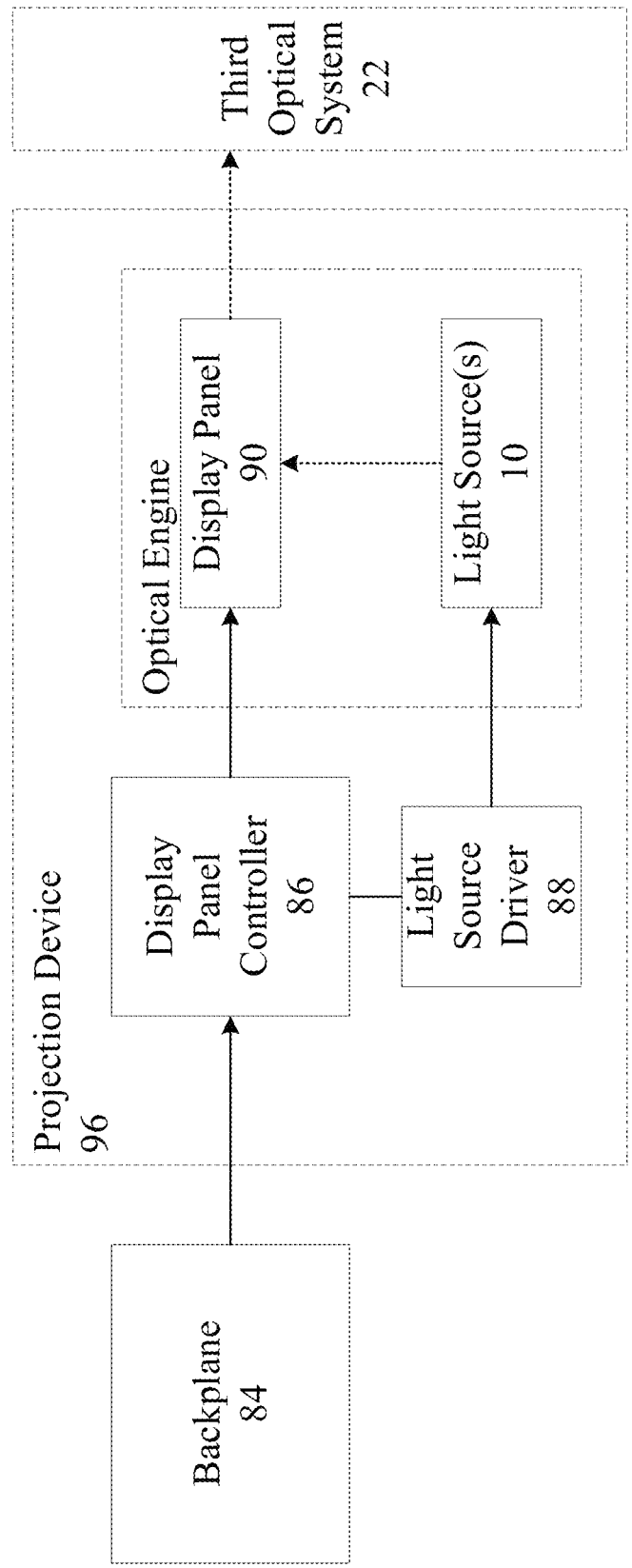
FIG. 19 illustrates a block diagram of a light field projector device.

FIG. 19 illustrates a block diagram for the present disclosure. The backplane 84 sends video and control data from an input device to the light field projection device 96. The display panel controller 86 creates a video input for the display panel 90, while also sending the enable signal to the light source driver 88 to power the light source LEDs 10 in a frame sequential drive scheme. The light from the light source LED 10 is incident on the display panel 90 in the projection device resulting in a projected image on the display optical system 22.

Figure 20B:
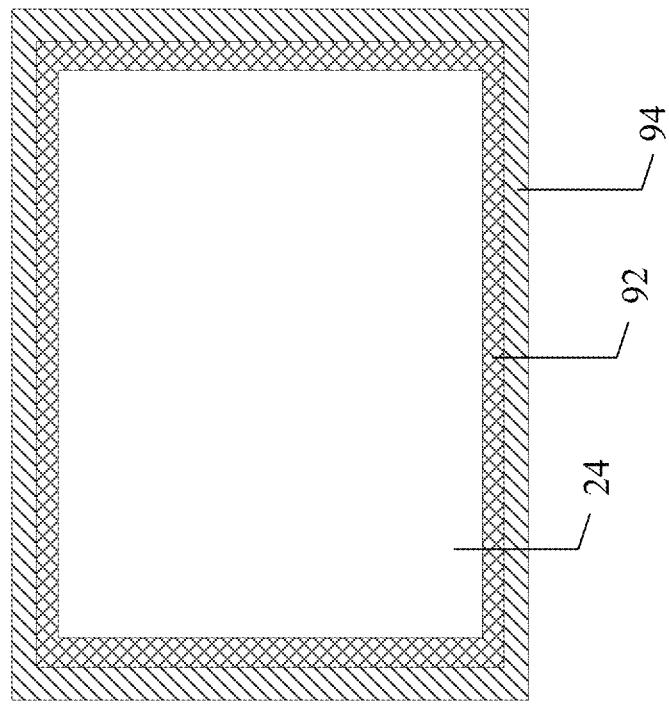
FIG. 20B illustrates the assignment of pixels in a projector frame for the active image, overlap area, and correction buffer.
Figure 20A:
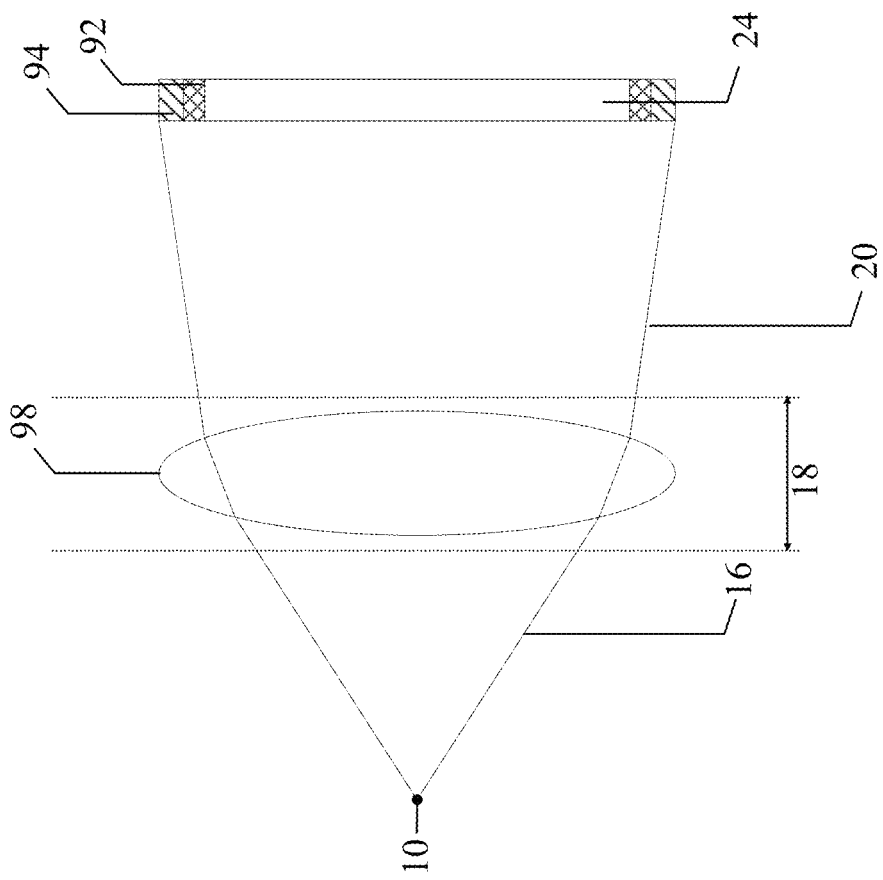
FIG. 20A illustrates a projector and projected image with a light path.

FIG. 20A and FIG. 20B illustrate the assignment of pixels in a projector frame for the active image, overlap area, and correction buffer. In some embodiments, the projector contains a custom designed, edge-less light LFP lens 98 which wraps around the front edges of the projector as shown in FIG. 20A. FIG. 20A illustrates a first projected image 16 from a LED 10 light source through the LFP lens 98, which acts as the collimating optical system 18 to output a second projected image 20. This edge-less design will remove the tiling artifacts in the light field display due to projector alignment and lens array assembly tolerances. The projected light field image 24 size of each projector will allow for the removal of any display artifacts of the tiling of projectors in the system and allow for digital correction of the light field display. The diagrams below show a ray path through the LFP lens 98, demonstrating the pixel usage for each projector at the light field display. FIG. 20B illustrates the projected light field image 24 with allotment of the overlap pixels 92, noting the correction pixels 94, and light field image pixels. The side view of the overlap pixels 92 and correction pixels 94 are also illustrated in FIG. 20A.

An alternative embodiment of the present disclosure describes a flat panel based multiplexed display. The flat panel-based display may include, but is not limited to, liquid-crystal display (LCD) or light emitting diode (LED) technologies, or a combination of both as a multiplexed, autostereoscopic, and high-angular resolution, light field display. The light field display is viewable with both horizontal and vertical parallax where the multiplexing is used to increase the effective resolution in one-dimension or two dimensions, increasing the display quality.

Figure 21:
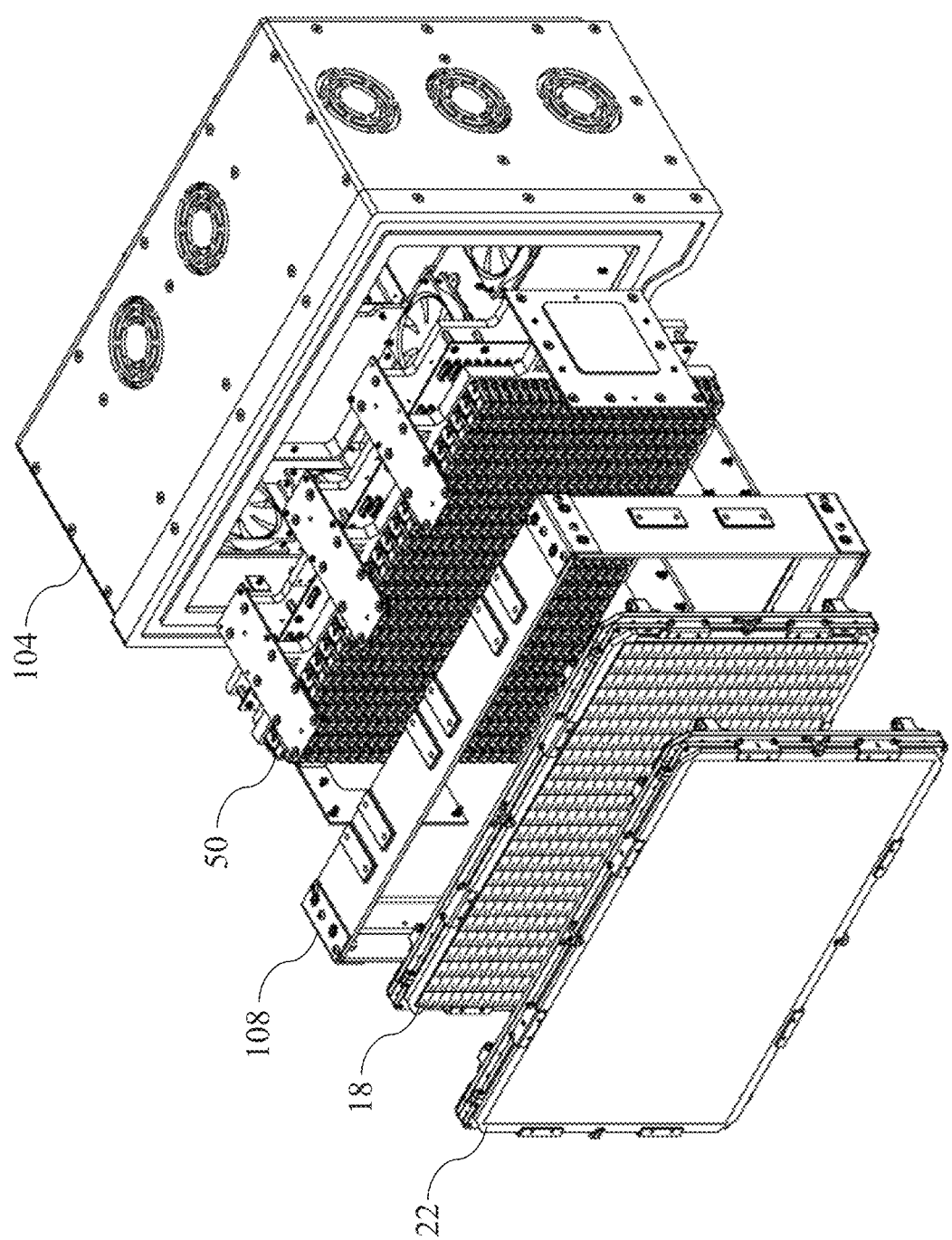
FIG. 21 is an isometric view of an exploded diagram of a light field display.

Projector array-based displays can be difficult to design, at least due to the required inclusion of many densely-oriented projectors with precise alignment. Referring to FIG. 21, a light field display includes an enclosure 104 that houses a projector array 50 and two lens systems: a collimating optical system 18 or diffusing optical system and a display optical system 22. The projector array 50 includes multiple projectors, each of which produces light. The projectors in the projector array may be pico-projectors, specialized for augmented reality headsets or automotive heads-up displays (HUDs). The projectors receive image data and convert the image data into projected light. Projected light is then transmitted from the projectors to a collimating optical system 18 comprising a lens system or array. The light is then transferred from the collimating optical system 18 to a display optical system 22 which forms a multiplexed light field image. All optomechanical components fit within the lens enclosure 108.

Generally, very high-brightness projectors are required for light field displays known in the art. An advantage of the light field displays of the present disclosure is the reduced brightness requirement for the projectors in the projector array 50. The decreased brightness requirement is achieved through the design of the direct projection display lens systems' ability to control the angular distribution of light and application of a point spread function to the light beam. The decreased brightness requirement for the projector array 50 may allow for small LEDs without an internal cooling requirement, therefore a smaller projector footprint may lead to a tighter packing density of the projector array 50, decreased size and weight of the individual projectors, and decreased power requirements for the direct projection light field display. The collimating optical system 18, which can be a collimating array, reduces the divergence of light emitted from the projector array 50. The collimating optical system 18 is positioned a throw-distance from the projector array 50. In one instance, the throw distance is such that each pixel of the projector image increases in size proportional to the adjacent pixel, and results in no overlap in the pixels. The projector is placed such that the distance between the projector and the collimating optical system 18 creates a projected image equal in size to a single lenslet in the collimating optical system 18. The divergent pattern from the projector array 50 is approximately the same size as a single projector, allowing a 1:1 ratio between the collimating optical system 18, which may be comprised of a collimating array lenslets, and each projector in the projector array 50.

Figure 22:
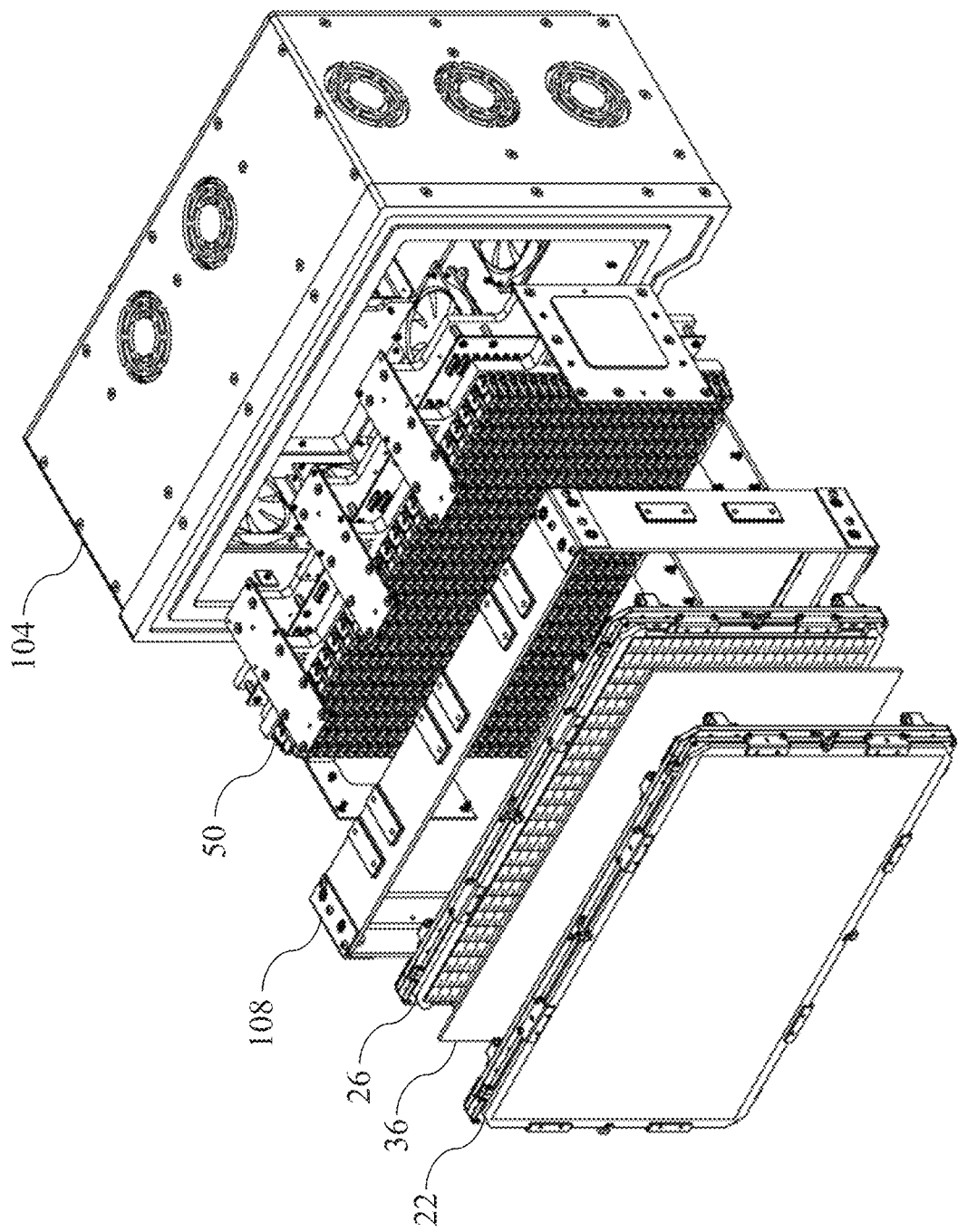
FIG. 22 is an isometric view of an exploded diagram of an exemplary embodiment of a light field display.

FIG. 22 illustrates an embodiment of a light field display as per the present disclosure. A collimated light beam leaves the collimating optical system, which in this embodiment includes a collimating lens array 26 and a diffuser 36, where the diffuser 36 can be an engineered diffuser array. The diffuser 36 is positioned between the collimating lens array 26 and the display optical system 22 and receives light from the collimating lens array 26. The collimating lens array 26 and the diffuser 36 can be a single integrated piece or separate components, either of which forms a collimating optical system 18. The display optical system 22 can be positioned to receive a diffused, collimated beam from the collimating optical system 18. Therefore, light from the collimating lens array 26 travels to the diffuser 36, which in one example is an engineered diffuser lenslet array. The output of the projector is collimated to preserve the projected size of the image.

At the diffuser 36, the divergence of each pixel is increased by a factor of:

$$\sqrt{C^2 \cdot f_m^2}$$

where C is a constant that is chosen for proper reconstruction of the sampled wavefront and $f_m$ is a fill factor. In one example, the value of C is approximately 2. In such instances the fill factor, $f_m$, is approximately 0.9, such that the spot size, $x_s$, is related to the pixel spacing, $x_p$, as $$x_s = x_p \sqrt{C^2 \cdot f_m^2}$$

where $x_p$ is the lens pitch divided by the number of angular samples. Therefore, the diffuser 36 imparts a point spread function on each pixel in the image. FIG. 14 is a graphical illustration of said point spread function.

The pixels with the point spread function from the diffuser 36 are then incident on the back surface of the display optical system 22, which constitutes a display lens. The distance between the display optical system 22 and collimating optical system 18 will allow for fine tuning of the output width of the pixels per image and may be minimized to reduce system space. As the light is incident on and passes through the collimating lens array 26, the light is dispersed according to a point spread function, approximated as a Gaussian function. The diffuser 36 may include an angular diffuser or engineered diffusing lenslet array which is used to achieve a desired angle and prevent bleed from the projection of light from neighboring projectors. In one instance of the present disclosure, a specific point spread function is applied to the light from each individual projector pixel, directing the pixel to a specific angle. One projector and its pixels can create a small image.

As shown in FIG. 22, it may be observed that each projector creates an image of 26 mm×15 mm at a distance defined by the throw ratio of the projector. This image may then be projected to a collimating lens array 26, resulting in a packet image that is that exact size (26 mm×15 mm) projected toward a diffuser 36 consisting of a diffuser screen or engineering diffuser lenslet array. The collimating lens array 26 in combination with the diffuser 36, form the collimating optical system 18. The diffuser 36 can then create a small, defined point spread function. Using the desired point spread function, proper overlap between pixels is achieved to reduce resolution bias error, or the picket fence effect and distribute the light for a better viewing experience. Resolution bias error references missing information between samples in a spectrum. The reduction of the resolution bias error allows for smooth viewing zone transitions. The diffuser 36 in this instance is designed to a very specific angular output such that if, for example, the engineered divergence has a 5-degree circular FWHM (Full Width Half Maximum), the beam through the lens system will also have an intensity profile of 5 degrees. This output is the light directed to the display optical system 22 and which can be a metasurface, metalens, gradient index lens material, or any suitable optical component to distribute light from each pixel according to a plenoptic sampling function as described above.

Each projector may be aligned such that light exiting the collimating optical system 18 strikes normal to the display optical system 22. As such, each projector may be equipped with alignment hardware and fine control. Depending on the tolerances necessary, there are several approaches to projector alignment. In one approach, an adjustment element can be used, such as one or more mechanical mounts with screw adjusters to provide one-time rough alignment. In another approach, a piezoelectric transducer can provide for nano to micro scale electronic adjustment. Other adjustment elements may include kinematic mounts and/or digitally controlled adjustment elements such as the above-mentioned piezoelectric transducers. The maximum amount of adjustment is dictated by the dimensions of the lenslets illuminated by each projector. All these approaches are useful for active calibration schemes utilizing feedback.

Figure 23:
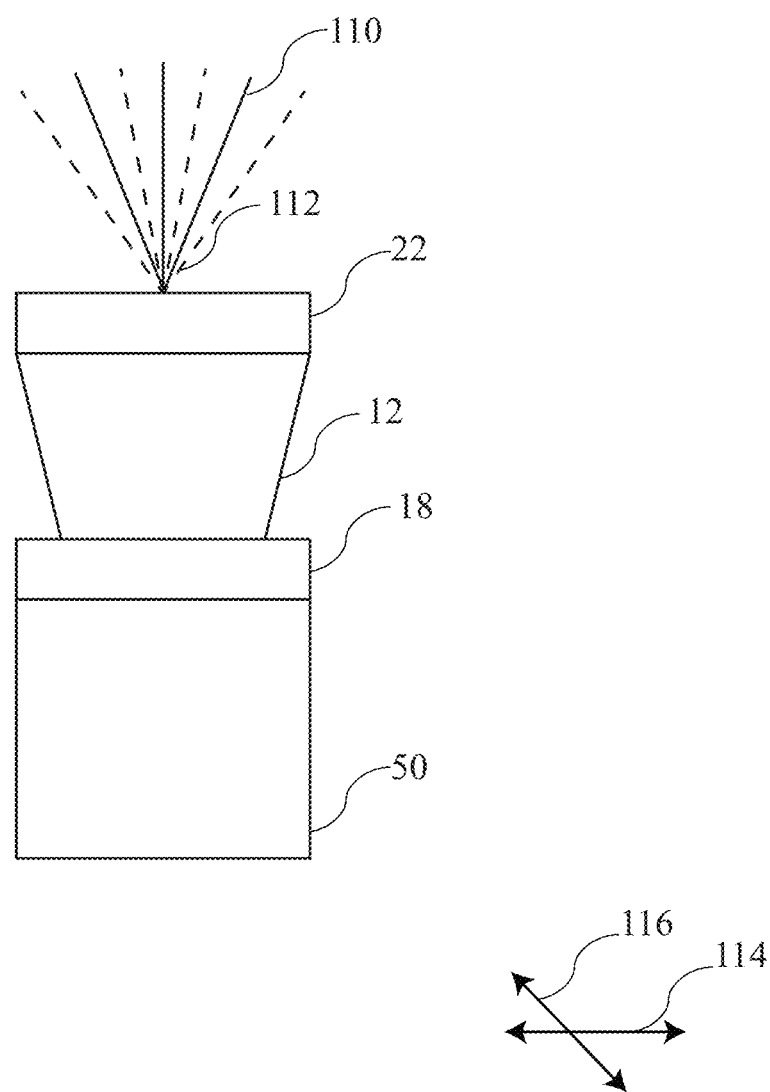
FIG. 23 illustrates multiplexing methods as per the present disclosure for a top view of a light field display.

FIG. 23 illustrates multiplexing methods as per the present disclosure for a light field display. FIG. 23 illustrates an embodiment of a light field display consisting of a projector array 50, a collimating optical system 18, with the output light rays 12 directed to the display optical system 22. The multiplexed light field output 112 projected from the display optical system 22 comprises two individual light field images, shown as a first set of solid-line rays and a second set of dashed-line rays, which together make up the multiplexed light field output 112. In this configuration the display optical system 22 may be a single lens, a lens array, a pinhole array, a metasurface, a metalens, or any other suitable display optical component. Multiplexing can be achieved by shifting the display optical system 22 along a first axis 114, or a second axis 116, or in any combination of the two using some form of actuator or custom device to shift the optical system a known distance, corresponding to an input frame to the display. Multiplexing may also be achieved by deformation of the display optical system 22 which can be accomplished in 2D or 3D. Other display-based multiplexing techniques include manipulating the refractive index of the material of the display optical component comprising the display optical system 22 or by adjustment of the aperture of a pinhole array display optical system 22.

Figure 24:
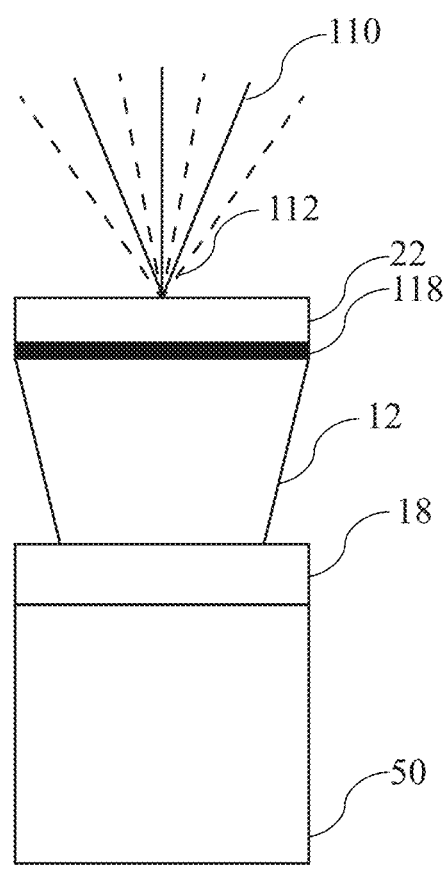
FIG. 24 illustrates multiplexing methods for top view of an alternative embodiment of a light field display.

FIG. 24 illustrates an alternative embodiment of a light field display that includes a projector array 50, a collimating optical system 18, with the output light rays 12 directed first to an additional multiplexing layer 118 positioned directly before the display optical system 22, then to the display optical system 22. The multiplexed light field output 112 projected from the display optical system 22 comprises two individual light field images, shown as a first set of solid-line rays and a second set of dashed-line rays, which together make up the multiplexed light field output 112. In this configuration, the display optical system 22 may be a single lens, a lens array, a pinhole array, a metasurface, a metalens, or any other suitable display optical component. Multiplexing may be achieved by all previously disclosed methods as in FIG. 23, but additionally in this configuration, multiplexing may be achieved by actively changing the index of refraction of the additional multiplexing layer 118 by applying an electric field or voltage to the material to shift the pixel location by a known pixel distance to increase the effective resolution in 2D.

Figure 25:
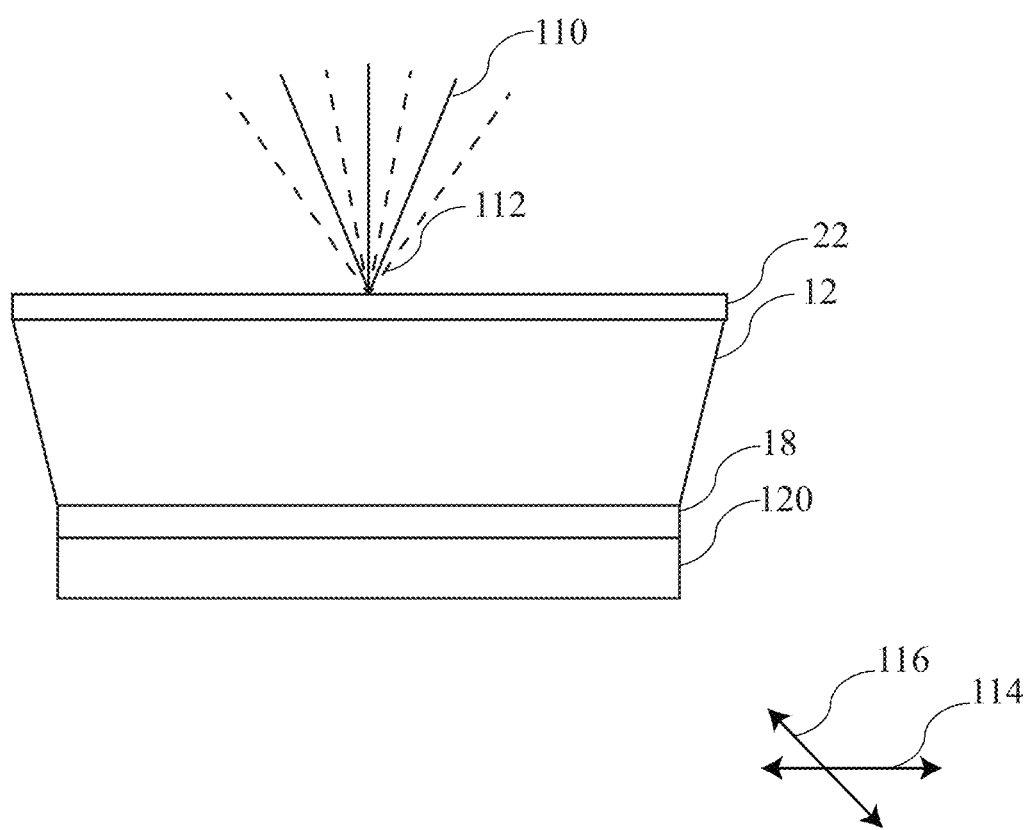
FIG. 25 illustrates a top view of an embodiment of multiplexed flat-panel light field display.

FIG. 25 illustrates an embodiment of multiplexed flat-panel light field display. FIG. 25 illustrates an embodiment of a light field display consisting of a flat-panel display 120, a collimating optical system 18, with the output light rays 12 directed to the display optical system 22. The flat-panel display 120 may be, but is not limited to, LED, LCD, plasma or electroluminescent panel. The light emitting diodes (LEDs) may be organic light emitting diodes (OLEDs) or quantum dot light emitting diodes (QLEDs) or another suitable diode. The multiplexed light field output 112 projected from the display optical system 22 comprises two individual light field images, shown as a first set of solid-line rays and a second set of dashed-line rays, which together make up the multiplexed light field output 112. In this configuration, the display optical system 22 may be a single lens, a lens array, a pinhole array, a metasurface, a metalens, or any other suitable display optical component. Multiplexing can be achieved by shifting the display optical system 22 along a first axis 114, a second axis 116 or by shifting the display optical system 22 along a third axis 122, or in any combination of the three. Multiplexing may also be achieved by deformation of the display optical system 22 which can be accomplished in 2D. Other display-based multiplexing techniques include manipulating the refractive index of the material of the display optical component comprising the display optical system 22 or by adjustment of the aperture of a pinhole array display optical system 22. The aperture adjustment multiplexing method can be achieved in 1D or 2D using a liquid crystal array or equivalent.

Figure 26:
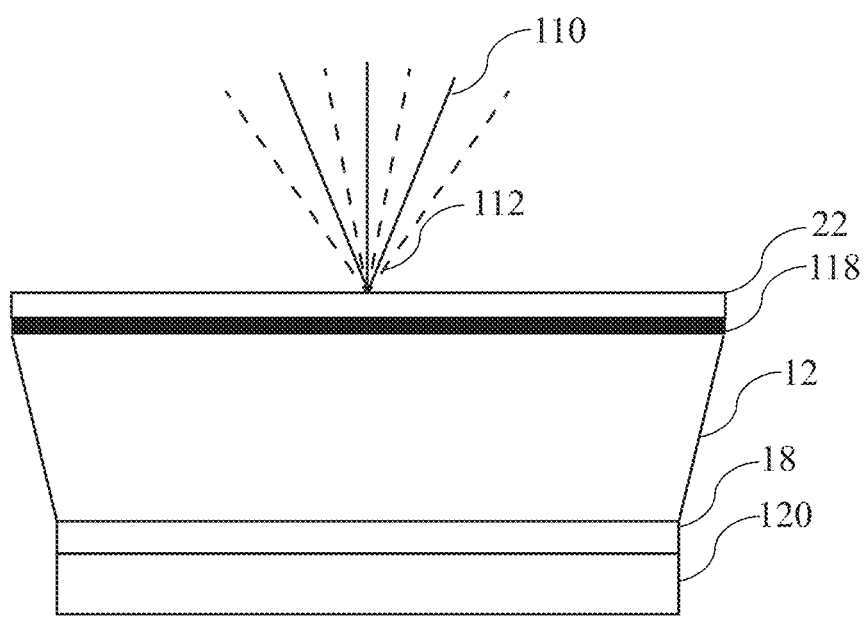
FIG. 26 illustrates a top view of an alternative embodiment of multiplexed flat-panel light field display.

FIG. 26 illustrates an alternative embodiment of multiplexed flat-panel light field display. This embodiment includes a flat-panel display 120, a collimating optical system 18, with the output light rays 12 directed first to an additional multiplexing layer 118 positioned directly before the display optical system 22, then to the display optical system 22. The multiplexed light field output 112 projected from the display optical system 22 comprises two individual light field images, shown as a first set of solid-line rays and a second set of dashed-line rays, which together make up the multiplexed light field output 112. In this configuration, the display optical system 22 may be a single lens, a lens array, a pinhole array, a metasurface, a metalens, or any other suitable display optical component. Multiplexing may be achieved by all previously disclosed methods as in FIG. 25, but additionally in this configuration, multiplexing may be achieved by changing the index of refraction of the additional multiplexing layer 118. This can be achieved in 1D and 2D.

A number of embodiments have been described. Nevertheless, it will be understood that various modifications may be made without departing from the spirit and scope of the invention. For example, some of the steps described above may be order independent, and thus can be performed in an order different from that described.

The disclosures of all patents, patent applications, publications referenced in this specification are hereby specifically incorporated by reference in their entirety to the same extent as if each such individual patent, patent application, publication and database entry were specifically and individually indicated to be incorporated by reference. Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A projector comprising:
   a light source comprising a light emitting diode (LED);
   a projection optical system comprising:
      at least one illumination optical component to receive light from the light source and direct the light into a single light ray path;
      a pixel forming device to receive light from the illumination optical component and convert the light into a pixel array; and
      a magnifying optical component to receive the pixel array;
      a collimating optical system to collimate light from the pixel array and create a collimated projected image;
   a display optical system comprising a display optical component; and
   a multiplexing device connected to at least one of the illumination optical component, pixel forming device, magnifying optical component, and display optical component, to shift the ray path to provide a multiplexed light field output.

2. The projector of claim 1, wherein the illumination optical component comprises at least one of a plano-convex lens, dichroic mirror, microlens array, meniscus lens, bi-convex lens, single prism, and folded prism.

3. The projector of claim 1, wherein the pixel forming device is a Liquid Crystal on Silicon (LCOS) panel or a digital micromirror device (DMD).

4. The projector of claim 1, wherein the magnifying optical component is a projection doublet or a bi-convex lens.

5. The projector of claim 1, wherein the collimating optical system comprises at least one of a light field projection (LFP) lens, bi-convex lens, and collimating lens array comprising a plurality of collimating lenslets.

6. The projector of claim 5, wherein each collimating lenslet in the plurality of collimating lenslets comprises two plano-convex lenses.

7. The projector of claim 1, wherein the display optical component comprises at least one of a single lens, lens array, pinhole array, metasurface, and metalens.

8. The projector of claim 1, wherein the multiplexing device comprises a voltage generator connected to a first electrode and a second electrode, and wherein the first electrode and the second electrode are attached to an illumination optical component, pixel forming device, magnifying optical component, or display optical component multiplexing device capable of the Kerr effect.

9. The projector of claim 1, wherein the multiplexing device is a multiplexing layer positioned in front of the display optical system.

10. The projector of claim 1, wherein the multiplexing device is a multiplexing actuator.

11. The projector of claim 10, wherein the multiplexing actuator is a piezo-electric actuator, electrothermal actuator, magnetic actuator, electrostatic actuator, or shape memory alloy-based actuator.

12. The projector of claim 1, wherein the multiplexed light field output comprises a first image at a first position and a second image at a second position, wherein the second image is offset a distance of less than one pixel width relative to the first image.

13. A method of creating a multiplexed light field image comprising:
   generating a light ray from a light source along a ray path;
   directing the light ray to a pixel forming device;
   converting the light ray into a pixel array;
   magnifying the pixel array to form a magnified pixel array;
   collimating the magnified pixel array to produce a collimated projected image;
   directing the collimated projected image to a display optical component to produce a light field output; and
   shifting the ray path to multiplex the light field output and produce a multiplexed light field image.

14. The method of claim 13, wherein the light ray is directed to the pixel forming device by one or more plano-convex lens, dichroic mirror, microlens array, meniscus lens, bi-convex lens, single prism, and folded prism.

15. The method of claim 13, wherein the light ray is converted into pixel by a Liquid Crystal on Silicon (LCOS) panel or a digital micromirror device (DMD).

16. The method of claim 13, wherein the pixel array is magnified optical by a projection doublet or a bi-convex lens.

17. The method of claim 13, wherein the magnified pixel array is collimated by a light field projection (LFP) lens, a bi-convex lens, or a collimating lens array comprising a plurality of collimating lenslets.

18. The method of claim 13, further comprising shifting the ray path by applying a voltage to a first electrode and a second electrode, wherein the first electrode and the second electrode are attached to an illumination optical component, pixel forming device, magnifying optical component, or display optical component multiplexing device capable of the Kerr effect.

19. The method of claim 13, further comprising shifting the ray path using a multiplexing layer.

20. The method of claim 13, further comprising shifting the ray path by actuating a position of an optical component in the projector using one or more piezo-electric actuator, electrothermal actuator, magnetic actuator, electrostatic actuator, and shape memory alloy-based actuator.

21. The method of claim 13, wherein the multiplexed light field output comprises a first image at a first position and a second image at a second position, wherein the second image is offset a distance of less than one pixel width relative to the first image.

22. A method of creating a multiplexed light field image comprising:
   generating a light ray from a light source along a ray path;
   converting the light ray into a pixel array;
   magnifying the pixel array;
   collimating the magnified pixel array to produce a collimated projected image;
   displaying the collimated projected image to produce a light field output; and shifting the ray path to multiplex the light field output and produce a multiplexed light field image.

23. The method of claim 22, wherein shifting the ray path comprises actuating a position of a shiftable optical component in the projector, applying a voltage to an optical component multiplexing device capable of the Kerr effect, actuating an optical component capable of deformation, or positioning a multiplexing layer in the ray path.

* * * * *